(12) United States Patent
Bowman et al.

(10) Patent No.: US 12,410,283 B2
(45) Date of Patent: Sep. 9, 2025

(54) PHOTOPOLYMERIZABLE THERMOPLASTICS AND METHODS OF MAKING AND USING SAME

(71) Applicant: THE REGENTS OF THE UNIVERSITY OF COLORADO, Denver, CO (US)

(72) Inventors: Christopher N. Bowman, Boulder, CO (US); Marvin Dion Alim, Kirkland, WA (US); Matthew K. McBride, Boulder, CO (US); Kimberly Kay-Childress, Boulder, CO (US); Juan J. Hernandez, Longmont, CO (US); Jeffrey W. Stansbury, Centennial, CO (US)

(73) Assignee: The Regents of the University of Colorado, Denver, CO (US)

( * ) Notice: Subject to any disclaimer, the term of this patent is extended or adjusted under 35 U.S.C. 154(b) by 792 days.

(21) Appl. No.: 17/616,922

(22) PCT Filed: Jun. 8, 2020

(86) PCT No.: PCT/US2020/036650
§ 371 (c)(1),
(2) Date: Dec. 6, 2021

(87) PCT Pub. No.: WO2020/247928
PCT Pub. Date: Dec. 10, 2020

(65) Prior Publication Data
US 2022/0315706 A1    Oct. 6, 2022

Related U.S. Application Data

(60) Provisional application No. 62/900,308, filed on Sep. 13, 2019, provisional application No. 62/858,602, filed on Jun. 7, 2019.

(51) Int. Cl.
C08G 75/045    (2016.01)
B33Y 70/00    (2020.01)
(Continued)

(52) U.S. Cl.
CPC ............ *C08G 75/045* (2013.01); *B33Y 70/00* (2014.12); *C08F 2/50* (2013.01); *C08F 218/16* (2013.01)

(58) Field of Classification Search
None
See application file for complete search history.

(56) References Cited

U.S. PATENT DOCUMENTS 5,741,884 A    4/1998    Cai et al.
2017/0349708 A1*   12/2017    Sato ..................... C08G 75/045

FOREIGN PATENT DOCUMENTS

JP    2019019291 A    2/2019
WO    2008062903 A1    5/2008
WO    WO-2017116820 A1 *    7/2017    ........... C08G 75/045

OTHER PUBLICATIONS

Kuhne et al (New results of the self-initiation mechanism of SH/En addition polymerization, Die Angewandte Makromolekulare Chemie 242 (1996) 139-145 (Nr.4233)) (Year: 1996).*

(Continued)

*Primary Examiner* — Rachel Kahn
(74) *Attorney, Agent, or Firm* — Saul Ewing LLP; Domingos J. Silva; Dennis Ostrovsky

(57) ABSTRACT

In one aspect, the disclosure relates to compositions comprising semicrystalline, linear photopolymers that possesses extraordinary mechanical properties for application in 3D printing. The photopolymers are rapidly fabricated using low viscosity liquids at ambient conditions.

8 Claims, 21 Drawing Sheets

(51) Int. Cl.
  C08F 2/50    (2006.01)
  C08F 218/16  (2006.01)

(56) References Cited

OTHER PUBLICATIONS

"International Search Report and Written Opinion for Application No. PCT/US20/36650 dated Oct. 14, 2020".

Barker, et al., "A microstereolithography resin based on thiol-ene chemistry: towards biocompatible 3D extracellular constructs for tissue engineering", Biomater. Sci., 2, 2014, 3-7.

Bertlein, et al., "Thiol-Ene Clickable Gelatin: A Platform Bioink for Multiple 3D Biofabrication Technologies", Adv. Mater., 1703404, 2017, 1-6.

Charlesby, et al., "The effect of cross-linking on the elastic modulus of Polythene", Proc. R. Soc. London. Ser. A. Math. Phys. Sci., 218, 1953, 245-255.

Chen, et al., "Annealing-induced crystalline structure and mechanical property changes of polypropylene random copolymer", J. Mater. Res., 28, 2013, 3100-3108.

Chen, et al., "Highly stable thiol-ene systems: from their structure-property relationship to DLP 3D printing", J. Mater. Chem. C, 6, 2018, 11561-11568.

Ferrer-Balas, et al., "Influence of annealing on the microstructural, tensile and fracture properties of polypropylene films", Polymer (Guildf)., 42, 2001, 1697-1705.

Hart, et al., "Increased fracture toughness of additively manufactured amorphous thermoplastics via thermal annealing", Polymer (Guildf)., 144, 2018, 192-204.

Hendra, et al., "The morphology of linear polyethylenes cross-linked in their melts. The structure of melt crystallized polymers in general", Polymer (Guildf)., 28, 1987, 705-709.

Ivey, et al., "Characterizing short-fiber-reinforced composites produced using additive manufacturing", Adv. Manuf. Polym. Compos. Sci., 3, 2017, 81-91.

Jasinski, et al., "Light-Mediated Thiol-Ene Polymerization in Miniemulsion: A Fast Route to Semicrystalline Polysulfide Nanoparticles", ACS Macro Lett., 3 (9), 2014, 958-962.

Jasinski, et al., "Thiol-Ene Linear Step-Growth Photopolymerization in Miniemulsion: Fast Rates, Redox-Responsive Particles, and Semicrystalline Films", Macromolecules, 49 (4), 2016, 1143-1153.

Kurian, et al., "Radiation Crosslinking of HDPE/LLDPE Blends in the Presence of Dicumyl Peroxide", J. Elastomers Plast., 25, 1993, 12-21.

Laquai, et al., "Charge Carrier Transport and Photogeneration in P3HT:PCBM Photovoltaic Blends", Macromol. Rapid Commun., 34, 2013, 1020-1025.

Leonards, et al., "Advantages and Drawbacks of Thiol-Ene Based Resins for 3D-PRINTING", Proc. SPIE, , DOI: 10.1117/12.2081169.

Oesterreicher, et al., "Tough and degradable photopolymers derived from alkyne monomers for 3D printing of biomedical materials", Polym. Chem., 7, 2016, 5169-5180.

Peacock, et al., "The Chemistry of Polyethylene", J. Macromol. Sci.—Polym. Rev., 41, 2001, 285-323.

Prajapati, et al., "Improvement in build-direction thermal conductivity in extrusion-based polymer additive manufacturing through thermal annealing", Addit. Manuf., 26, 16 M. S. Stark, 2019, 242-249.

Rangisetty, et al., "The Effect of Infill Patterns and Annealing on Mechanical Properties of Additively Manufactured Thermoplastic Composites", Proceedings of the ASME 2017 Conference on Smart Materials, Adaptive Structures, and Intelligent Systems, Snowbird, UT,, 2017, 1-12.

Stratton, "Polymeric 3D Printed Structures for Soft-Tissue Engineering", J. Appl. Polym. Sci., 135, 24, 2018, 46259.

Sycks, "Tough Semicrystalline Thiol-Ene Photopolymers Incorporating Spiroacetal Alkenes", Macromolecules, 50 (11), 2017, 4281-4291.

Sycks, et al., "Tough, stable spiroacetal thiol-ene resin for 3D printing", J. Appl. Polym. Sci., 135, 2018, 46259.

Turunc, et al., "Renewable Polyethylene Mimics Derived from Castor Oil", Macromol. Rapid Commun., 32, 2011, 1357-1361.

Van Den Berg, et al., "Renewable sulfur-containing thermoplastics via AB-type thiol-ene polyaddition", European Polymer Journal, 49,, 2013, 804-812.

Wu, et al., "Reinforcement and toughening of polypropylene/organic montmorillonite nanocomposite using b-hucleating agent and annealing", Compos. Part B Eng., 44, 2013, 439-445.

* cited by examiner

Thermoplastic Semicrystalline | Thermoset Semicrystalline | Thermoset Amorphous

*Starting Materials* 〜

HDT

DAT

*Crosslinking Variants* ●

TAT

TABT

TMPTMP

TATATO

TATM

PETMP

PHOTOPOLYMERIZABLE THERMOPLASTICS AND METHODS OF MAKING AND USING SAME

CROSS-REFERENCE TO RELATED APPLICATIONS

This application is a 35 U.S.C. § 371 national phase application from, and claims priority to, International Application No. PCT/US2020/036650, filed Jun. 8, 2020, which claims priority under 35 U.S.C. § 119(e) to U.S. Provisional Patent Application Ser. No. 62/858,602 entitled "PHOTOPOLYMERIZABLE THERMOPLASTICS AND METHODS OF MAKING AND USING SAME," filed Jun. 7, 2019, and U.S. Provisional Patent Application Ser. No. 62/900,308 entitled "CHEMICAL AND PHYSICAL MODIFICATION OF A CROSSLINKABLE SEMICRYSTALLINE THIOL-ENE FOR ENHANCED MECHANICAL PERFORMANCE," filed Sep. 13, 2019, the disclosures of which are incorporated herein by reference in their entireties.

STATEMENT REGARDING FEDERALLY SPONSORED RESEARCH OR DEVELOPMENT

This invention was made with government support under grant number DMR1809841 awarded by the National Science Foundation. The government has certain rights in the invention.

BACKGROUND OF THE DISCLOSURE

Additive manufacturing (3D printing), widely regarded as the next frontier in prototyping, production and manufacturing, is a rapidly evolving technology for highly complex and customized materials fabrication. In particular, light-based 3D printing, or stereolithography (SLA), is arguably one of the most promising technologies for 3D printing polymers, offering a superior combination of cost, throughput, versatility and resolution. While significant progress has been made with respect to SLA printing technologies in terms of print speed, methodology, multi-material printing, and achievable resolutions the absence of key enabling materials remains a persistent barrier inhibiting significant progress in key fields. One such key unrealized material class is the ability to photopolymerizable linear polymers that resemble conventional thermoplastics.

Thermoplastics, more universally known as just "plastics", are the defining synthetic materials of modern society for their unmatched versatility and utility. While thermoplastics, such as poly(ethylene terephthalate) (PET), are ubiquitous and produced globally on a massive industrial scale, there remains no way of producing thermoplastic materials, or even close mimics, via photopolymerization. Thus, 3D printing of thermoplastics is currently restricted to fused deposition modeling (FDM), generally an inferior technique to vat photopolymerization in terms of minimum feature size, resolution and finishing quality.

Without being bound by theory, SLA-suitable photopolymers are: i) sufficiently reactive, ii) capable of high resolutions, iii) mechanically strong, and iv) economical. For these reasons, the majority of SLA 3D printing resins are effectively restricted to radical chain-growth polymerizations of (meth)acrylates. More specifically, they almost exclusively involve the use of multifunctional monomers to produce highly crosslinked networks. This is because, in the case of linear polymers, the reaction kinetics are inherently slow limiting their molecular weights and thus mechanical properties. While a diverse and valuable array of material properties have been achieved through extensive formulation engineering (comprising monomers and oligomers of varying molecular weights, reactive/unreactive diluents, additives, stabilizers), viscosity constraints for resin reflow further restrict what constitutes as printable. Finally, there are fundamental limitations intrinsic to all chain growth (meth)acrylate systems such as low pre-gel conversions and significant shrinkage stresses. Given all this, achieving an encompassing range of properties for 3D printing with (meth)acrylate photopolymers alone is intractable.

There is thus a need in the art to develop linear polymers that overcome the aforementioned limitations and can be used with SLA-based 3D-printing. The present invention meets this need.

BRIEF SUMMARY OF THE DISCLOSURE

The disclosure provides herein polymers of formula (I), $$\left(\!\!\begin{array}{c}\phantom{x}\end{array}\!\!\right)\!\!-\!\!O\!-\!\!\overset{O}{\underset{\|}{C}}\!-\!R^1\!-\!\overset{O}{\underset{\|}{C}}\!-\!O\!\!-\!\!\sim\!\!S\!-\!(R^2)_p\!-\!S\!\!\left(\!\!\begin{array}{c}\phantom{x}\end{array}\!\!\right)_n \quad \text{(I)}$$

and methods of making these polymers. In some aspects, the polymers can be made by polymerizing a monomer of formula (II), $$\sim\!\!O\!-\!\!\overset{O}{\underset{\|}{C}}\!-\!R^1\!-\!\overset{O}{\underset{\|}{C}}\!-\!O\!\!-\!\!\sim \quad \text{(II)}$$

with a monomer of formula (III), $$HS\!-\!(R^2)_p\!-\!SH \quad \text{(III)}$$

The disclosure provides herein polymers of formula (I-A), $$\left(\!\!(\,)_{n1}\!-\!Z\!-\!X\!-\!Z\!-\!(\,)_{n2}\!-\!S\!-\!A\!-\!Q\!-\!A\!-\!S\!\right)_n \quad \text{(I-A)}$$

and methods of making these polymers.

In some aspects, the polymers of formula (I-A) can be made by polymerizing a monomer of formula (II-A), $$\sim\!\!(\,)_{n1}\!-\!Z\!-\!X\!-\!Z\!-\!(\,)_{n2}\!\!\sim \quad \text{(II-A)}$$

with a monomer of formula (III-A),

(III-A)

In some aspects, the polymerization of any of the foregoing monomers can optionally be conducted in the presence of a photoinitiator and/or a cross-linking agent. The polymers have advantageous mechanical properties, that in some aspects make them highly suitable for 3D printing applications.

BRIEF DESCRIPTION OF THE FIGURES

For the purpose of illustrating the invention, depicted in the drawings are certain aspects of the invention. However, the invention is not limited to the precise arrangements and instrumentalities of the aspects depicted in the drawings.

FIG. 1A shows schemes of traditional thermoplastics and photopolymers. FIG. 1B shows reaction kinetics via real-time FTIR (LHS) of the thiol-ene photopolymerization using a 10 s irradiation (405 nm LED, 10 mW/cm$^2$) showing near-instantaneous, quantitative conversions of both thiol and ene groups are uniformly achieved. FIG. 1C shows real-time modulus development obtained via photo-rheology. FIG. 1D shows representative optical images taken between crossed polarizers of the photopolymerization and subsequent crystallization processes upon a uniform 400 nm LED irradiation.

FIG. 2A shows dynamic scanning calorimetry scans reveal distinct first-order phase transitions—melting and crystallization. FIG. 2B shows size exclusion chromatography with multi-angle light scattering eluted in THF confirm linear polymers of ~$10^4$ g/mol with a random coil morphology. FIG. 2C shows representative uniaxial tensile stress-strain performance of 150 μm thick HDT-DAT films cut into ASTM D368 Type V dogbones and tested at a strain rate of 5 mm/min at ambient conditions (n=7).

FIG. 3A shows a bright-field image of a buffalo patterned on neat HDT-DAT resin using a 400 nm LED and a DLP. FIG. 3B comprises a high resolution differential interference contrast (DIC) image showing overcure due to reaction-diffusion from a square exposure pattern (shaded in red) of neat HDT-DAT irradiated with a high intensity 405 nm scanning laser. FIG. 3C shows photographs of SLA 3D printed objects using a HDT-DAT resin formulation containing carbon black (0.07 wt %) as the absorber. FIG. 3D shows printed pillars sitting on a glass slide was placed on a hot plate set at 90° C.

FIG. 11A shows the repeat unit structures of thermoplastic polymers prepared using stoichiometric amounts of diallyl terephthalate (DAT) with 1,2-ethane dithiol (EDT) and 1,6-hexane dithiol (HDT) respectively. FIG. 11B shows the repeat unit structures of commercial plastics—polyethylene terephthalate (PET) and polybutylene terephthalate (PBT) respectively.

FIG. 13A shows polymerization kinetics obtained via real-time Fourier-transform infrared spectroscopy (FTIR) after irradiation with a 405 nm LED for 10 s (1 mW cm$^{-2}$). FIG. 13B shows dynamic scanning calorimetry (DSC) for samples with 0, 5, and 10 mol % TAT. FIG. 13C shows polarized optical microscopy (POM) of bulk samples with 0, 5, and 10 mol % TAT. Images were taken after crystallization ceased, and areas devoid of any crystals are visible for 10 mol % TAT (scale bar: 50 m).

FIG. 16 A corresponds to compositions with HDT:DAT:PETMP ratios of 1:1:0, 0.95:1:0.05, and 0.9:1:0.1. FIG. 16 B corresponds to compositions with HDT:DAT:TMPTMP ratios of 1:1:0, 0.95:1:0.05, and 0.9:1:0.1. FIG. 16 C corresponds to compositions with HDT:DAT:TATAO ratios of 1:1:0, 0.95:1:0.05, and 0.9:1:0.1. FIG. 16 D corresponds to compositions with HDT:DAT:TAT ratios of 1:1:0, 0.95:1:0.05, and 0.9:1:0.1. FIG. 16 E corresponds to compositions with HDT:DAT:TABT ratios of 1:1:0, 0.95:1:0.05, and 0.9:1:0.1. FIG. 16 F corresponds to compositions with HDT:DAT:TATM ratios of 1:1:0, 0.95:1:0.05, and 0.9:1:0.1.

DETAILED DESCRIPTION OF THE INVENTION

Figure 1A:
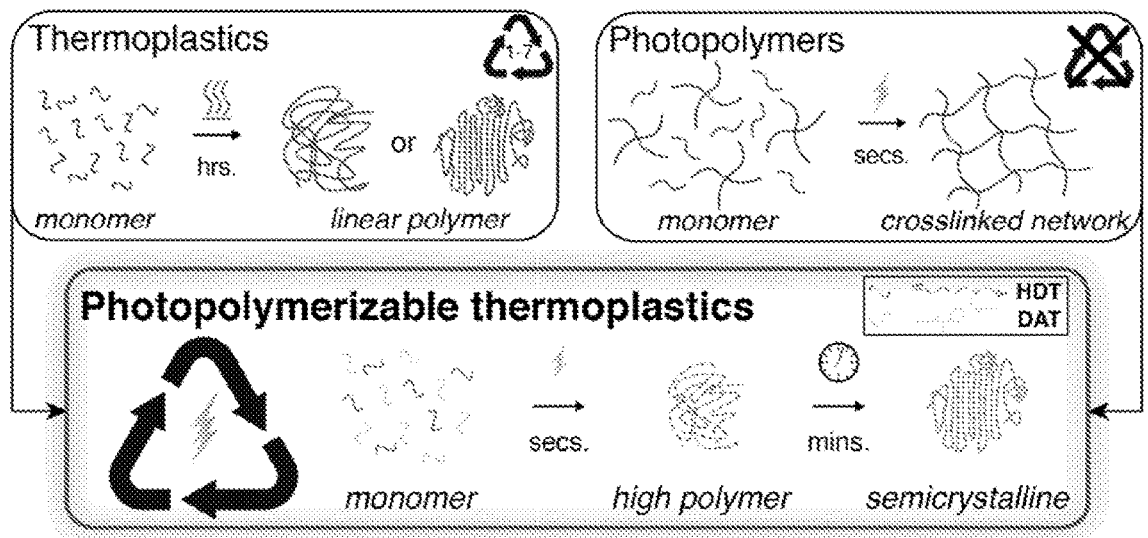
FIGS. 1A-1D illustrate overview of photopolymerizable thermoplastics.

In one aspect, the compositions of the present invention combine certain virtues of both thermoplastics and photopolymers into a single materials platform, extending thermoplastic materials to be photopolymerizable and more specifically, geared for additive manufacturing. Utilizing a subset of dithiol and di-alkene monomers, it is demonstrated that semicrystalline high polymers can be rapidly produced under neat conditions at ambient temperature and mild irradiation. Owing to the high molecular weights and extent of crystallinity quickly achieved in these photopolymerizable thermoplastic systems, impressively strong and tough materials closely resembling important thermoplastics, such as PET, are formed. The applicability of the compositions of the invention in vat photopolymerization-based 3D printing of thermoplastics objects, that can then be subsequently melted or reprocessed, is also validated herein.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in polymer chemistry and organic chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a concentration, a temporal duration, and the like, the term "about" is meant to encompass variations of 20% or +10%, more preferably +5%, even more preferably +1%, and still more preferably +0.1% from the specified value, as such variations are appropriate to perform the disclosed methods.

As used herein, the term "click chemistry" refers to a chemical synthesis method that generates products quickly and reliably by joining small units under mild condition. Non-limiting examples include [3+2] cycloadditions, such as the Huisgen 1,3-dipolar cycloaddition; thiol-ene click reactions; Diels-Alder reaction and inverse electron demand Diels-Alder reaction; [4+1] cycloadditions between isonitriles (isocyanides) and tetrazines; nucleophilic substitution especially to small strained rings like epoxy and aziridine compounds; addition reactions to carbon-carbon double bonds like dihydroxylation or the alkynes in the thiol-yne reaction.

As used herein, the term "continuous-phase composition" refers to a composition wherein all components are in single continuous phase. The continuous-phase composition does not comprise phase-separated components such as those in an emulsion.

As used herein, the term "continuous-phase polymer" refers to a polymer that is present in the form of a continuous network throughout the matrix/composition. Contrary to continuous phase polymer, an emulsion polymer is present in a form of a discontinuous, dispersed phase within its matrix/composition.

As used herein, the term "emulsion" refers to a mixture of two or more liquids that are normally immiscible. In a composition forming the emulsion, part of the components comprising the composition are dispersed in a non-continuous fashion between the components that form a continuous matrix.

As used herein, the term "emulsion polymer" refers to a polymer synthesized by the process of emulsion polymerization. The emulsion polymer is dispersed as a discontinuous phase in a continuous phase matrix.

As used herein, the term "emulsion polymerization" refers to a polymerization process involving application of emulsifier to emulsify hydrophobic polymers through aqueous phase by amphipathic emulsifier, then generating free radicals with either a water or oil soluble initiators.

As used herein, the term "ene monomer" refers to a monomer comprising at least one reactive alkene group, or a reactive alkene equivalent. Monomers having "-ene" or vinyl functional groups suitable for aspects of the present invention include any monomer having one, or preferably more functional vinyl groups, i.e., reacting "C=C" or "C≡C" groups. The ene monomer can be selected from one or more compounds having vinyl functional groups. Vinyl functional groups can be selected from, for example, vinyl ether, vinyl ester, allyl ether, norbornene, diene, propenyl, alkene, alkyne, N-vinyl amide, unsaturated ester, N-substituted maleimides, and styrene moieties.

The terms "mercapto" or "thiol" refer to an —SH substituent, or are used to designate a compound having an —SH substituent.

The term "monomer" refers to any discreet chemical compound of any molecular weight.

As used herein, the term "polymer" refers to a molecule composed of repeating structural units typically connected by covalent chemical bonds. The term "polymer" is also meant to include the terms copolymer and oligomers. In certain aspects, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "photoinitiator" refers to a molecule that creates reactive species (such as for example, free radicals, cations or anions) when exposed to radiation (UV or visible).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain aspects, polymerization or crosslinking of at least one functional group results in about 100% consumption of the at least one functional group. In other aspects, polymerization or crosslinking of at least one functional group results in less than about 100% consumption of the at least one functional group.

As used herein, the term "reaction condition" refers to a physical treatment, chemical reagent, or combination thereof, which is required or optionally required to promote a reaction. Non-limiting examples of reaction conditions are electromagnetic radiation (such as, but not limited to visible light), heat, a catalyst, a chemical reagent (such as, but not limited to, an acid, base, electrophile or nucleophile), and a buffer.

As used herein, the term "reactive" as applied to a specific group indicates that this group under appropriate conditions may take part in one or more reactions as defined in this application.

As used herein, the term "thiol-ene reaction" refers to an organic reaction between a thiol monomer and an ene/yne monomer. In certain aspects, the ene monomer is an α,β-unsaturated ester, acid, sulfone, nitrile, ketone, amide, aldehyde, or nitro compound (Hoyle, et al., Angew. Chem. Intl Ed., 2010, 49(9):1540-1573); the thiol-ene reaction involving such reactants is known as "thiol-Michael reaction."

As used herein, the term "thiol-ene polymerization" refers to polymerization wherein at least one thiol-ene reaction takes place.

As used herein, the term "alkyl", by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$) alkyl, such as, but not limited to, ethyl, methyl, isopropyl, isobutyl, n-pentyl, n-hexyl and cyclopropylmethyl.

As used herein, the term "cycloalkyl", by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Most preferred is ($C_3$-$C_6$)cycloalkyl, such as, but not limited to, cyclopropyl, cyclobutyl, cyclopentyl and cyclohexyl.

As used herein, the term "alkenyl", employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl", employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers.

As used herein, the term "alkylene" by itself or as part of another substituent means, unless otherwise stated, a straight or branched hydrocarbon group having the number of carbon atoms designated (i.e., $C_1$-$C_{10}$ means one to ten carbon atoms) and includes straight, branched chain, or cyclic substituent groups, wherein the group has two open valencies.

Examples include methylene, 1,2-ethylene, 1,1-ethylene, 1,1-propylene, 1,2-propylene and 1,3-propylene. Heteroalkylene substituents can a group consisting of the stated number of carbon atoms and one or more heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "alkynylene", employed alone or in combination with other terms, means, unless otherwise stated, a stable straight chain or branched chain hydrocarbon group with a triple carbon-carbon bond, having the stated number of carbon atoms wherein the group has two open valencies.

As used herein, the term "substituted alkyl", "substituted cycloalkyl", "substituted alkenyl", "substituted alkynyl", "substituted alkylene", "substituted alkenylene" or "substituted alkynylene" means alkyl, cycloalkyl, alkenyl, alkynyl, alkylene, alkenylene, alkynylene as defined above, substituted by one, two or three substituents selected from the group consisting of $C_1$-$C_{10}$ alkyl, halogen, =O, —OH, alkoxy, tetrahydro-2-H-pyranyl, —$NH_2$, —N($CH_3$)$_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, preferably containing one or two substituents selected from halogen, —OH, alkoxy, —$NH_2$, trifluoromethyl, —N($CH_3$)$_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, such as, but not limited to, ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$—CH$_2$—OH, —CH$_2$—CH$_2$—NH—CH$_3$, —CH$_2$—S—CH$_2$—CH$_3$, and —CH$_2$CH$_2$—S(=O)—CH$_3$. Up to two heteroatoms may be consecutive, such as, for example, —CH$_2$—NH—OCH$_3$, or —CH$_2$—CH$_2$—S—S—CH$_3$.

As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—CH$_3$, —CH=CH—CH$_2$—OH, —CH$_2$—CH=N—OCH$_3$, —CH=CH—N(CH$_3$)—CH$_3$, and —CH$_2$—CH=CH—CH$_2$—SH.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl", employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-(C$_1$-C$_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of C$_{1-6}$ alkyl, —OH, C$_{1-6}$ alkoxy, halo, amino, acetamido and nitro. As used herein, where a substituent is an alkyl or alkoxy group, the carbon chain may be branched, straight or cyclic, with straight being preferred.

Throughout this disclosure, various aspects of the disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compounds and Compositions

In one aspect, the disclosure provides a continuous-phase polymer. In certain aspects, the polymer is not part of an emulsion. In other aspects, the polymer is not prepared from monomers in an emulsion. In other aspects, the polymer is not prepared from a mixture of monomers comprising water. In yet other aspects, the polymer is prepared from a bulk mixture of monomers.

In certain aspects, the continuous-phase comprises a polymer of formula (I)

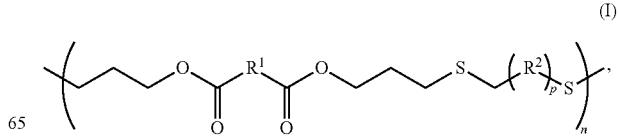

wherein:
  each instance of $R^1$ is selected from the group consisting of an optionally substituted $C_1$-$C_{15}$ alkyl, optionally substituted $C_1$-$C_{15}$ heteroalkyl, optionally substituted $C_2$-$C_{15}$ alkenyl, optionally substituted $C_2$-$C_{15}$ hetero alkenyl, optionally $C_2$-$C_{15}$ alkynyl, optionally substituted $C_2$-$C_{15}$ hetero alkynyl, optionally substituted $C_5$-$C_7$ cycloalkyl, optionally substituted $C_5$-$C_7$ heterocycloalkyl, optionally substituted $C_6$-$C_{18}$ aryl, and optionally substituted $C_6$-$C_{18}$ heteroaryl;
  each instance of $R^2$ is selected from the group consisting of an optionally substituted $C_1$-$C_{15}$ alkyl, optionally substituted $C_1$-$C_{15}$ heteroalkyl, optionally substituted $C_2$-$C_{15}$ alkenyl, optionally substituted $C_2$-$C_{15}$ heteroalkenyl, optionally $C_2$-$C_{15}$ alkynyl, and optionally $C_2$-$C_{15}$ heteroalkynyl;
  p is an integer from 1 to 25; and
  n is an integer from 2 to 200,000.

In certain aspects, each instance of $R^1$ is independently selected from the group consisting of:

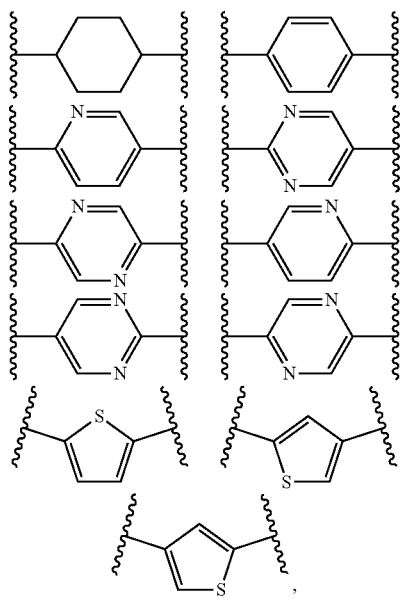

each of which is independently optionally substituted.

In certain aspects, the polymer is prepared from a bifunctional monomer of formula (II):

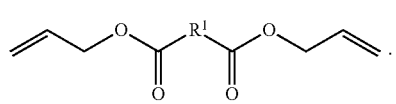
(II)

In certain aspects, the polymer is prepared from a bifunctional monomer of formula (III):

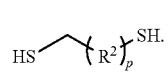
(III)

In certain aspects, $R^1$ is selected from the group consisting of:

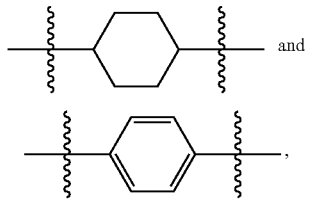
and wherein each $R^1$ is independently optionally substituted.

In certain aspects, the monomer of formula (II) is selected from the group consisting of:

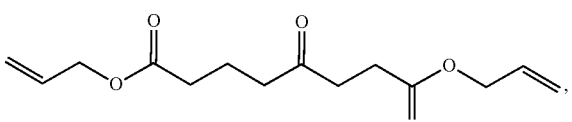

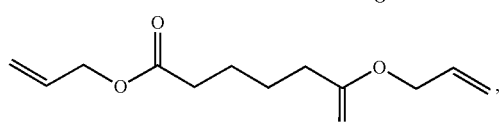

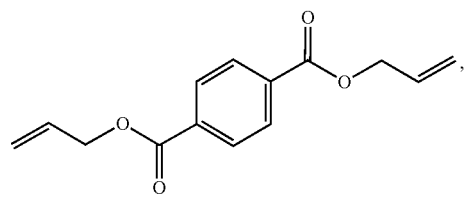

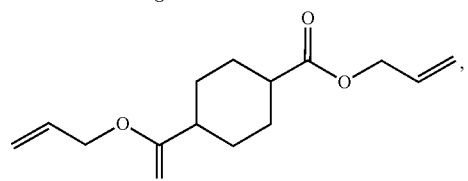

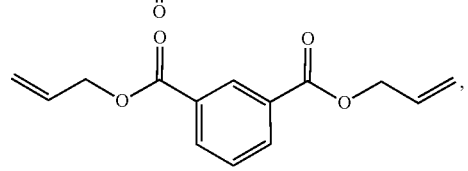

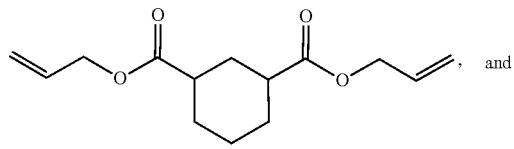
and

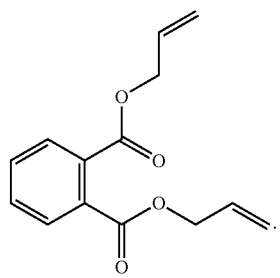

In certain aspects, the monomer of formula (II) is selected from the group consisting of:

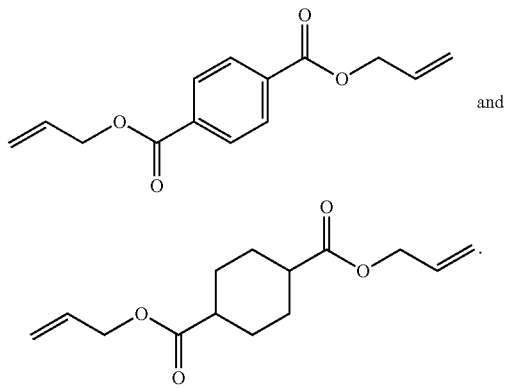

and

In certain aspects, the monomer of formula (II) is selected from the group consisting of diallyl 4-oxooctanedioate, diallyl adipate, diallyl terephthalate, diallyl cyclohexane-1,4-dicarboxylate, diallyl isophthalate, diallyl cyclohexane-1,3-dicarboxylate, and diallyl phthalate.

In certain aspects, the monomer of formula (II) is selected from the group consisting of diallyl terephthalate and diallyl cyclohexane-1,4-dicarboxylate.

In certain aspects, the monomer of formula (II) is 1,4-diallyl terephthalate (DAT).

In certain aspects, the 1,2-substituted analogue of DAT (diallyl phthalate) and 1,3-substituted analogue of DAT (diallyl isophthalate) do not give rise to crystalline polymers.

In certain aspects, the thiol is selected from the group consisting of

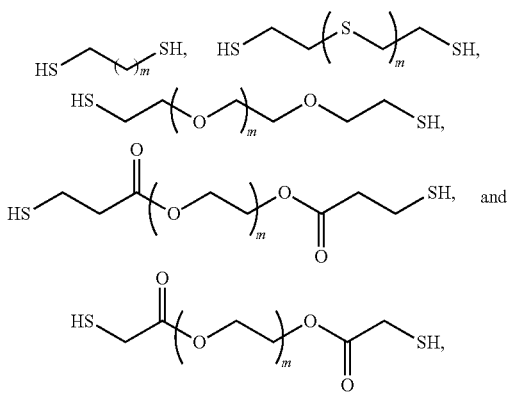

wherein each instance of m is independently an integer from 1 to 25.

In certain aspects, the thiol is selected from the group consisting of 1,6-hexanedithiol (HDT) and 1,2-ethane dithiol (EDT).

In certain aspects, the molar ratio of the monomer of formula (II) and the monomer of formula (III) is about 1:1.

In certain aspects, the compositions described herein further comprise a photoinitiator. In certain aspects, the photoinitiator is selected from the group consisting of acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide (TPO), Ethyl (2,4,6-trimethylbenzoyl) phenyl phosphinate, lithium phenyl-2,4,6-trimethylbenzoylphosphinate,

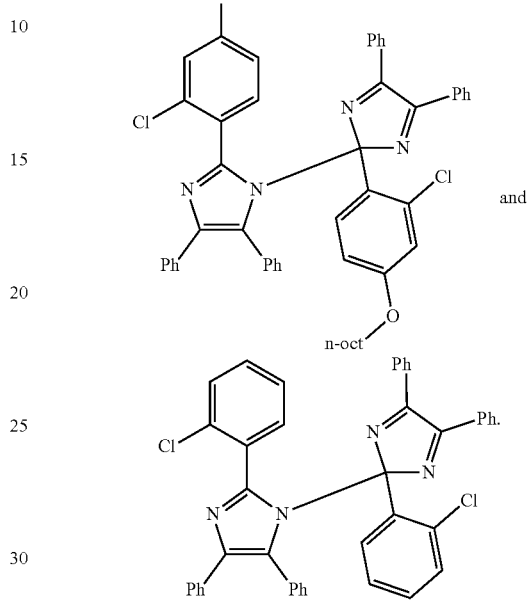

and

In certain aspects, the polymer is a linear polymer.

In certain aspects, the polymer is a semi-crystalline polymer.

In certain aspects, the polymer is a thermoplastic polymer and melts at about 70° C. to about 100° C. In certain aspects, the polymer melts at about 75° C. In certain aspects, the polymer melts at about 80° C. In certain aspects, the polymer melts at about 85° C. In certain aspects, the polymer melts at about 90° C. In certain aspects, the polymer melts at about 95° C. In certain aspects, the polymer melts at about 100° C.

In certain aspects, the composition is used for 3D-printing. In certain aspects, the 3D-printing is stereolithography (SLA)-3D printing. In various aspects, the polymer is an HDT-DAT polymer.

In certain aspects, the polymer has a tensile strength of about 15 MPa to about 35 MPa. In one aspect, the polymer has a tensile strength of about 15, 20, 25, 30, or about 30 MPa. In one non-limiting aspect, the polymer is an HDT-DAT polymer and has tensile strength of about 24.4 MPa.

In certain aspects, the polymer has a toughness of about 80 to about 140 MJ/m$^3$. In various aspects, the polymer has a toughness of about 80, 85, 90, 95, 100, 105, 110, 115, 120, 125, 130, 135, or about 140 MJ/m$^3$. In one non-limiting aspect, the polymer is an HDT-DAT polymer and has toughness of about 102 MJ/m$^3$.

In certain aspects, the polymer is formed by irradiating the monomers described herein with a UV-light having wavelength of about 380 nm to about 410 nm in presence of the photoinitiator. In one aspect, the polymer is formed by irradiating the monomers described herein with a UV-light having wavelength of about 380, 385, 390, 395, 400, 405, or about 410 nm in the presence of a photoinitiator.

In certain aspects, the UV-light has intensity of about 1 mW/cm$^2$ to about 20 mW/cm$^2$.

In certain aspects, the irradiation time is about 2 seconds to about 30 seconds.

In certain aspects, the polymer is selected from the group consisting of

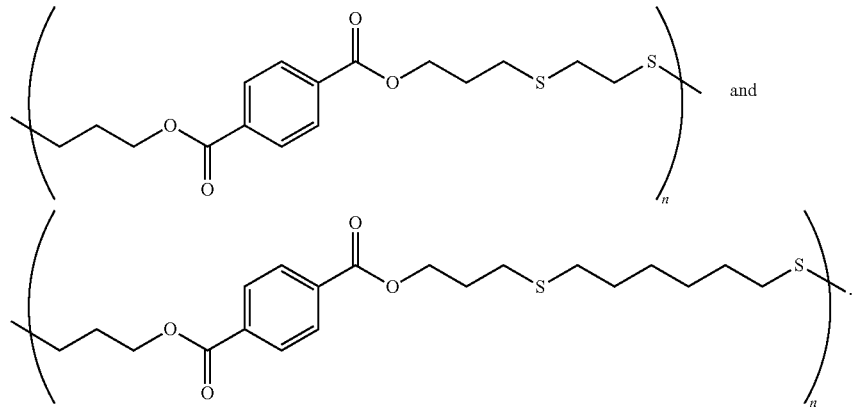

and.

In certain aspects, the continuous-phase comprises a polymer of formula (I-A)

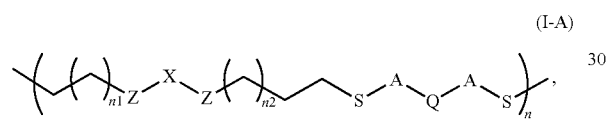   (I-A)

wherein:

each occurrence of Z is independently CH$_2$ or O;

each A is independently absent or selected from the group consisting of (—CH$_2$—)$_{n5}$, (—CH$_2$—)$_{n5}$-O—C(=O)—, and (—CH$_2$CH$_2$O—)$_{n5}$;

Q is absent, optionally substituted C$_6$-C$_{18}$ arylene, or optionally substituted C$_2$-C$_{15}$ alkylene;

X is selected from the group consisting of

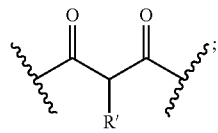, optionally substituted C$_6$-C$_{18}$ arylene, optionally substituted C$_2$-C$_{15}$ alkylene,

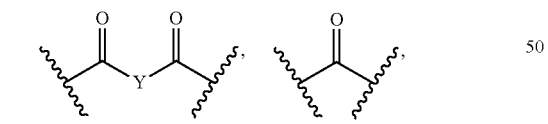,

—O—, —S—, —S—S—, and

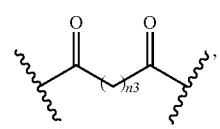;

wherein:

Y is O, a C$_6$-C$_{18}$ aryl, or a C$_6$-C$_{18}$ heteroaryl;

R' is selected from the group consisting of an optionally substituted C$_1$-C$_{15}$ alkyl, optionally substituted C$_1$-C$_{15}$ heteroalkyl, optionally substituted C$_2$-C$_{15}$ alkenyl, optionally substituted C$_2$-C$_{15}$ hetero alkenyl, optionally C$_2$-C$_{15}$ alkynyl, optionally substituted C$_2$-C$_{15}$ hetero alkynyl, optionally substituted C$_5$-C$_7$ cycloalkyl, optionally substituted C$_5$-C$_7$ heterocycloalkyl, optionally substituted C$_6$-C$_{18}$ aryl, and optionally substituted C$_6$-C$_{18}$ heteroaryl;

n is an integer from 2 to 200,000;

n1 is an integer from 0 to 25;

n2 is an integer from 0 to 25;

n3 is an integer from 0 to 25;

n4 is an integer from 1 to 12; and n5 is an integer from 1 to 10.

In certain aspects, the polymer is prepared from a bifunctional monomer of formula (II-A):

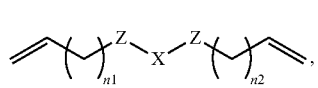   (II-A)

wherein n1 and n2 are each independently an integer from 0 to 25. In the compound of formula (II-A), each Z is independently CH$_2$ or O.

In the compound of formula (II-A), when Z is O, X can be, in some aspects:

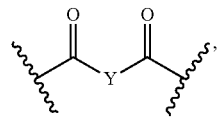

wherein Y is O, C$_6$-C$_{18}$ arylene, or C$_6$-C$_{18}$ heteroarylene;

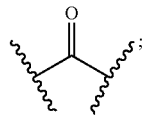

optionally substituted C$_6$-C$_{15}$ arylene;
optionally substituted C$_2$-C$_{15}$ alkylene;
—O—, —S—, or —S—S—;
optionally substituted C$_2$-C$_{15}$ alkylene;

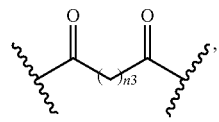

wherein n3 is an integer from 0 to 25;

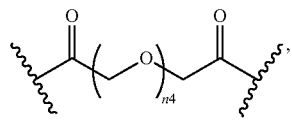

wherein n4 is an integer from 1 to 12;

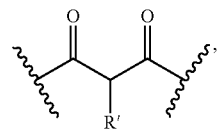

wherein R' is selected from the group consisting of optionally substituted C$_1$-C$_{15}$ alkyl, optionally substituted C$_1$-C$_{15}$ heteroalkyl, optionally substituted C$_2$-C$_{15}$ alkenyl, optionally substituted C$_2$-C$_{15}$ hetero alkenyl, optionally C$_2$-C$_{15}$ alkynyl, optionally substituted C$_2$-C$_{15}$ hetero alkynyl, optionally substituted C$_5$-C$_7$ cycloalkyl, optionally substituted C$_5$-C$_7$ heterocycloalkyl, optionally substituted C$_6$-C$_{18}$ aryl, and optionally substituted C$_6$-C$_{15}$ heteroaryl. In some aspects, R' is selected from the group consisting of

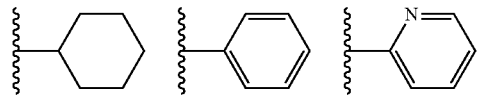

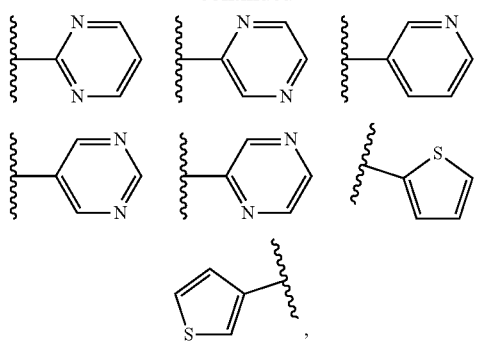

each of which is independently optionally substituted.

In some aspects, X or Y is selected from the group consisting of

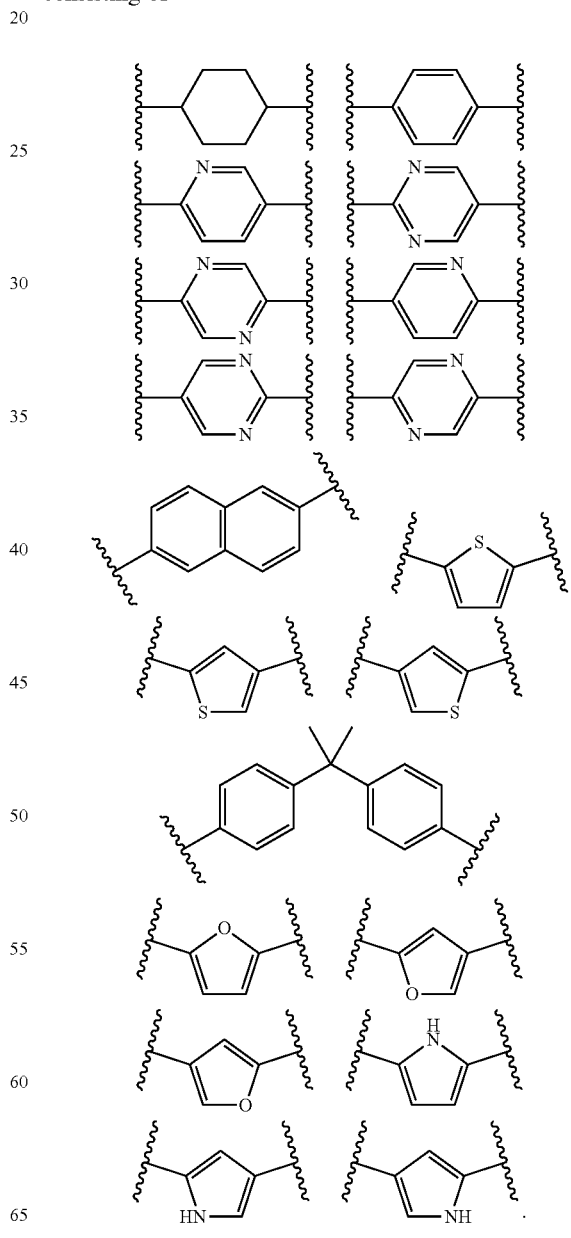

In one aspect, Y is O (oxygen).

In one aspect, n1 is 1 and n2 is 1. In one aspect, each of n1 and n2 is independently 1, 2, 3, 4, or 5. In one aspect, n3 is 0, 1, 2, 3, 4, 5, 6, 7, 8, 9, or 10. In one aspect, n4 is 1.

In the compound of formula (II-A), when Z is $CH_2$, X is, in some aspects —O—, —S—, —S—S—, or optionally substituted $C_2$-$C_{15}$ alkylene. In one aspect, Z is $CH_2$, n1 is 0 and n2 is 0. In one aspect, Z is $CH_2$, n1 is 0, n2 is 0, and X is —$CH_2$—$CH_2$—.

In one aspect, the bifunctional monomer of formula (II-A) is

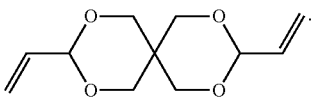

In various aspects, the bifunctional monomer of formula (II-A) is selected from the group consisting of

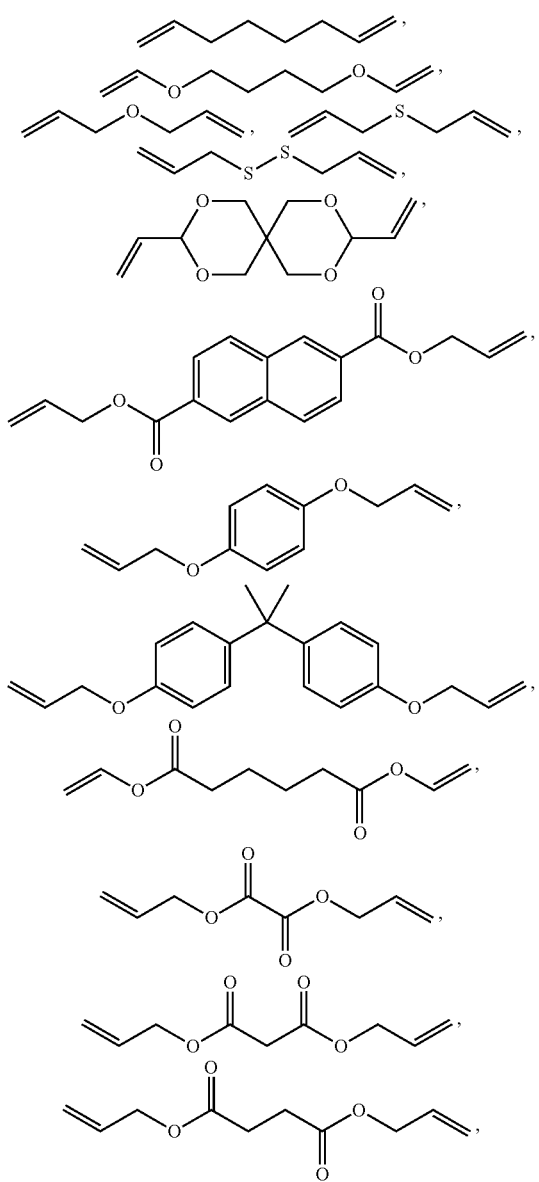

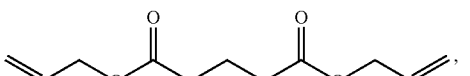

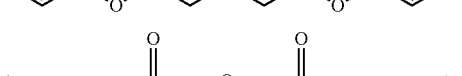

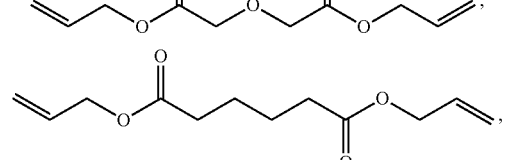

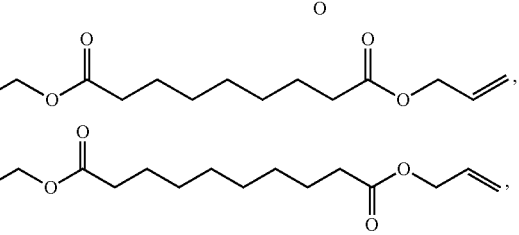

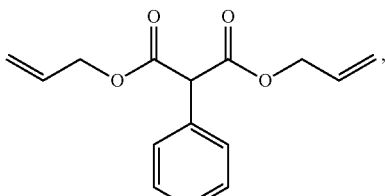

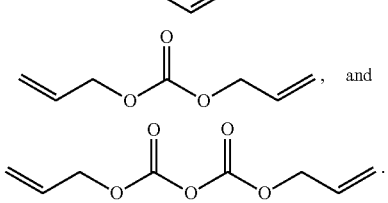

In the monomer of formula (II-A), when X contains multiple sites for attachment, then all combinations of such sites are contemplated herein. For example, if X is phenyl, then 1,2-, 1,3-, and 1,4-substitution of X is contemplated.

In certain aspects, the polymer is prepared from a bifunctional monomer of formula

(III-A)

In the bifunctional monomer of formula (III-A), each A is independently absent, (—$CH_2$—)$_{n5}$, (—$CH_2$—)$_{n5}$-O—C(=O)—, or (—$CH_2CH_2O$—)$_{n5}$, n5 is an integer from 1 to 10, and Q is absent, or at least one of optionally substituted $C_6$-$C_{18}$ arylene, optionally substituted $C_2$-$C_{15}$ alkylene, or a combination thereof. In one aspect, n5 is 1 or 2. In one aspect, A is absent. In one aspect, the bifunctional monomer of formula (III-A) is selected from the group consisting of:

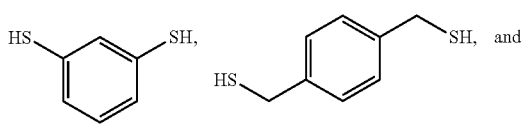

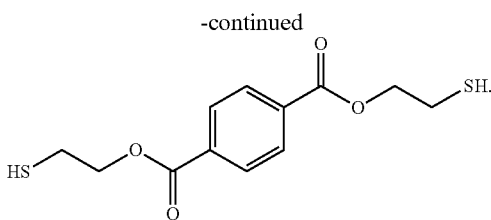

In some aspects, the term "optionally substituted" means optional substitution by 1 to 5 groups independently selected from the group consisting of F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R at each occurrence is independently hydrogen or C$_1$-C$_{10}$ alkyl.

In certain aspects, each occurrence of alkyl, alkenyl, alkynyl, or cycloalkyl is independently optionally substituted with at least one substituent selected from the group consisting of C$_1$-C$_6$ alkyl, C$_3$-C$_8$ cycloalkyl, halo, cyano (—CN), —OR$^a$, optionally substituted phenyl (thus yielding, in non-limiting examples, optionally substituted phenyl-(C$_1$-C$_3$ alkyl), such as, but not limited to, benzyl or substituted benzyl), optionally substituted heteroaryl, optionally substituted heterocyclyl, —C(=O)OR$^a$, —OC(=O)R$^a$, —SR$^a$, —S(=O)R$^a$, —S(=O)$_2$R$^a$, —S(=O)$_2$R$^a$, —S(=O)$_2$NR$^a$R$^a$, —N(R$^a$)S(=O)$_2$R$^a$, —N(R$^a$)C(=O)R$^a$, —C(=O)NR$^a$R$^a$, and —N(R$^a$)(R$^a$), wherein each occurrence of R$^a$ is independently H, optionally substituted C$_1$-C$_6$ alkyl, optionally substituted C$_3$-C$_8$ cycloalkyl, optionally substituted aryl, or optionally substituted heteroaryl, or two R$^a$ groups combine with the N to which they are bound to form a heterocycle.

In certain aspects, each occurrence of aryl or heteroaryl is independently optionally substituted with at least one substituent selected from the group consisting of C$_1$-C$_6$ alkyl, C$_3$-C$_8$ cycloalkyl, phenyl, C$_1$-C$_6$ hydroxyalkyl, (C$_1$-C$_6$ alkoxy)-C$_1$-C$_6$ alkyl, C$_1$-C$_6$ haloalkyl, C$_1$-C$_6$ haloalkoxy, halogen, —CN, —OR$^b$, —N(R$^b$)(R$^b$), —NO$_2$, —C(=O)N(R$^b$)(R$^b$), —C(=O)OR$^b$, —OC(=O)R$^b$, —SR$^b$, —S(=O)R$^b$, —S(=O)$_2$R$^b$, —N(R$^b$)S(=O)$_2$R$^b$, —S(=O)$_2$N(R$^b$)(R$^b$), acyl, and C$_1$-C$_6$ alkoxycarbonyl, wherein each occurrence of R$^b$ is independently H, C$_1$-C$_6$ alkyl, or C$_3$-C$_8$ cycloalkyl, wherein in R$^b$ the alkyl or cycloalkyl is optionally substituted with at least one selected from the group consisting of halogen, —OH, C$_1$-C$_6$ alkoxy, and heteroaryl; or substituents on two adjacent carbon atoms combine to form —O(CH$_2$)$_{1-3}$O—.

In certain embodiments, each occurrence of aryl or heteroaryl is independently optionally substituted with at least one substituent selected from the group consisting of C$_1$-C$_6$ alkyl, C$_3$-C$_8$ cycloalkyl, phenyl, C$_1$-C$_6$ hydroxyalkyl, (C$_1$-C$_6$ alkoxy)-C$_1$-C$_6$ alkyl, C$_1$-C$_6$ haloalkyl, C$_1$-C$_6$ haloalkoxy, halogen, —OR$^b$, —C(=O)N(R$^b$)(R$^b$), —C(=O)OR$^b$, —OC(=O)R$^b$, SR$^b$, —S(=O)R$^b$, —S(=O)$_2$R$^b$, and —N(R$^b$)S(=O)$_2$R$^b$, wherein each occurrence of R$^b$ is independently H, C$_1$-C$_6$ alkyl, or C$_3$-C$_8$ cycloalkyl, wherein in R$^b$ the alkyl or cycloalkyl is optionally substituted with at least one selected from the group consisting of halogen, —OH, C$_1$-C$_6$ alkoxy, and heteroaryl; or substituents on two adjacent carbon atoms combine to form —O(CH$_2$)$_{1-3}$O—.

In certain aspects, the alkyl, alkenyl, alkynyl, cycloalkyl, heteroaryl, heterocyclyl, aryl, or benzyl group is optionally independently substituted with at least one group selected from the group consisting of C$_1$-C$_6$ alkyl; C$_1$-C$_6$ alkoxy; C$_1$-C$_6$ haloalkyl; C$_1$-C$_6$ haloalkoxy; —NH$_2$, —NH(C$_1$-C$_6$ alkyl), —N(C$_1$-C$_6$ alkyl)(C$_1$-C$_6$ alkyl), halogen, —OH; —CN; phenoxy, —NHC(=O)H, —NHC(=O)C$_1$-C$_6$ alkyl, —C(=O)NH$_2$, —C(=O)NHC$_1$-C$_6$ alkyl, —C(=O)N(C$_1$-C$_6$ alkyl)(C$_1$-C$_6$ alkyl), tetrahydropyranyl, morpholinyl, —C(=O)CH$_3$, —C(=O)CH$_2$OH, —C(=O)NHCH$_3$, —C(=O)CH$_2$OMe, or an N-oxide thereof.

Cross-Linked Thermoset Polymers

The polymers described herein, such as the polymers of formula (I) and formula (I-A) can further be cross-linked with a cross-linking agent to form thermoset polymer compositions. In some aspects, the use of a cross-linking agent improves the mechanical properties of the polymers as compared to polymers that are formed without the cross-linking agent.

Suitable cross-linking agents include, but are not limited to:

| Structure | Name |
|---|---|
| | pentaerythritol tetrakis(mercaptoacetate) (PETMP) |
| | trimethylolpropane tris(3-mercaptopropionate) (TMPTMP) |

-continued

| Structure | Name |
|---|---|
| | pentaerythritol tetrakis(3-mercaptopropionate) (PET3MP) |
| | 1,3-bis(2-mercaptoethylthio)-2-mercaptopropane (trithiol) |
| | 2,4,6-triallyloxy-1,3,5-triazine (TAT) |
| | 1,3,5-triallyl-1,3,5-triazine-2,4,6-(1H,3H,5H)-trione (TATATO) |
| | triallyl 1,3,5-benzenetricarboxylate (TABT) |
| | triallyl trimellitate (TATM) |

| Structure | Name |
|---|---|
| (structure) | diallyl itaconate (DAI) |
| (structure) | benzene-1,3,5-triyltrimethanethiol |
| (structure) | benzene-1,3,5-trithiol |
| (structure) | benzene-1,2,4,5-tetrayltetramethanethiol |
| (structure) | benzene-1,2,4,5-tetrathiol |
| (structure) | 2,2-bis(mercaptomethyl)propane-1,3-dithiol |
| (structure) | 2-ethyl-2-(mercaptomethyl)propane-1,3-dithiol |

Other suitable cross-linking agents include Di-PETMP (dipentaerythritol hexakis(3-metcaptopropionate)), TEMPIC (tris[(3-mercaptopropionyloxy)-ethyl]-isocyanurate), ETTMP 700/1300 (Ethoxylated trimethylolpropane tri (3-mercaptopropionate)), PPGMP 800/2200 (Propyleneglycol 3-mercaptopropionate), and glyoxal bis(diallyl acetal). In some aspects, the cross-linking agent is selected from the group consisting of trimethylolpropane tris(3-mercaptopropionate) (TMPTMP), pentaerythritol tetrakis(3-mercaptopropionate) (PETMP), 1,3,5-triallyl-1,3,5-triazine-2,4,6(1H, 3H,5H)-trione (TATATO), 2,4,6-triallyloxy-1,3,5-triazine (TAT), triallyl trimellitate (TATM), and triallyl 1,3,5-benzenetricarboxylate (TABT).

Figure 12:
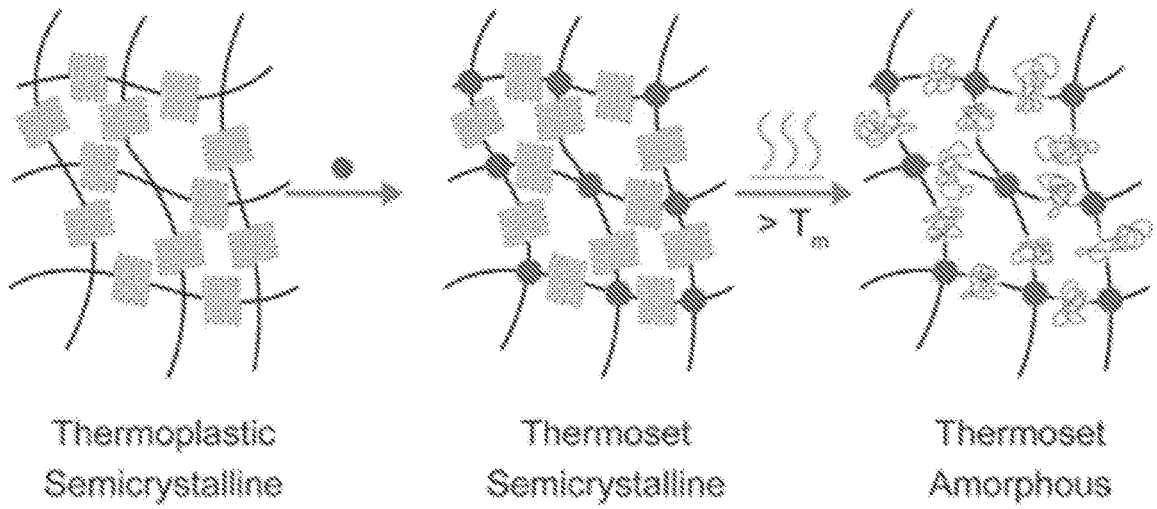
FIG. 12 shows a schematic of the photopolymerization approach used produce semicrystalline, crosslinked thiol-ene materials to improve the mechanical performance of printed components.
Figure 12:
Figure 12:
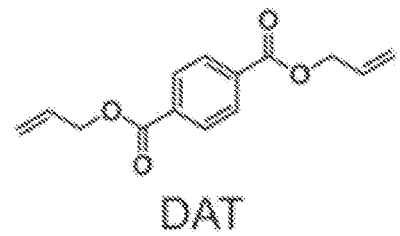
Figure 12:
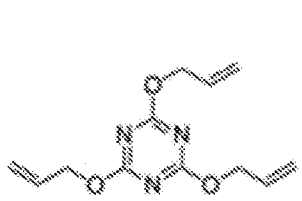
Figure 12:
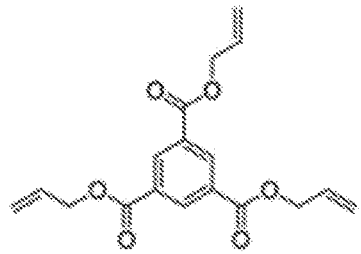
Figure 12:
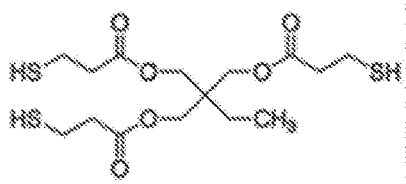
Figure 12:
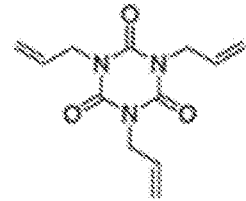
Figure 12:
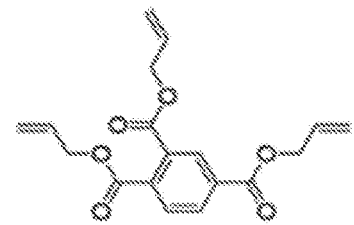
Figure 12:
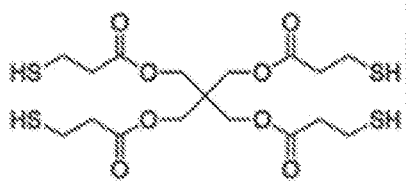

In this work, small amounts of a cross-linking agent were incorporated into a stoichiometric thiol-ene resin formulation as a means to manipulate the polymerization-induced crystallization process, facilitate adhesion between the layers, and ultimately control the bulk mechanical property performance through alterations in the monomer composition (FIG. 12). Polymerization kinetics, crystallization rates and amounts, and modulus development post-polymerization were analyzed to assess structure-property relationships in these materials. Formulations with low cross-linking agent concentrations were 3D printed and mechanically contrasted with the original linear, thermoplastic thiol-ene resins. In some aspects the amount of cross-linking is from about 1 to 20 mol %. In one aspect, the amount of cross-linking agent in the formulations described herein is about 1, 2, 3, 4, 5, 6, 7, 8, 9, 10, 11, 12, 13, 14, 15, 16, 17, 18, 19, or about 20 mol %. The cross-linking agent, in some aspects, is added to a composition comprising monomers of formula (II) and formula (III) or of a composition comprising monomers of formula (II-A) and formula (III-A), or combinations thereof. In some aspects, the amount of cross-linking agent in the formulations is about 5 to 10 mol %. As an example, when the amount of cross-linking agent is 5 mol %, the formulation using formula (II) and formula (III) monomers has a ratio of formula(III):formula(II):cross-linking agent of 1:0.95:0.05. The analogous ratio would be present in a formulation using formula (II-A) and formula (III-A).

Continuous thermal treatment post-manufacture was applied to the thermoplastic and crosslinked prints and investigated as a means to further enhance the final mechanical properties. Examples of annealing in literature previously employed heat at temperatures between the glass transition temperature ($T_g$) and $T_m$, which improved yield strength and tensile modulus. Advantageously, in some aspects, the addition of crosslinking to the resin permitted heating at temperatures well above $T_m$ without significant physical deformation of the print. Changes in crystallinity for the crosslinked system with thermal conditioning were monitored, and potential structure-property relationships are proposed.

The substantial mechanical improvements observed after thermally conditioning the crosslinked prints was initially attributed to a combination of recrystallization post-heating and improved adhesion between the individual printed layers. Enhanced crystallization is known to improve mechanical properties, and thus DSC was used to approximate the extent of crystallization for each temperature explored for printed samples with 10 mol % TAT. While annealing at or below $T_m$ previously increased the degree of crystallinity, no significant change (~1-3% more crystalline after conditioning relative to equivalent untreated sample) in crystallinity occurred and thus recrystallization was not responsible for the improved mechanical performance.

However, surprisingly and unexpectedly, the macroscopic fusion of the individual layers into a continuous part was the primary source of the enhancement. At the low crosslinking densities explored herein, the material remained semicrystalline, thus facilitating a reciprocal relationship between the chemically crosslinked network and the crystalline scaffold. Initially, rapid polymerization and subsequent crystallization of the individual layers prevented sufficient interlayer adhesion, which was further exacerbated by the oxygen insensitivity that is inherent to thiol-enes. However, and without being bound by theory, melting the crystalline domains promoted fusion between the printed layers, while the crosslinked network provided a permanent skeleton for recrystallization post-heating. In doing so, the interfacial stresses between layers were also removed, and the conditioned printed samples were able to withstand the stresses induced during cold-drawing.

The cross-linked and non-cross-linked polymers described herein a useful in photo-based printing applications. In some aspects, the polymers described herein are useful in printing applications such as inkjet writing and volumetric 3D printing.

Methods of Synthesizing Polymers of Formula (I) and Formula (I-A)

In another aspect, this disclosure provides herein a method of synthesizing the polymer of formula (I), (I)

wherein the method is a continuous-phase polymerization, and
wherein the method comprises irradiating a mixture of a monomer of formula (II), a monomer of formula (III), and a photoinitiator to form a continuous-phase composition.

In another aspect, the disclosure provides herein a method of synthesizing the polymer of formula (I-A), (I-A)

wherein the method comprises a continuous-phase polymerization, and
wherein the method comprises irradiating a mixture of a monomer of formula (II-A), a monomer of formula (III-A), and a photoinitiator to form a continuous-phase composition. In some aspects, the mixture of a monomer of formula (II), a monomer of formula (III), and photoinitiator also includes at least one cross-linking agent as described herein. In some aspects, the mixture of a monomer of formula (II-A), a monomer of formula (III-A), and photoinitiator also includes at least one cross-linking agent as described herein.

In one aspect, the polymer is prepared from a monomer of formula (II) or (II-A) and a monomer of formula (III) or (III-A).

In certain aspects, the mixture is not an emulsion.

In certain aspects, the mixture is irradiated with an UV radiation having wavelength of about 380 nm to about 410 nm. In certain aspects, the continuous-phase composition is irradiated with UV radiation having wavelength of about 385 nm. In certain aspects, the continuous-phase composition is irradiated with UV radiation having wavelength of about 390 nm. In certain aspects, the continuous-phase composition is irradiated with UV radiation having wavelength of about 395 nm. In certain aspects, the continuous-phase composition is irradiated with UV radiation having wavelength of about 400 nm. In certain aspects, the continuous-phase composition is irradiated with UV radiation having wavelength of about 405 nm. In certain aspects, the continuous-phase composition is irradiated with UV radiation having wavelength of about 410 nm.

In certain aspects, the irradiation time of the continuous-phase composition is about 2 seconds to about 30 seconds. In one aspect, the irradiation time of the continuous-phase composition is about 2 30 seconds. In certain aspects, the irradiation time is about 5 seconds. In certain aspects, the irradiation time is about 10 seconds. In certain aspects, the irradiation time is about 15 seconds. In certain aspects, the irradiation time is about 20 seconds. In certain aspects, the irradiation time is about 25 seconds. In certain aspects, the irradiation time is about 30 seconds.

In certain aspects, the polymer is synthesized at a temperature of about 15° C. to about 40° C. In certain aspects, the polymer is synthesized at a temperature of about 20° C. In certain aspects, the polymer is synthesized at a temperature of about 25° C. In certain aspects, the polymer is synthesized at a temperature of about 30° C. In certain aspects, the polymer is synthesized at a temperature of about 35° C. In certain aspects, the polymer is synthesized at a temperature of about 40° C.

In certain aspects, the step of irradiation is performed at using LED light having intensity of 1 mW/cm² to about 10 mW/cm². In certain aspects, the step of irradiation is performed at using LED light having an intensity of about 1, 2, 3, 4, 5, 6, 7, 8, 9, or about 10 mW/cm².

In certain aspects, the polymerization occurs predominantly via thiol-ene step-growth mechanism. In certain aspects, homopolymerization of the monomers described herein is nil or insignificant, or does not produce analytically measureable amounts of homopolymers of the monomers. In certain aspects, the photoinitiator can be any of the photoinitiators described herein.

Kits

In yet another aspect, the disclosure provides a kit comprising the composition described herein and an instructional material comprising instructions for using the composition. In certain aspects, the composition can be any of the compositions described herein.

Those skilled in the art will recognize, or be able to ascertain using no more than routine experimentation, numerous equivalents to the specific procedures, aspects, claims, and examples described herein. Such equivalents were considered to be within the scope of this disclosure and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present disclosure. Moreover, all values that fall within these ranges, as well as the upper or lower limits of a range of values, are also contemplated by the present application.

The following examples further illustrate aspects of the present disclosure. However, they are in no way a limitation of the teachings or disclosure set forth herein.

EXPERIMENTAL EXAMPLES

The disclosure is further described in detail by reference to the following experimental examples. These examples are provided for purposes of illustration only, and are not intended to be limiting unless otherwise specified. Thus, the disclosure should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present disclosure and practice the claimed methods. The following working examples therefore, specifically point out the preferred aspects of the present disclosure, and are not to be construed as limiting in any way the remainder of the disclosure.

Example 1: Process of Forming Thermoplastic Photopolymers

A series of in-situ experiments were conducted to gain fundamental insight on the various processes occurring in these photopolymerizable thermoplastic systems with 1,6-hexane dithiol (HDT) and diallyl terephthalate (DAT) used as a representative system (hereon referred to as the 'HDT-DAT' system), as shown in FIG. 1A.

Figure 1B:
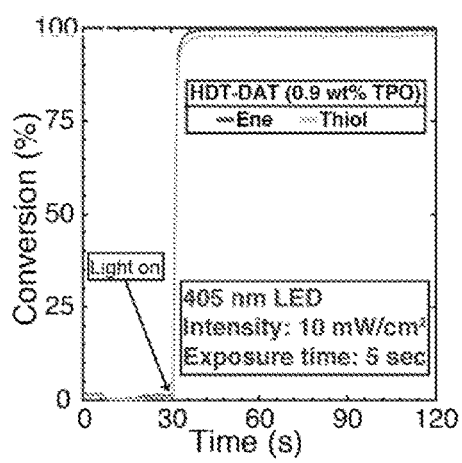

Achieving sufficiently high molecular weights in linear step-growth photopolymerizations requires rapid reaction kinetics to quantitative conversions. As shown in FIG. 1B, this was confirmed using real-time Fourier transform infrared spectroscopy (FTIR) by monitoring the swift disappearance of both characteristic SH and C=C peaks upon 405 nm LED irradiation using modest exposure intensities (1-10 mW/cm$^2$). Furthermore, as evident in FIG. 1B, the effectively identical kinetic profiles of both thiol and ene groups suggests an archetypal step growth process with minimal to no vinyl homopolymerization observed.

Figure 1C:
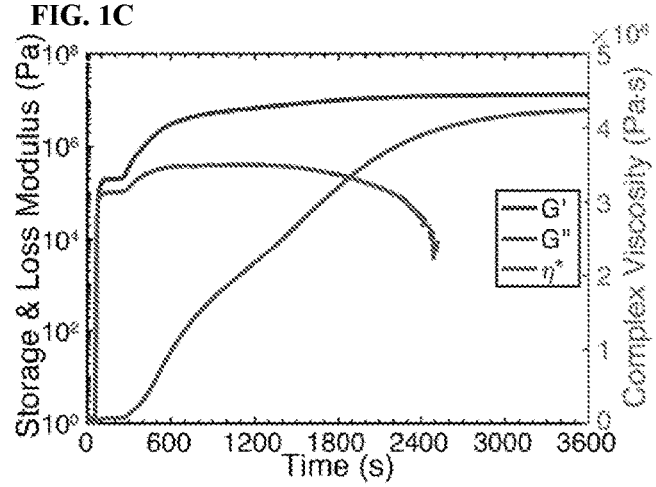

Next, as shown in FIG. 1C, the modulus development of the thermoplastic photopolymer system was studied with real-time photo-rheology to measure both storage (G') and loss moduli (G") upon identical 405 nm irradiation conditions. Moduli increased dramatically due to the photopolymerization with a G'-G" crossover (indicative of solid-like behavior) observed. However, storage modulus continues to increase further well after the polymerization timescale before eventually hitting a plateau value. This is also reflected in a dramatic concurrent increase in the complex viscosity of the system as shown on the secondary y-axis of FIG. 1C. Based on this rheological data and independent observation of changes in physical appearance of the formed polymer, i.e. going from transparent to translucent to white, it was deduced that the crystallization was occurring.

Example 2: Crystallinity and Linearity

Figure 1D:
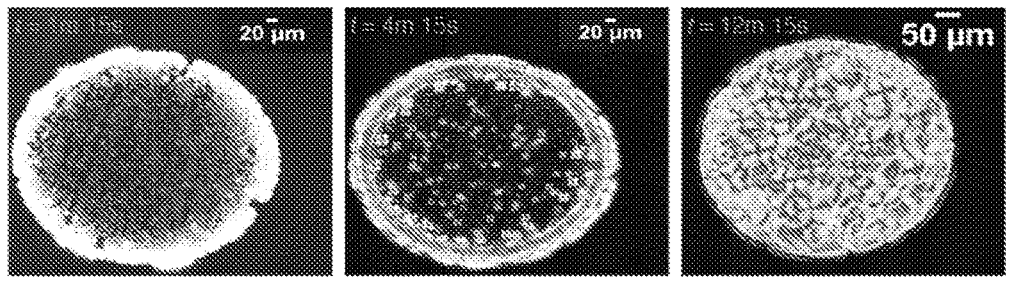

In-situ polarized microscopy imaging of the photopolymerization and crystallization processes was conducted with a series of representative time points, presented in FIG. 1D, showing the development of characteristic spherulites over several minutes—well after the polymerization timescale as determined from real-time FTIR. Initial spherulites were observed to grow preferentially at the exposure interface presumably due to favorable heterogenous nucleation. After this initial growth, spherulites coalesce inwards until they impinge on each other with the inner centroid developing at a much later time point. The ability and propensity for crystallization in these particular thiol-ene systems can be explained by the fast reaction kinetics and quantitative conversions that result in long polymer chains with high degrees of linear symmetry. Thus, produced polymers are expected to be minimally branched with high degrees of stereoregularity and a regular step-growth configuration (i.e. marginal homopolymerization). Furthermore, crystallization is promoted by the combination of the flexible alkyl chains to organize the intermolecular dipole-dipole interactions between the polar carbonyl groups as well as the regular $\pi$-$\pi$ stacking of the benzene rings present along the main chain. Systems that used the 1,2-substituted (diallyl phthalate) and 1,3-substituted (diallyl isophthalate) structural isomers instead of DAT were not observed to be crystalline. Classically, spherulite formation (crystallization) in polymers have been observed from melts or solutions with large undercooling ($\Delta T = T_m - T_c$, the difference between melting and crystallization temperatures). However, here the crystallization of a polymer formed and kept at ambient temperature with minimal undercooling involved (polymerization exotherm) was demonstrated.

Figure 2A:
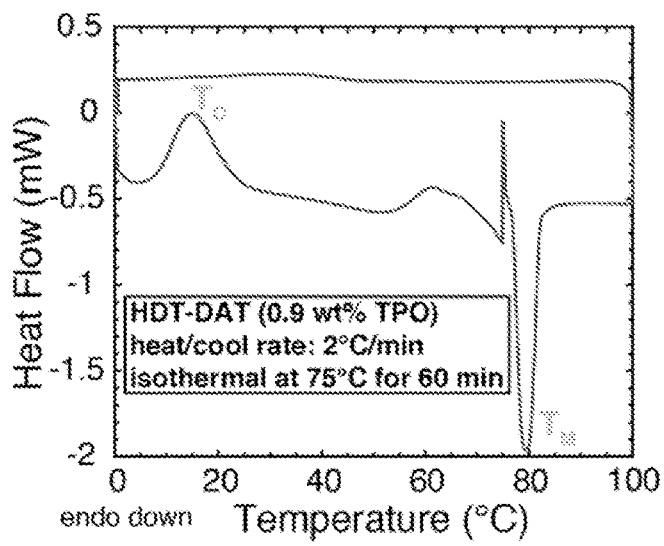
FIGS. 2A-2C illustrate thermal transitions, molecular weight and mechanical properties of HDT-DAT photopolymerizable thermoplastic system.

While the presence of crystallinity is generally indicative of linear polymers, the formation of a linear polymer (as opposed to a crosslinked polymer) can be unequivocally confirmed from either its ability to melt and flow, or dissolution in a suitable solvent. Both tests were individually performed verifying this to be the case. First, as shown in FIG. 2A, dynamic scanning calorimetry (DSC) using standard heat-cool-heat ramp cycles confirmed both a relatively sharp melting endotherm with a peak of 78° C. and a broader exothermic transition of crystallization between 7 and 22° C. Certainly, the detection of distinct first-order phase transitions (i.e. melting and crystallization) strongly supports the notion of semicrystalline linear polymers being produced from these rapid thiol-ene photopolymerizations. Furthermore, solubility tests were conducted in a variety of common organic solvents with good solubility confirmed in THF and DCM (dichloromethane).

Example 3: Mechanism of Polymerization

Figure 2B:
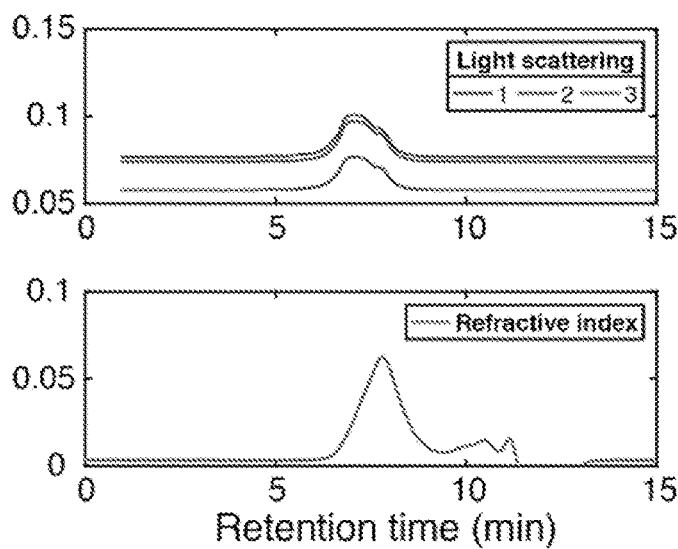

As high molecular weights are the defining characteristic for functionally useful thermoplastics, absolute molecular weight (MW), dispersity and chain morphology (degree of branching) of photopolymerized thermoplastics were determined using size-exclusion chromatography with multi-angle light scattering and differential viscometry (SEC-MALS-IV) in tetrahydrofuran (THF). A representative plot for HDT-DAT is shown in FIG. 2B, corresponding to number-average molecular weights on the order of $10^4$ g/mol. Based on log-log plots of intrinsic viscosity ($\eta$) versus molar mas (M) (i.e. Mark-Houwink-Sakurada plots), a random coil morphology was determined with an exponent of 0.55. These results are consistent with the observed tendency towards crystallization. According to the Carothers equation, achieving these molecular weights in a linear step-growth system (corresponding to degree of polymerizations approaching 100) would entail near-perfect stoichiometric balance (r=1) and conversions of about 99% or greater.

Generally speaking, these parameters are unattainable for most polymerization methods let alone seconds long photopolymerizations. Without being bound by theory, possible explanations of these molecular weight results include: i) a pure thiol-ene step-growth polymerization, ii) a predominantly thiol-ene with some minor homopolymerization of the diallyl ester, or iii) significant ene homopolymerization. The former is unlikely because commercial monomers were used as received without further purification and would result in a stoichiometric imbalance between thiol and ene even if the monomers were weighed out perfectly (which they certainly were not). The latter explanation is also effectively ruled out by the solubility of the polymer in organic solvent as a diallyl homopolymerization would produce intractable covalently crosslinked networks. Therefore, it was deduced that it is most probable that a thiol-ene step-growth is the predominant polymerization mechanism with further increases in molecular weight supported by the homopolymerization of any residual ene groups to produce linear polymers with low degrees of branching.

Thiol-vinyl ester photopolymerizations proceed significantly faster than the vinyl ester homopolymerization and can even match the reactivity kinetics of acrylates. This may be attributed to the differences in resonance stabilizations leading to different monomer and radical reactivities. Vinyl ester radicals, as opposed to acrylate radicals, lack significant resonance stabilization and are thus prone to hydrogen abstraction making them relatively poor chain-growth monomers but excellent thiol-ene step-growth monomers. The allyl esters appear to behave similarly. Allyl esters have the further advantage of being widely available commercially due to their synthetic accessibility. In this regard, it is also foreseeable that additional photopolymerizable thermoplastic systems analogous to other high performance polyesters such as poly(ethylene naphthalate) or poly(butylene succinate) can be arrived at in scale. Therefore, while relatively less studied than other vinyls (such as allyl ethers, vinyl ethers and norbornenes), both allyl and vinyl esters represent attractive ene groups that can be used in thiol-ene applications.

Example 4: Characterization of HDT-DAT

Figure 2C:
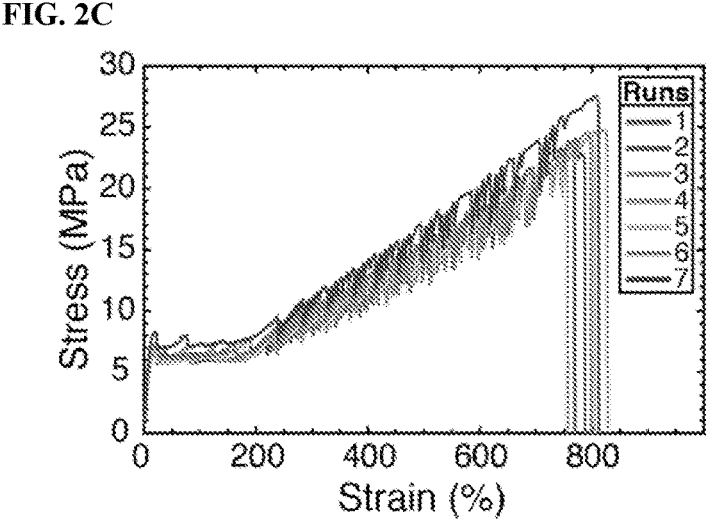

It is well established that thermoplastic polymers only develop sufficiently high and useful mechanical properties at critical molecular weight values. To verify the molecular weights measured via SEC-MALS-IV were sufficiently high for practical use, uniaxial tensile testing of 150 µm thick HDT-DAT dogbones (ASTM Type V) were conducted with the key mechanical properties summarized in Table 1. As shown in the engineering stress-strain plot in FIG. 2C, characteristic necking followed by significant amounts of strain hardening was observed to occur at elastomeric-like elongations (~800%) suggesting significant amounts of entanglements of the amorphous phase. Interestingly, HDT-DAT exhibited a peculiar plastic deformation mechanism consisting of periodic reductions in stress at elevated strains. This was physically observed on the deformed sample as intermittent striations with alternating lines of white, opaque regions and transparent regions. Overall, these semicrystalline high polymers exhibited extremely ductile behavior achieving ultimate tensile strengths of about 24 MPa. In this respect, photopolymerizable thermoplastics form a distinct class of polymeric materials.

TABLE 1

Summarized mechanical properties of HDT-DAT obtained from the stress-strain behavior due to uniaxial tensile tests performed at a strain rate of 5 mm/min.

| Stoichiometric HDT-DAT photopolymerizable thermoplastic | |
|---|---|
| Young's modulus (MPa) | 74.6 ± 5.2 |
| Yield strength (MPa) | 7.17 ± 0.57 |
| Ultimate tensile strength (MPa) | 24.4 ± 1.6 |
| Failure strain (%) | 793 ± 25 |
| Toughness (MJ/m$^3$) | 102 ± 9 |

Example 5: SLA-3D Printing Resins

Figure 3B:
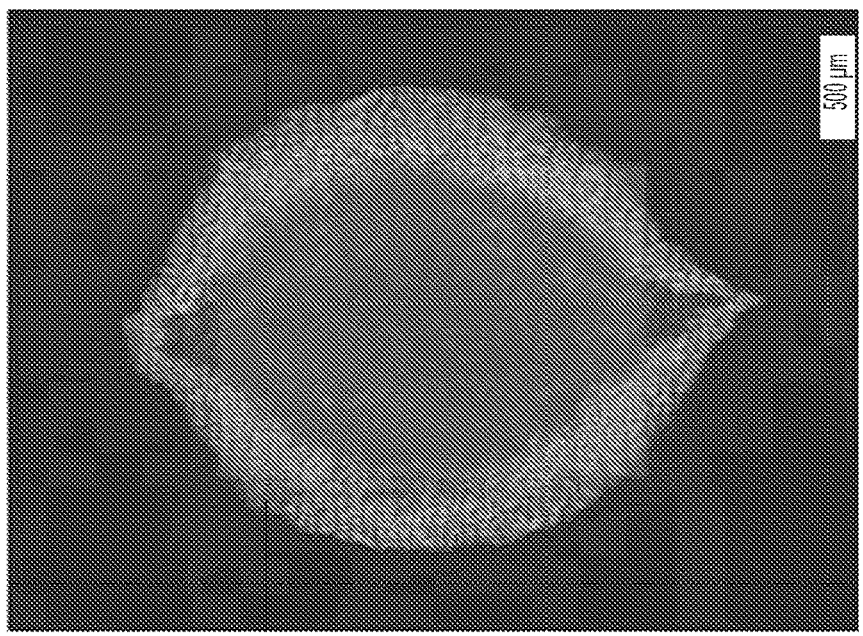
FIGS. 3A-3D illustrate photo-patterning via digital light processing (DLP) and a scanning laser, as well as 3D printing and melting of HDT-DAT photo-polymerizable thermoplastics.
Figure 3A:
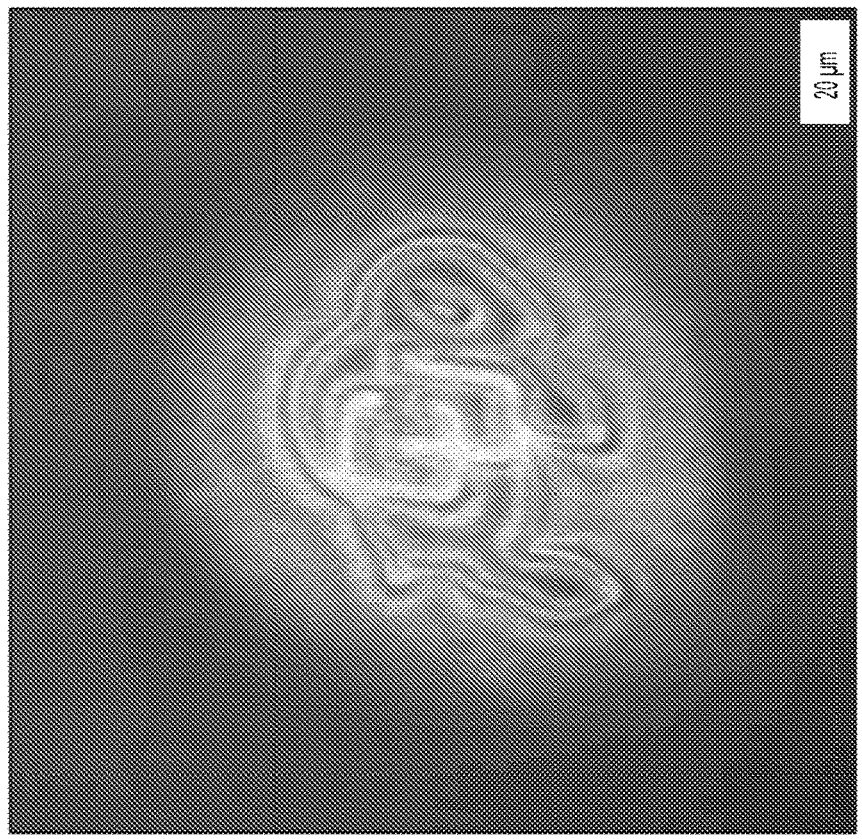
Figure 3C:
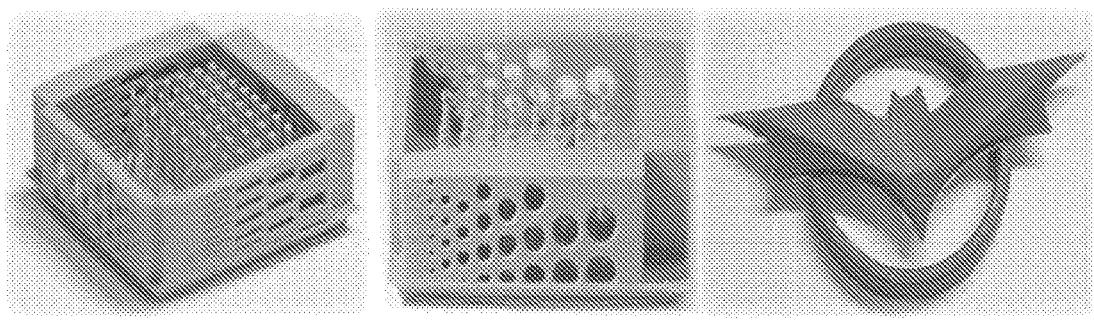

The HDT-DAT system was used to assess the viability of photopolymerizable thermoplastics as SLA 3D printing resins. This was validated by using a commercial digital light processing (DLP) as well as a scanning laser microscope to record arbitrary patterns on the same HDT-DAT system. With DLP patterning, a well resolved structure (a buffalo) was successfully patterned using a low intensity 400 nm LED as evident in the left image of FIG. 3A. However, in the case of patterning with a high intensity scanning laser, a noticeable 'over-cure' was observed as seen in the differential interference contrast image in FIG. 3B whereby spherulites formed within tens of seconds of irradiation outside the intended red shaded square irradiation pattern. Without being bound by theory, this can be explained by the combination of rapid polymerization within a low viscosity medium without any significant inhibiting species to confine reaction-diffusion. This suggests spatial resolution control (i.e. control over the crystallization) in photopolymerizable thermoplastics can be highly dependent on exposure intensity. To address this, carbon black was used as a photoabsorber in an otherwise unoptimized SLA 3D printing formulation. As shown in FIG. 3C, using a commercial DLP-based 3D printer, decent spatial resolutions were obtained from a standard quality control ('QC') test print in addition to other simple objects.

Figure 3D:
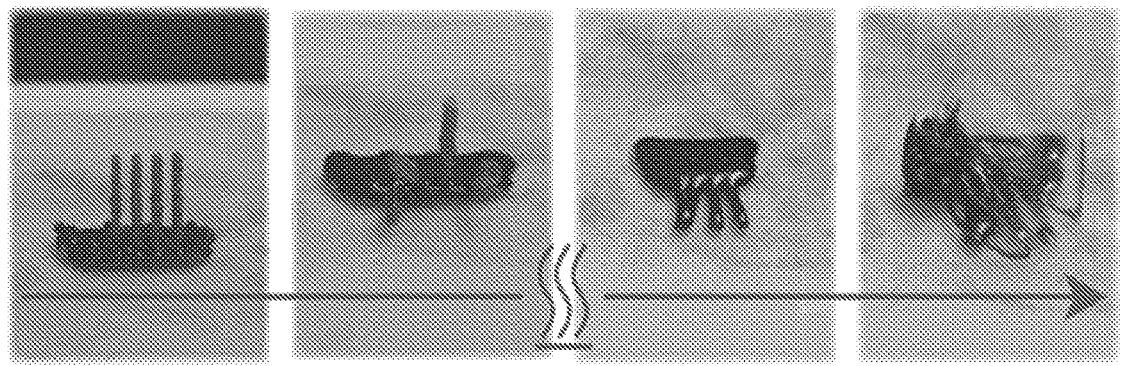
Figure 4:
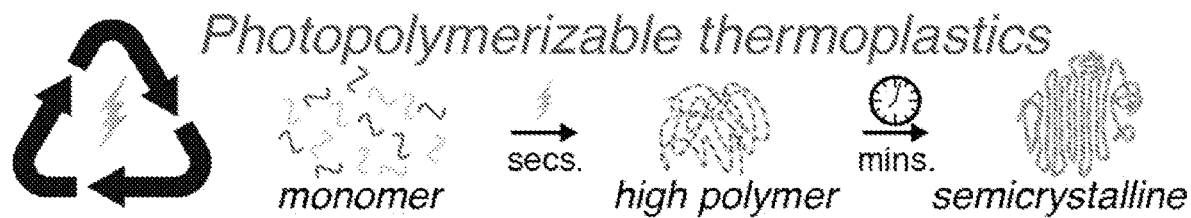
FIG. 4 illustrates a schematic of synthesis of certain thermoplastics of the invention.
Figure 5:
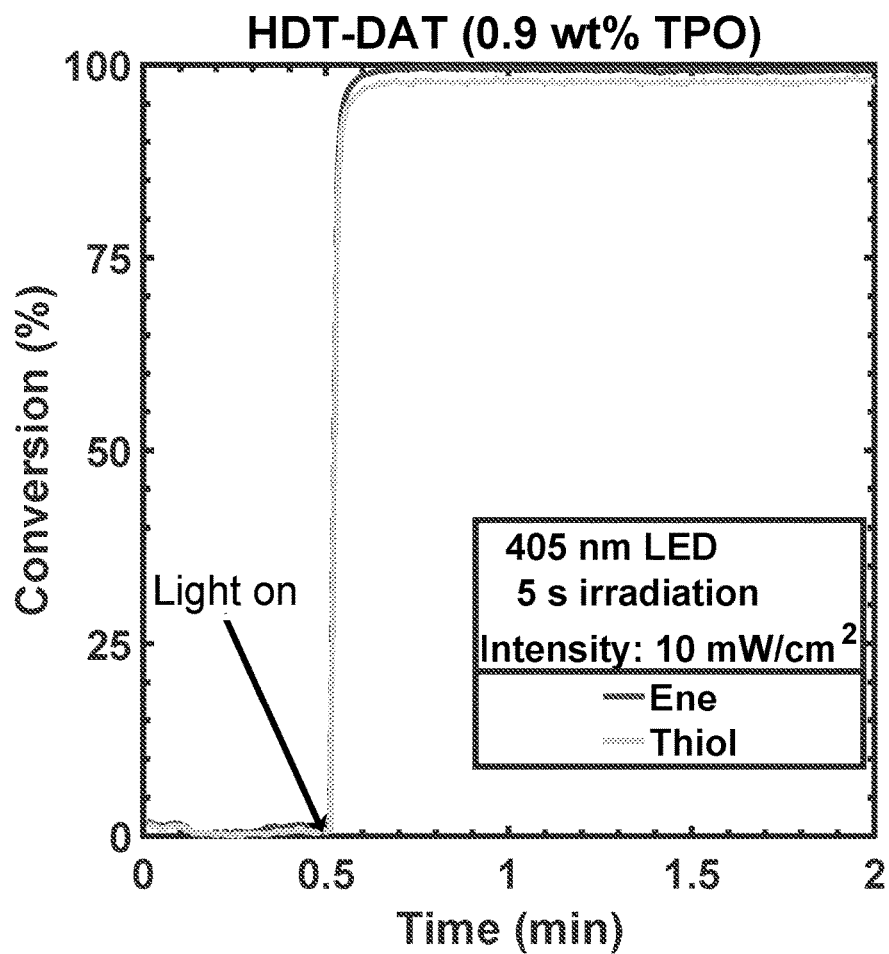
FIG. 5 illustrates FTIR spectra showing kinetics of monomer to polymer conversion for 1,6-hexanedithiol (HDT) and diallyl terephthalate (DAT) monomers in the presence of TPO photoinitiator.
Figure 6:
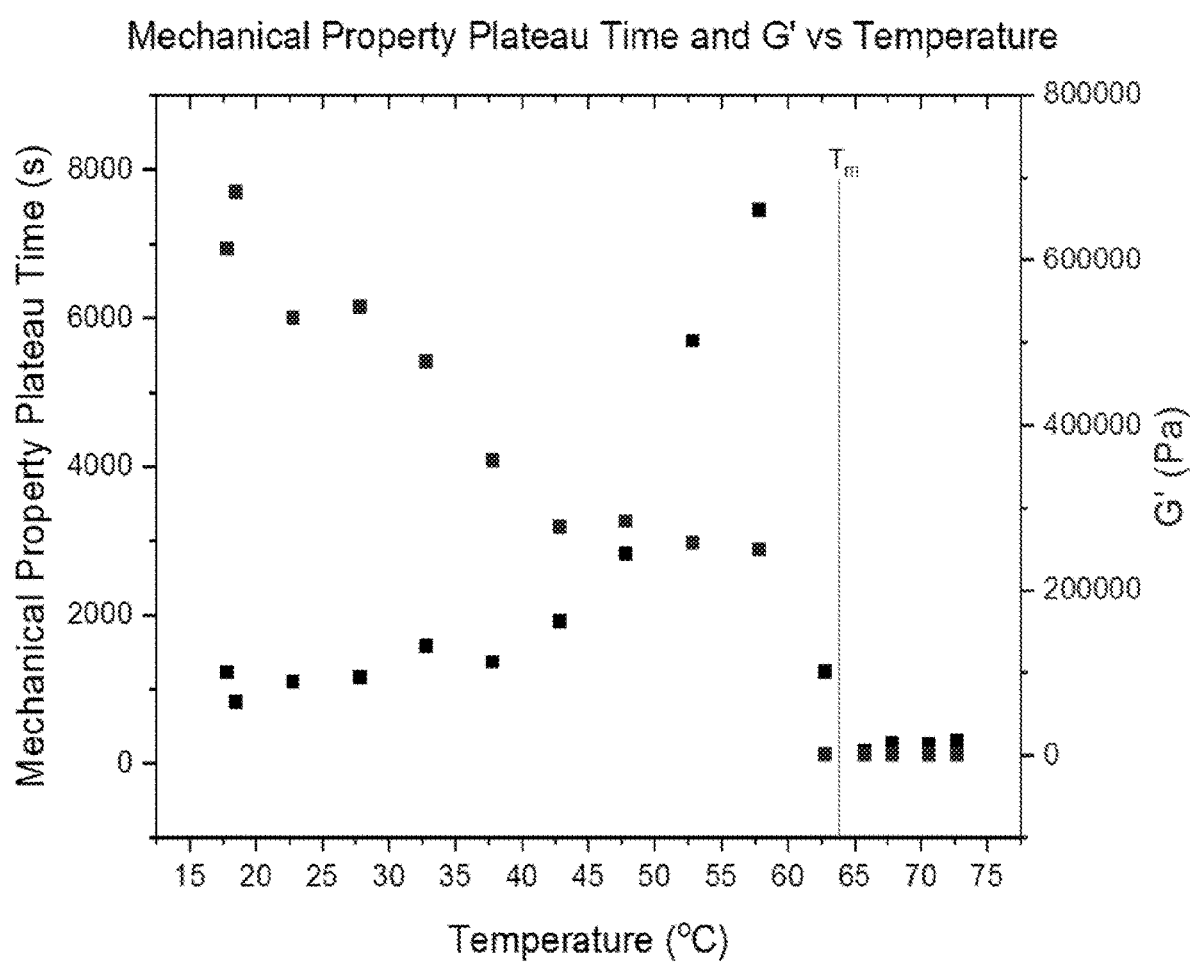
FIG. 6 illustrates a graph showing mechanical property plateau and G' vs temperature for HDT-DAT polymer.
Figure 7:
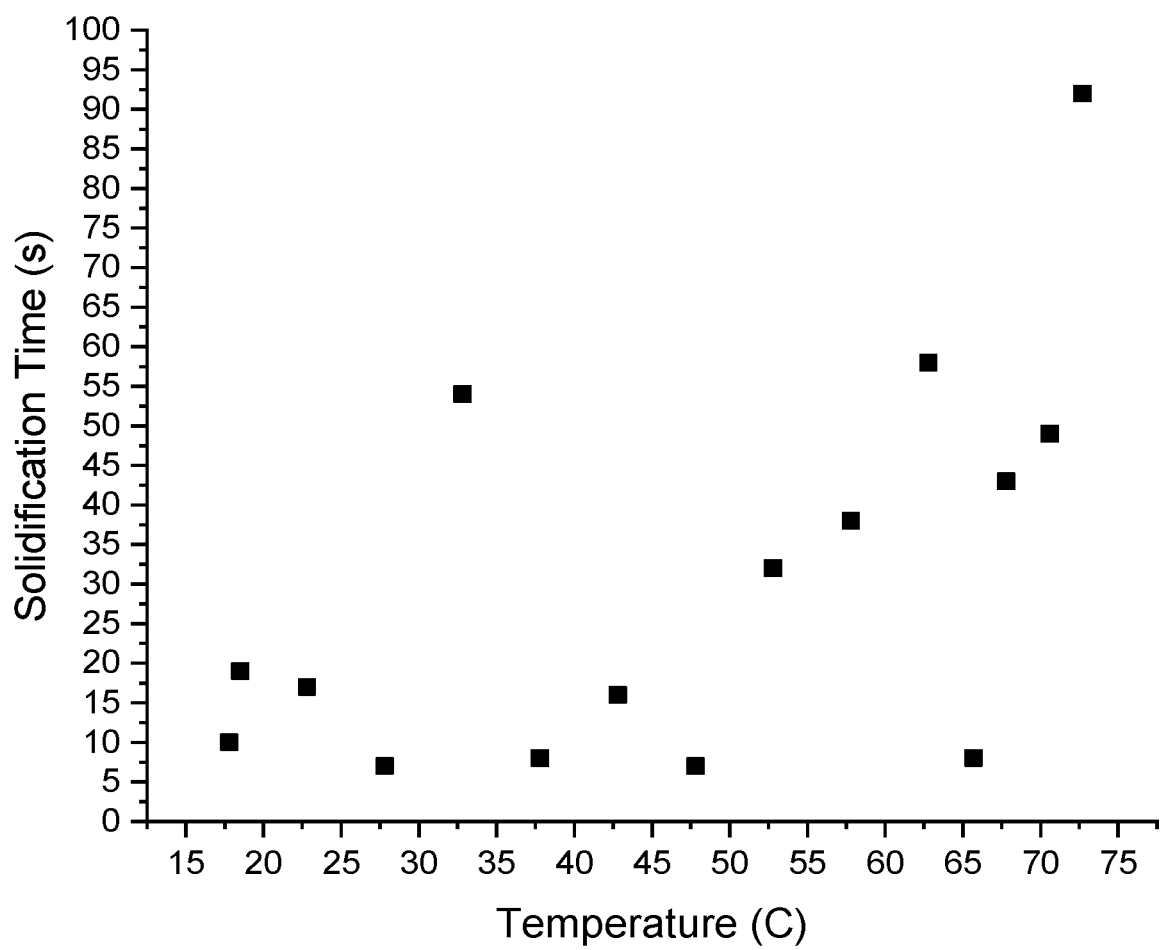
FIG. 7 illustrates a graph showing solidification time vs temperature for the HDT-DAT polymer.
Figure 8:
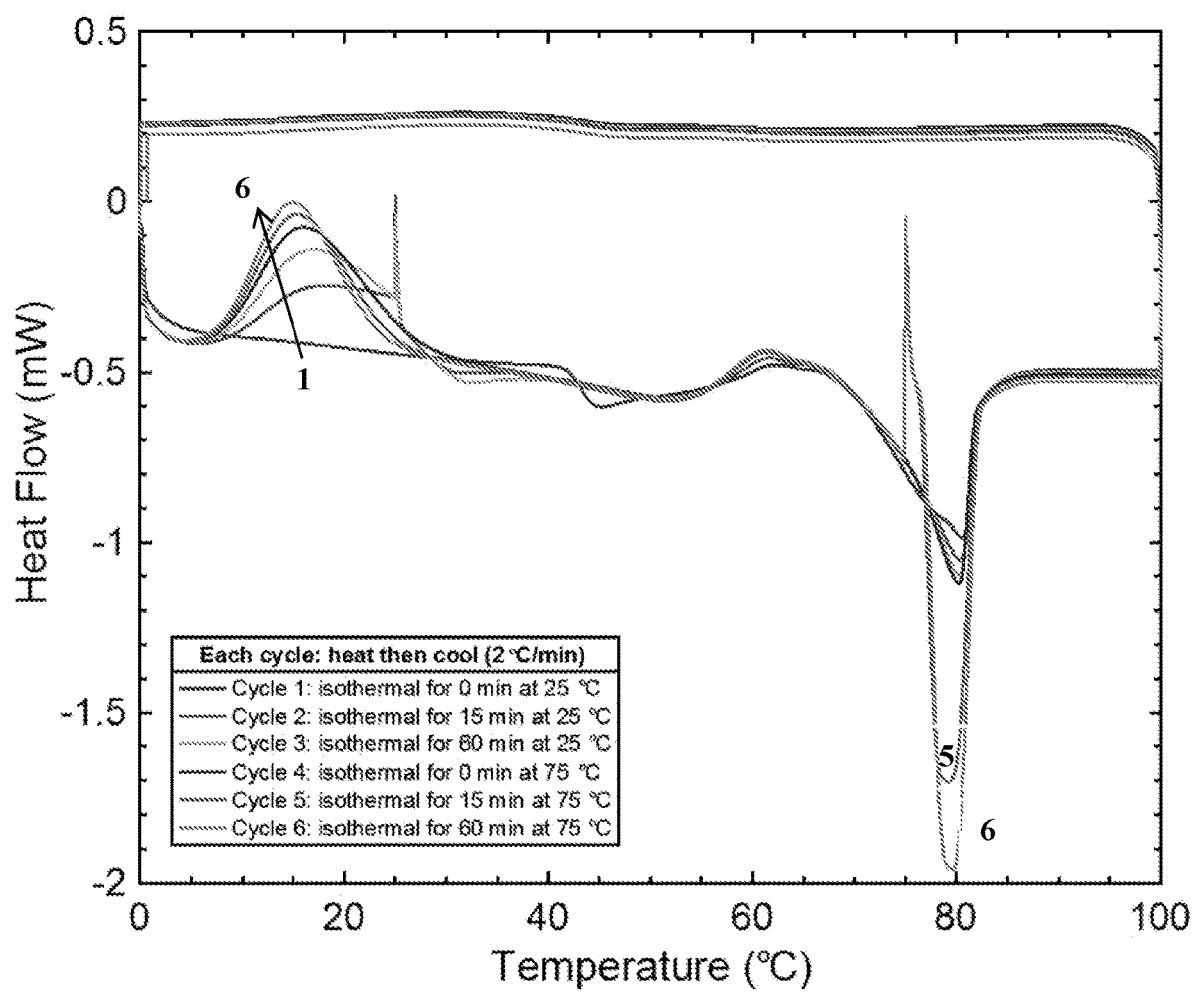
FIG. 8 illustrates a graph from differential scanning calorimetry (DSC) showing semi-crystallinity of HDT-DAT polymer.
Figure 9:
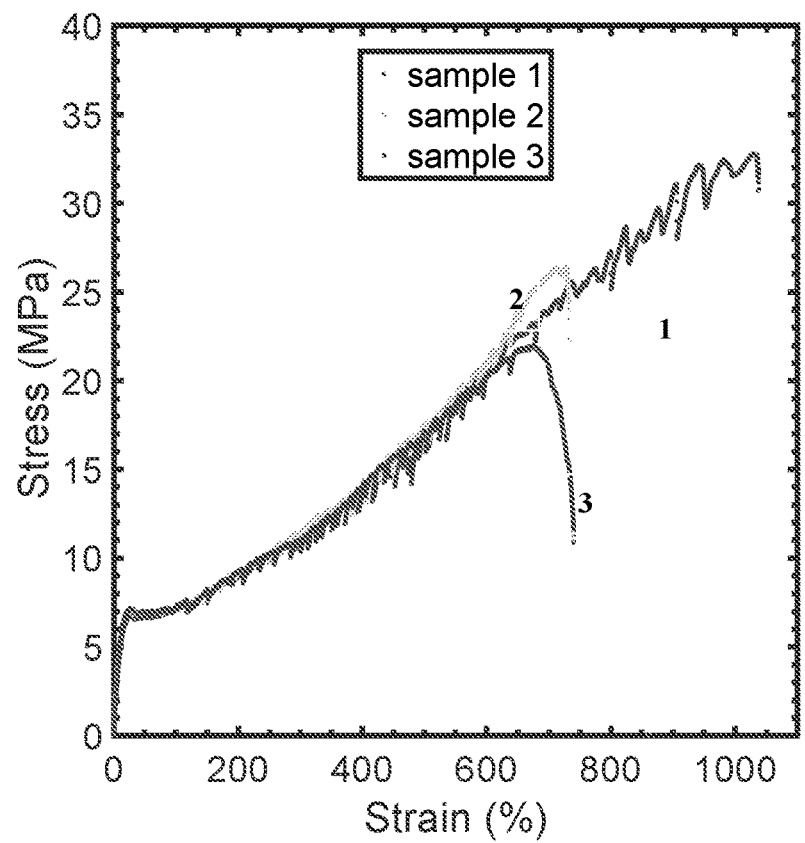
FIG. 9 illustrates a graph of stress vs strain for HDT-DAT polymer.
Figure 10:
FIG. 10 illustrates an image showing photo-patterning using digital light processing (DLP).
Figure 11A:
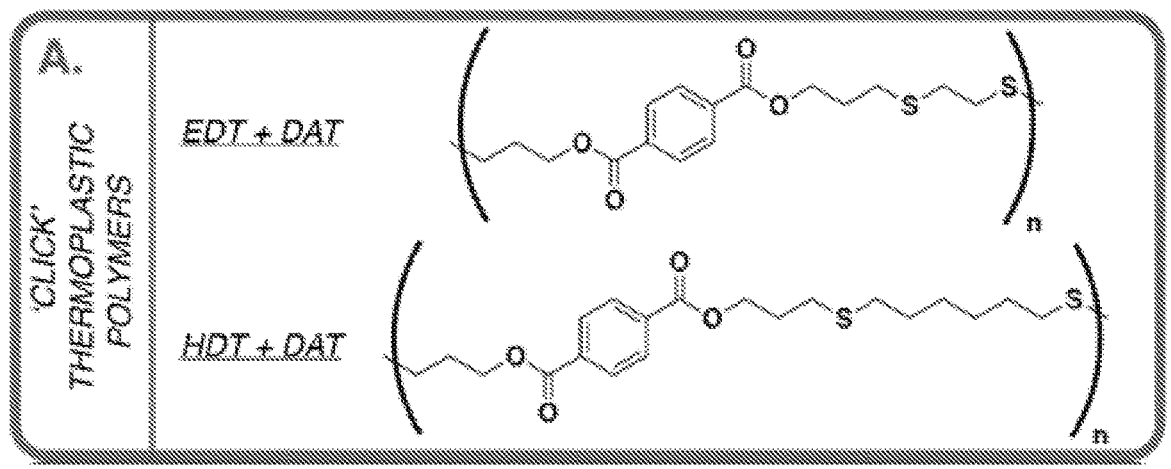
FIGS. 11A-11B illustrate structures showing the polymers of the invention and engineering polymers used commercially.
Figure 11B:
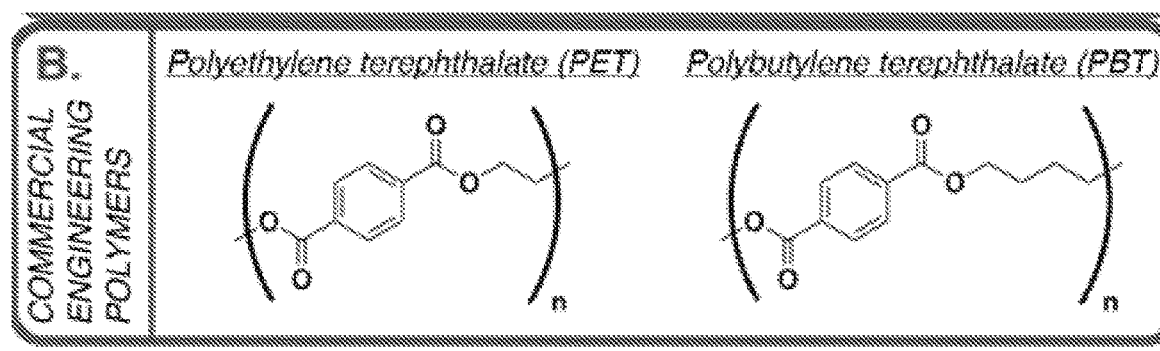

The high levels of intricacy and customization offered by 3D printing offers tremendous potential for a variety of use cases. Specifically with jewelry investment casting, current 3D printing approaches involve printing the positive of a ring, or set of rings, that eventually serve as a sacrifice after casting in gypsum. Since all existing resins form crosslinked polymers, the embedded prints within the set gypsum can be burnt off at polymer decomposition temperatures (in excess of 500° C.) for removal. This process is tedious and ultimately imperfect as residual ash and residue limit final resolutions. This same concept of decomposing a sacrificial printed polymer is employed to 3D print ceramics. In this regard, the ability to simply melt an embedded print and flow out the polymer represents an enabling advancement over current methods. It is demonstrated here that with photopolymerizable thermoplastics in FIG. 3D by placing a glass slide with upright printed pillar structures on a hotplate set at 90° C. Within a minute, the base of the print in contact with the slide turns into a liquid causing the individual pillars to wilt and topple down before eventually turning into a liquid as well. The resulting melt was then manipulated with the tip of a glass pipette to draw an abstract design.

While essentially all thermoplastics are inherently recyclable, the unfortunate reality is that less than 10% of all plastics get recycled with PET being the most recycled polymer. A major reason for this is the relatively low costs of production for low value end uses which contrast to the steep costs of sorting and recycling. Unlike conventional thermoplastics, photopolymerizable thermoplastics are likely to only be economically feasible for high value applications such as 3D printing. Hence, they are less likely to be used for short single-use (typically low value) applications and more likely to be recycled and sustainable, possibly alleviating the issue of 3D printing exacerbating the plastics waste problem with permanent crosslinked polymers. In fact, a valuable feature of photopolymerizable thermoplastics is its intrinsic reprocessability. This lends to the concept of being able to reuse a SLA printed object (or cured resin) as a feedstock for one of the alternative 3D printing methods such as fused deposition modeling (FDM) and material jetting. As these additive manufacturing techniques fundamentally rely on the deposition of melted materials, printed photopolymerizable thermoplastics at the end of their SLA lifetime can be recycled for use as 'new' resins for FDM.

Example 6: Experimental Procedures for Thermoset Polymers Containing Cross-Linking Agents Materials BAPO (Omnirad 819, formerly Irgacure©819) was gifted from IGM Resins USA, Inc. HDT (1,6-hexanedithiol, 97%), TAT (2,4,6-triallyloxy-1,3,5-triazine, 97%), PETMP (pentaerythritol tetrakis(3-mercaptopropionate), >95%), TMPTMP (trimethylolpropane tris(3-mercaptopropionate), 95%), and TABT (triallyl 1,3,5-benzenetricarboxylate, 98%) were purchased from Sigma-Aldrich Co. DAT (diallyl terephthatlate, >98%) was purchased from Tokyo Chemical Industry Co., LTD. Acetylene carbon black (CB) (100% compressed) was purchased from Strem Chemicals, Inc. TATATO (triallyl-s-triazine-2,4,6(1H,3H,5H)trione, 98%) was purchased from Acros Organics. TATM (triallyl trimellitate, 95%) was purchased from Combi-Blocks. All chemicals were used as received without further purification.

Methods

Bulk Photopolymer Film Preparation

Stoichiometric HDT-DAT and samples with 2, 5, and 10 mol % crosslinker relative to the corresponding thiol or ene substituent were mixed with 1 wt % BAPO. Films were deposited between large glass plates spaced with 500 µm rubber shims (high-temperature silicone rubber sheet, 50A, McMaster-Carr) and clamped together with binder clips. Films were irradiated for 5 minutes on each side with a 405 nm LED source (ECO UV Bar) at an intensity of approximately 7 mW/cm$^2$.

3D Printing

Stoichiometric thiol-ene printing formulations were prepared at 1:1 HDT-DAT, 1:0.95:0.05 HDT-DAT-TAT, and 1:0.9:0.1 HDT-DAT-TAT with 0.1 wt % carbon black, 1 wt % BAPO and 1 wt % of a proprietary additive to reduce surface tension donated by Colorado Photopolymer Solutions. A commercial LCD-based DLP printer (Prusa SL1) was used to print 1.6 mm thick dog bones (ASTM D368 Type V) at 50 µm layers with a burn time of 30 s and a layer exposure time of 15 s. All formulations were post cured with the 405 nm UV Bar after manufacture.

Annealing

Manufactured dog bones were annealed after printing and post cure irradiation. Samples were annealed for 2 hours at various temperatures in a benchtop Type 1300 Furnace (Bamstead/Thermolyne) at temperatures 100° C. and in a Model 10 Lab Oven (Quincy Lab Inc.) at temperatures <100° C.

Mechanical Tensile Testing

Uniaxial tensile tests (Exceed Model E42, 500 N load cell, MTS Systems Corporation) were performed on both bulk and printed samples. Samples were strained at a rate of 5 mm/min at ambient temperature. Young's modulus (E) was calculated from 1-5% strain from the linear elastic regime of the stress strain curve.

Shore Hardness

Shore D hardness was determined with a Phase II Digital Shore D Durometer. Hardness measurements of the printed material were performed in triplicate.

FTIR

A Nicolet 6700 FTIR spectrometer (Nicolet Magna-IR Series II, Thermo Scientific) with a MCT/A detector and a XT-KBr extended range beam splitter was used to monitor the conversion of both the thiol and carbon-carbon double bonds in real-time. Due to rapid polymerization rates, a temporal resolution of 1 scan/4 s was used with an optical velocity of 1.8988 cm/s, an optical gain of 1, and an optical aperture of 32. Samples were loaded between salt plates (International Crystal Laboratories) spaced with 50 µm plastic shims (Precision Brand). After 30 seconds, samples were irradiated with a collimated (SM2F32-A, ThorLabs, Inc.) 405 nm LED (M405L4, ThorLabs, Inc.) at 1 mW/cm$^2$ for 10 seconds. Irradiation intensity was verified with a radiometer (PM100D Compact Power and Energy Meter Console, ThorLabs, Inc.). Thiol (2630.5-2483.4 cm$^{-1}$) and vinyl (1659.5-1635.4 cm$^{-1}$) peak area data were collected in real time using a series scan in OMNIC software (Thermo Scientific). Functional group conversion was determined as $$\text{Conversion} = \left(1 - \frac{A_{final}}{A_{initial}}\right) * 100\% \quad (1)$$

where $A_{initial}$ is the peak area of the unreacted functional group, and $A_{final}$ is the peak area of the consumed thiol or vinyl functional group after irradiation.

Photo-Rheometer

Storage modulus (G'), loss modulus (G"), and complex viscosity (η*) were determined upon irradiation in real time using a rotational rheometer (ARES-G2, TA Instruments). A photocuring setup was implemented with a parallel plate geometry and a 20 mm diameter quartz plate for in-situ irradiation. After isothermally equilibrating at 25° C. for 1 minute, samples were irradiated with a collimated 405 nm LED (ThorLabs) after another minute at 25 mW/cm$^2$ for 10 seconds. The oscillation fast sampling procedure was used for 3600 s with a sampling rate of 4 pts/s, a strain of 2%, and a frequency of 10 Hz. 68 µL of sample was pipetted between the plates and set to a gap of 0.2 mm.

POM

High resolution and temporal imaging were performed using a Nikon Ti-E microscope. Static images were obtained with 40×0.95 NA objective. Crystallization videos were obtained using 20×0.75 NA objective, and irradiation was performed for 1 s with an Excelitas Xcite 120 light source and a 360/40 nm excitation band pass filter. 4×4 images were obtained post-irradiation every 20 s for several minutes, and images and videos were analyzed with Nikon Elements software version 4.5.

DSC

Differential scanning calorimetry (DSC) was performed with a DSC2500 (TA Instruments) and was used to monitor thermal transitions. Approximately 6-7 mg of material was loaded into hermetically sealed aluminum pans (TA Instruments). To remain consistent with the crystallization conditions used while printing, materials were tested "as received", i.e. thermal history was not removed via an initial heating ramp.[1] Degree of crystallinity (% crystallinity) was calculated as $$\% \text{ Crystallinity} = \frac{\Delta H_m - \Delta H_c}{\Delta H_m^\circ} \quad (2)$$

where the heat of melting ($\Delta H_m$) and the heat of cold crystallization ($\Delta H_c$) are determined by integrating the areas under the peaks. $\Delta H_m^\circ$ is a term that represents the heat of melting of a 100% crystalline material. Because no such value exists for the materials studied here, degrees of crystallinity were normalized to the heat of enthalpy for 1:1 HDT-DAT. Samples were equilibrated at −20° C. and ramped at 10° C./min to 120° C.

TGA

Thermal thiol-ene network stability for printed samples at each crosslinking density was measured with a thermogravimetric analyzer (PerkinElmer Pyris 1 TGA). All samples were heated from 20° C. to 850° C. at 10° C./min under continuous nitrogen flow.

Example 7: Properties of Cross-Linked Polymers of Formula (I) or (I-A)

ASTM D638 Type V dogbones cut from bulk films approximately 500 μm thick were uniaxially strained at 5 mm min$^{-1}$ until fracture. Opacity remained apparent for all cross-linking agents investigated but to a lesser degree than bulk HDT-DAT. This outcome is typically observed as increasing the crosslinking density reduces a sample's degree of crystallinity and crystallite thickness, with concomitant reductions for several mechanical properties, including Young's modulus, yield stress, elongation at yield, and elongation at break. This trend of reduced mechanical properties was consistently observed for all cross-linking agents studied here (Table 2).

TABLE 2

Mechanical properties obtained for different crosslinkers at different concentrations. ASTM D638 Type V dogbones were cut from a bulk film approximately 500 μm thick (prepared between glass slides and irradiated with a 405 nm LED UV bar for 10 minutes on each side) and uniaxially strained at 5 mm min$^{-1}$.

| Component Ratio | E (MPa) | Yield Stress (MPa) | Ultimate Tensile Stress (MPa) | Elongation at break (%) | Toughness (MJ m$^{-3}$) |
| --- | --- | --- | --- | --- | --- |
| 1:1 HDT-DAT | 88 ± 5 | 7.2 ± 0.6 | 24.4 ± 1.6 | 790 ± 20 | 102 ± 9 |
| 0.95:1:0.05 HDT-DAT-PETMP | 56 ± 2 | 6.1 ± 0.2 | 11.5 ± 1.4 | 330 ± 30 | 26 ± 4 |
| 0.9:1:0.1 HDT-DAT-PETMP | 45 ± 5 | 5.3 ± 0.3 | 9.9 ± 2.1 | 280 ± 70 | 19 ± 7 |
| 0.95:1:0.05 HDT-DAT-TMPTMP | 59 ± 2 | 6.1 ± 0.3 | 16.4 ± 1.3 | 510 ± 50 | 49 ± 4 |
| 0.9:1:0.1 HDT-DAT-TMPTMP | 44 ± 4 | 5.1 ± 0.2 | 12.2 ± 1.0 | 370 ± 40 | 27 ± 4 |
| 1:0.95:0.05 HDT-DAT-TATATO | 60 ± 2 | 6.5 ± 0.2 | 17.0 ± 0.3 | 500 ± 10 | 50 ± 2 |
| 1:0.9:0.1 HDT-DAT-TATATO | 43 ± 2 | 4.7 ± 0.2 | 10.8 ± 2.4 | 350 ± 70 | 24 ± 8 |
| 1:0.95:0.05 HDT-DAT-TATM | 54 ± 1 | 5.7 ± 0.2 | 21.7 ± 1.1 | 660 ± 60 | 68 ± 6 |
| 1:0.9:0.1 HDT-DAT-TATM | 39 ± 2 | 4.1 ± 0.2 | 13.9 ± 0.7 | 460 ± 20 | 33 ± 3 |
| 1:0.95:0.05 HDT-DAT-TABT | 63 ± 3 | 6.3 ± 0.2 | 24.5 ± 1.7 | 700 ± 10 | 86 ± 5 |
| 1:0.9:0.1 HDT-DAT-TABT | 45 ± 3 | 5.1 ± 0.2 | 18.2 ± 1.0 | 580 ± 40 | 54 ± 7 |
| 1:0.95:0.05 HDT-DAT-TAT | 73 ± 4 | 7.6 ± 0.4 | 23.4 ± 1.1 | 660 ± 30 | 84 ± 8 |
| 1:0.9:0.1 HDT-DAT-TAT | 62 ± 7 | 6.5 ± 0.3 | 17.6 ± 0.9 | 520 ± 30 | 52 ± 5 |

Additionally, the appearance of the characteristic clear and opaque striations observed for HDT-DAT and the coinciding periodic dips in tensile stress during strain decreased both in frequency and amplitude with increasing crosslinker content (FIGS. 16A-16F). In some aspects, from approximately 160% strain until failure, large dips in the stress-strain profile were observed for linear HDT-DAT with an average drop in stress of approximately 1.4 MPa. Addition of either 5 or 10 mol % of the trifunctional cross-linking agent TAT reduced the number of dips in the stress, and the average stress drop was reduced to 0.47 MPa and 0.09 MPa, respectively. These dips, which without being bound by theory, are believed to correlate to the opaque striations in the sample, intermittently develop during molecular chain orientation (i.e. strain hardening). In this regime of plastic deformation, the individual crystalline segments are separated from the lamellae after lamellae rotation in the load direction. Continued loading may cause the crystalline regions to separate further and form individual, though still interconnected, fibrils. It is hypothesized that the extreme plastic deformation of these materials is afforded by its ability to form these fibrils, and the coinciding lamellae slippage results in a recurring release of stress. TAT was selected as the printing monomer due its similar kinetic and crystalline properties (detailed below) and the relatively minor mechanical reductions observed in bulk. Formulations with functional molar group ratios of 1:0.95:0.05 HDT-DAT-TAT (5 mol % TAT) and 1:0.9:0.1 HDT-DAT-TAT (10 mol % TAT) were investigated and compared to the original 1:1 HDT-DAT (0 mol % TAT) thermoplastic.

Polymerization kinetics for samples with varying TAT concentrations were monitored in real-time with Fourier-Transform Infrared Spectroscopy (FTIR). Rapid kinetics and near quantitative conversion of both the thiol and ene groups were observed for all samples after brief (10 s) irradiation with a 405 nm LED (1 mW/cm$^2$). Despite having almost indistinguishable rates of polymerization, the final conversion of the thiol group slightly decreased (from >99.5% conversion with 0 mol % TAT to approximately 99 and 98% conversion with 5 and 10 mol % TAT, respectively) with increasing TAT concentration, which likely results from decreased thiol mobility as gelation occurs toward the end of the reaction. After polymerization, crystallization of 1:1 HDT-DAT was observed via the optical transition of the bulk film from clear to opaque. In some aspects, this temporal development remained visible with cross-linking agent addition, albeit to a lesser degree.

Figures 13A, 13B:
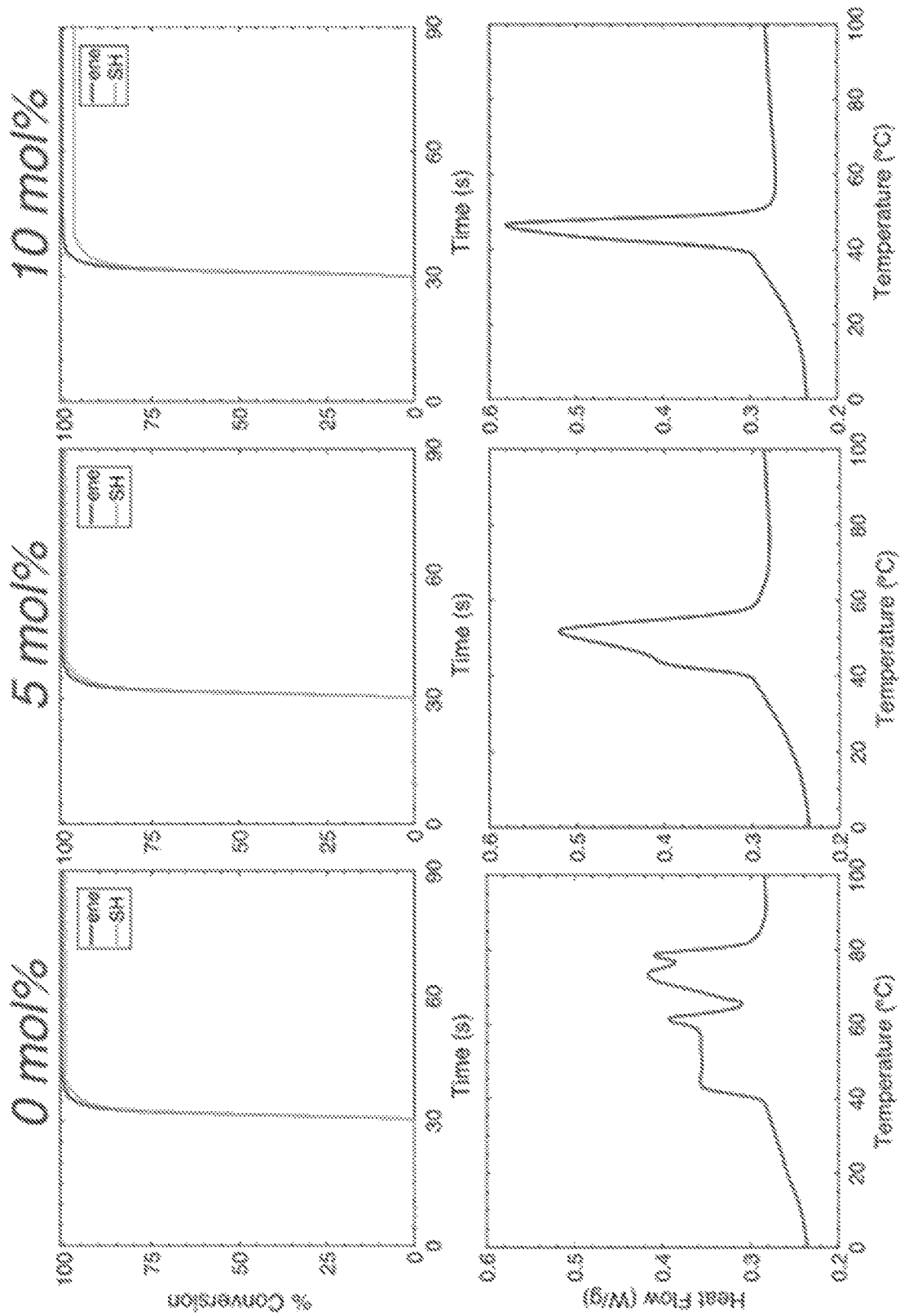
FIGS. 13A-13C show characterization of polymerization and subsequent crystallization with the addition of the crosslinker TAT.
Figure 13C:
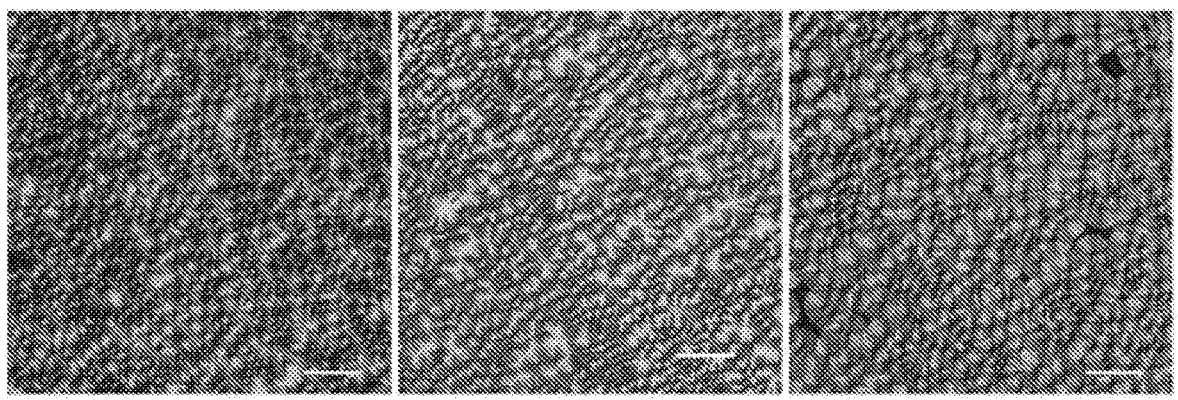

Differential scanning calorimetry (DSC) confirmed the presence of crystalline domains in the crosslinked samples via the appearance of distinct $T_m$ peaks (FIG. 13B). Relative degrees of crystallinity were determined by normalizing to the heat of melting for 0 mol % TAT, and approximately 86% and 64% crystallinity remained after the addition of 5 and 10 mol % TAT, respectively. Thermogram inspection revealed an extensive change in the $T_m$ profile for increasing TAT concentrations. Initially, two nearly separate $T_m$ regimes were present for samples without cross-linking agent, which is indicative of the development of domains with different crystallite sizes. The addition of a cross-linking agent remarkably and unexpectedly altered both the crystallite size distribution and the maximum $T_m$, with the thermogram revealing the homogenization of crystallite size with increasing crosslinking content. The increasingly uniform transition temperatures exhibited a decrease in $T_m$ (reduced from 62 and 79° C. for samples with 0 mol % TAT to 52 and 46° C. for samples with 5 and 10 mol % TAT, respectively), which suggests that crystal growth in a crosslinked network yielded smaller crystallites. Polarized optical microscopy (POM) was used to further confirm the development of crystalline domains within the crosslinked networks. POM images of bulk samples were taken several hours after brief (2 s) irradiation with a 405 nm LED bar at 7 mW/cm$^2$ (FIG. 13C).

In agreement with that previously observed for the thiol-ene thermoplastic, characteristic crossed spherulites were visible for all crosslinking densities. Spherulite growth was also imaged in-situ with cross polarizers upon brief (1 s) irradiation with the microscope's 405 nm LED source. Shortly after irradiation and subsequent polymerization, spherulite growth for the non-crosslinked sample ensued for several minutes until impingement with other spherulites prevented further development. A considerable reduction in the rate of crystallization occurred with higher concentrations of TAT due to molecular motion restrictions imposed by the crosslinked network.

Figure 14A:
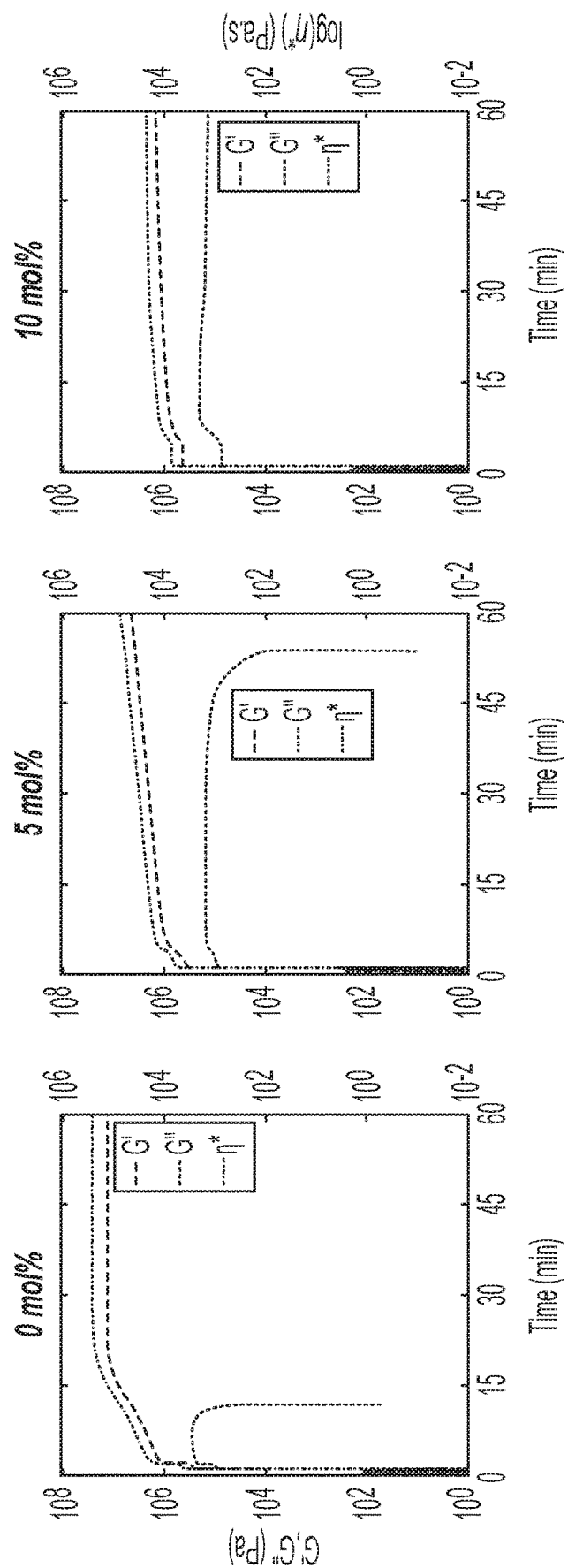
FIGS. 14A-14B show real-time photo-rheology of (FIG. 14A) bulk and (FIG. 14B) printing resin samples consisting of 0, 5, and 10 mol % TAT, and printing samples also contained 0.1 wt % CB.
Figure 14B:
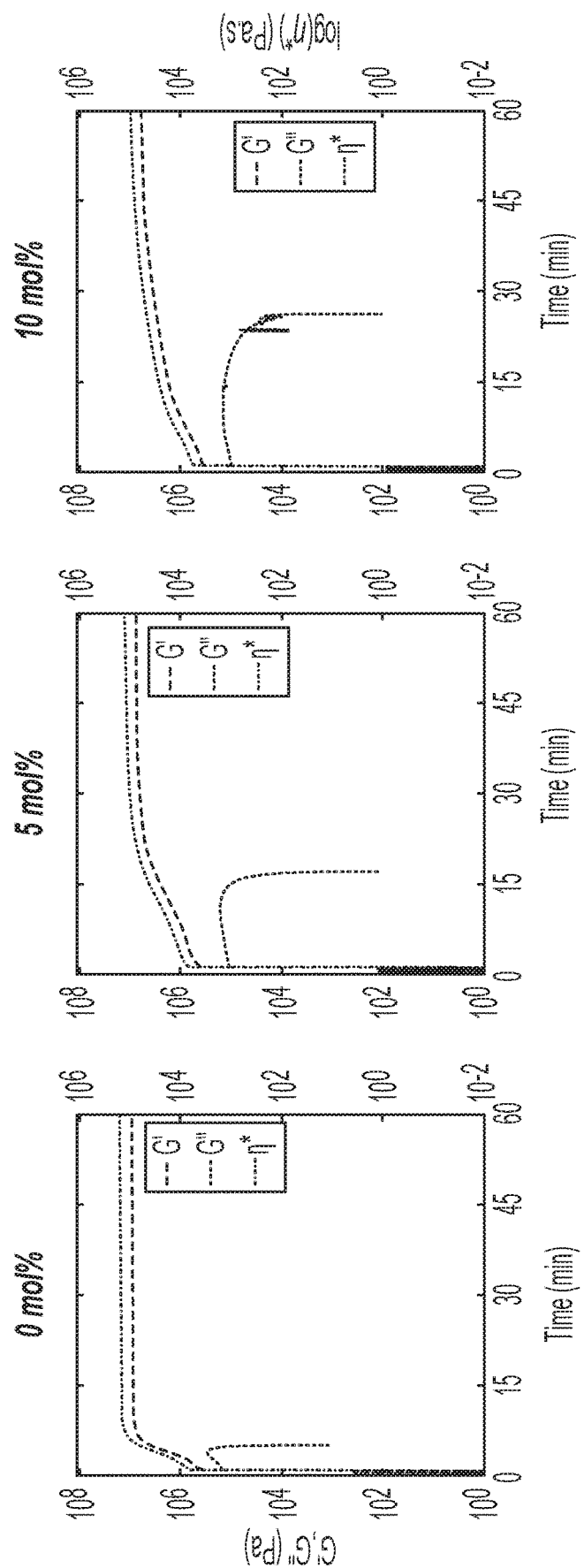

Hindered crystallization rates with increasing TAT concentration were further confirmed indirectly through modulus development via real-time photo-rheology (FIG. 14A-14C). Samples both prepared in bulk and as printing resins were irradiated for 10 seconds with a 405 nm LED at 25 mW/cm$^2$. A sharp increase in both the storage (G') and loss (G") moduli upon irradiation was observed for all samples and is in agreement with the rapid polymerization rates obtained with FTIR. Consistent with previous findings, G' increased again for bulk 0 mol % TAT shortly after polymerization and eventually plateaued once crystallization was complete, whereas G" readings ceased soon after falling below the instrument detection limits.

Complex viscosity ($\eta^*$) was simultaneously measured and increased in a manner similar to G' before also plateauing upon cessation of crystallization. The rate of crystallization was considerably reduced for bulk crosslinked samples as secondary modulus development was delayed and neither G' nor $\eta^*$ plateaued in an hour. Faster rates of crystallization were observed for the printing resin due to the presence of additional nucleation sites provided by the dispersed photoabsorber carbon black (CB). The non-crosslinked printing material finished crystallizing in a few minutes, and crystallization for the 5 mol % and 10 mol % crosslinked printing materials was complete within approximately 30 and 60 minutes, respectively. Crystallization was greatly expedited with the addition of a small amount of CB (0.1 wt %), but complete crystallization of the printed layer would not occur before the next layer polymerized when implementing reasonable exposure times. This is especially true for crosslinked printing resins in which the half-life for the maximum degree of crystallinity increased from only approximately 3 minutes for the linear system to 13 minutes for 5 mol % TAT and more than 30 minutes for 10 mol % TAT (G' and $\eta^*$ did not plateau within 60 minutes).

While complete crystallization would not occur for any of the printing resins when implementing reasonable layer exposure times (<30 s), initial crystallite formation may harden print interfaces enough to substantially hinder interlayer adhesion, especially for systems without cross-linking agent. It is worth noting that, while CB is typically loaded into rubbers and elastomeric matrices at greater than 10 wt % to increase mechanical properties such as tensile strength and ductility, it is not expected that the relatively small amount of CB incorporated here (0.1 wt %) would improve the mechanical performance of these materials.

Example 8: 3D Printing of Cross-Linked Polymers of Formula (I) or (I-A)

Figure 15:
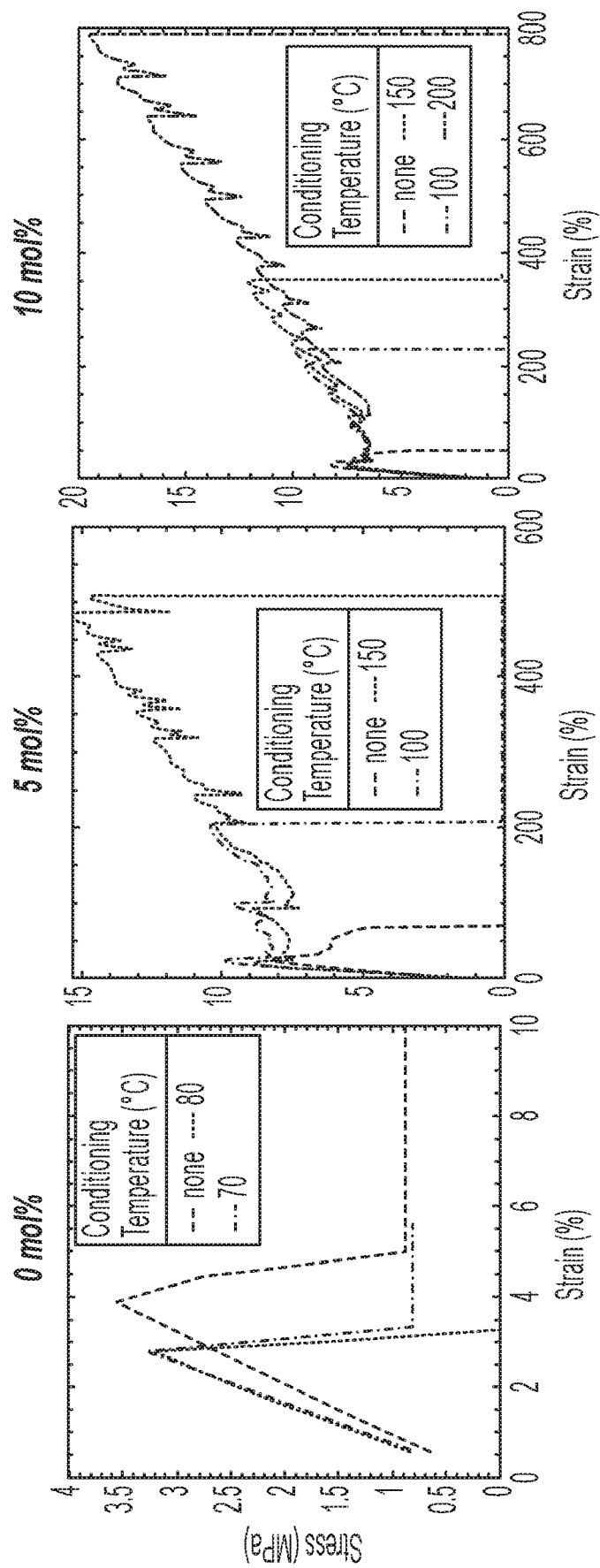
FIG. 15 shows tensile stress-strain plots of samples printed with 0, 5, and 10 mol % TAT.
Figure 16A:
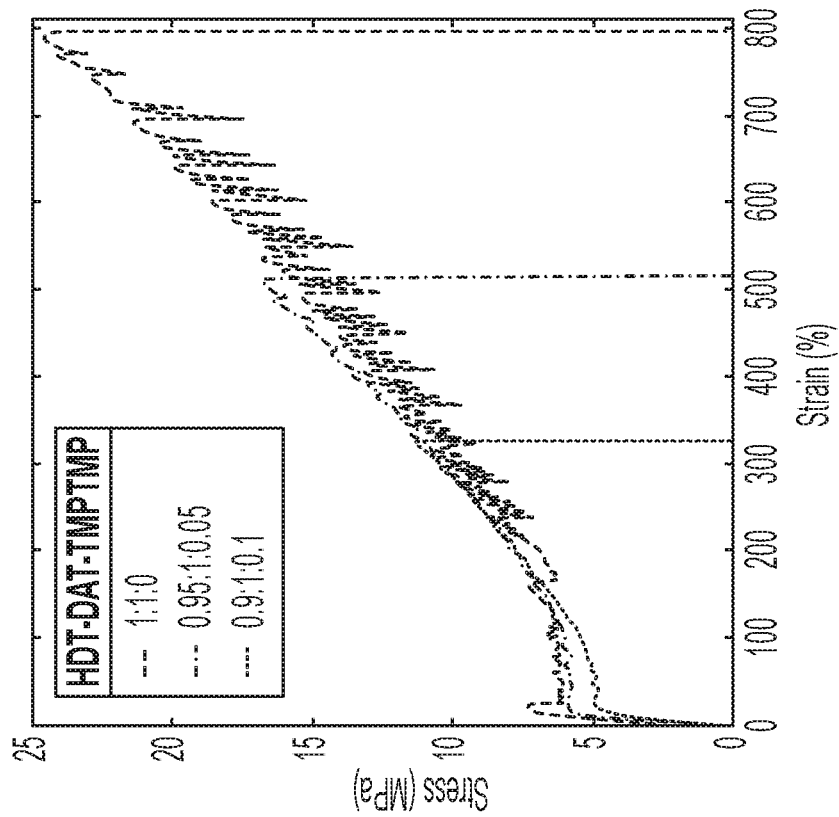
FIGS. 16A-16F show representative stress-strain plots of bulk thiol-ene formulations with varying amounts of cross-linking agent.
Figure 16B:
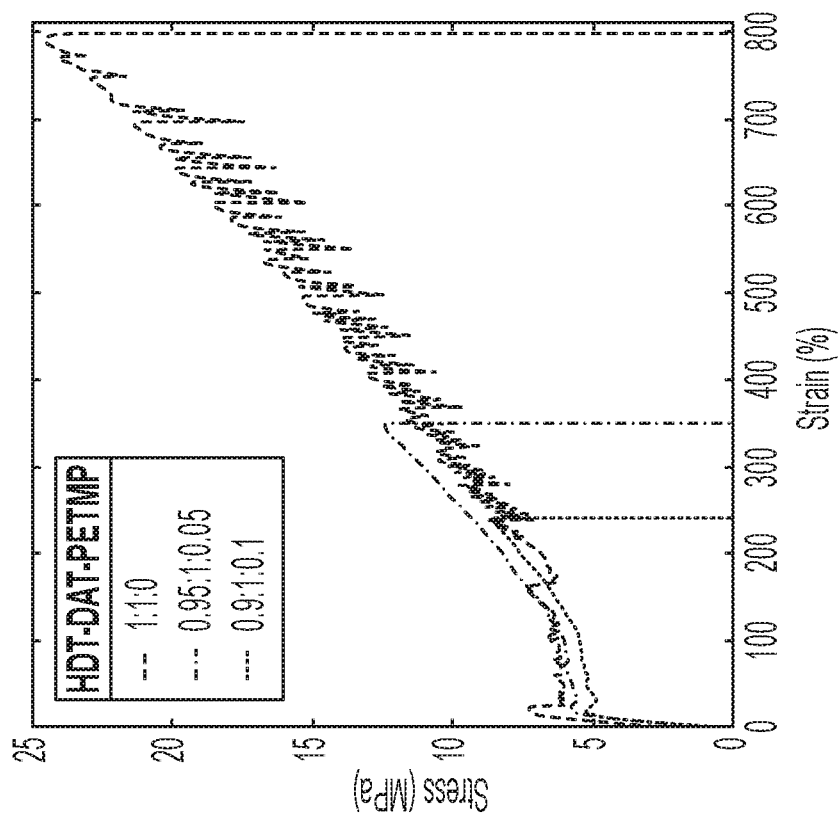
Figure 16D:
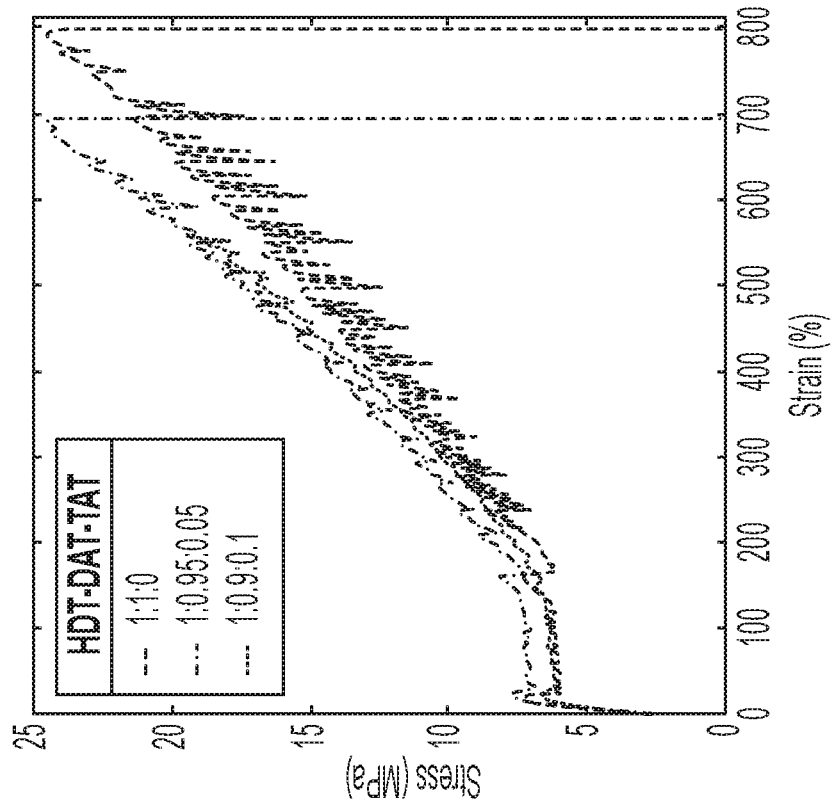
Figure 16C:
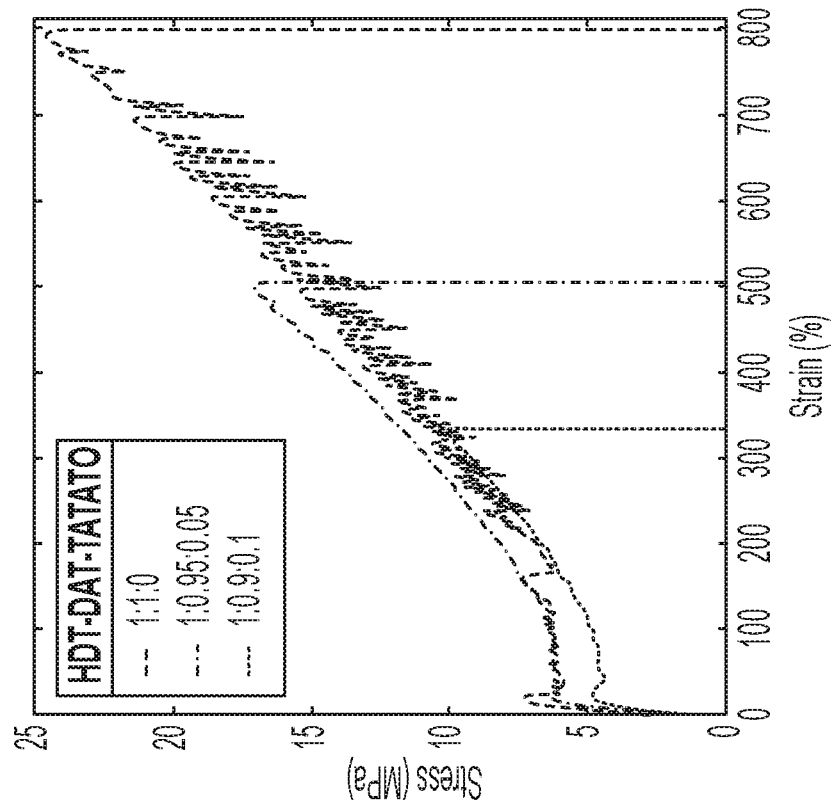
Figure 16E:
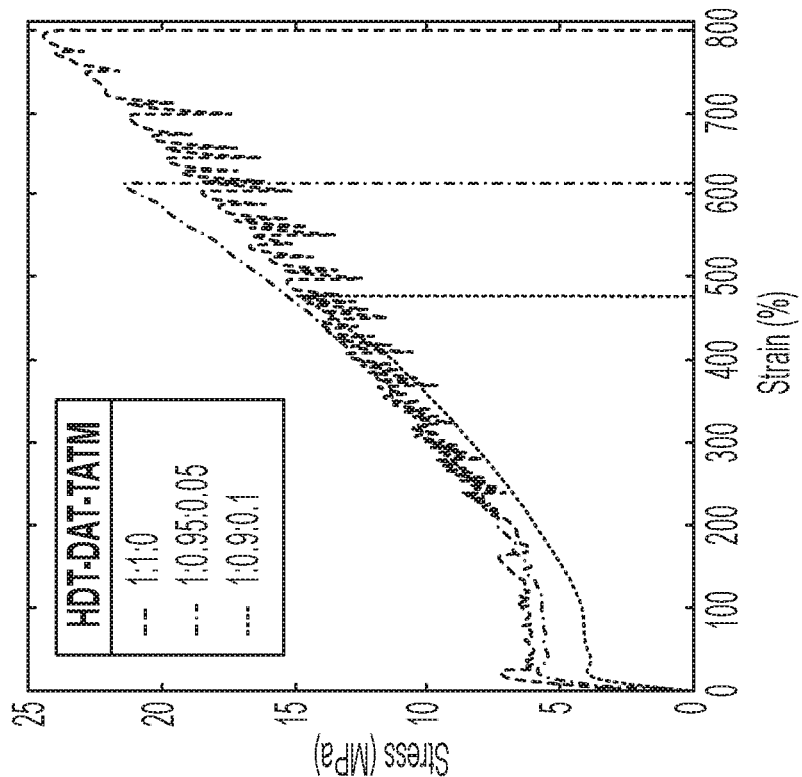
Figure 16F:
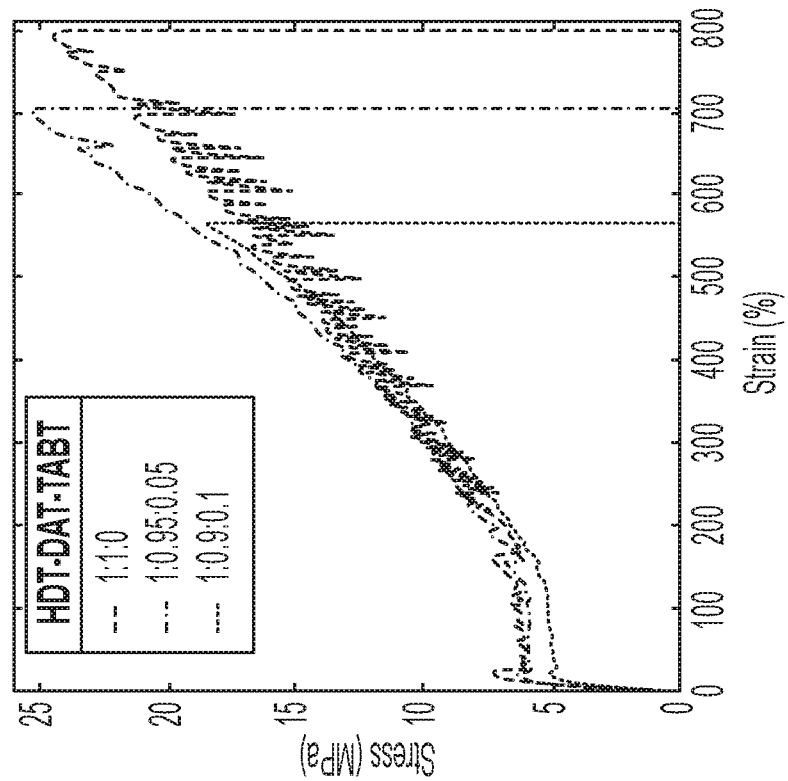
Figure 17:
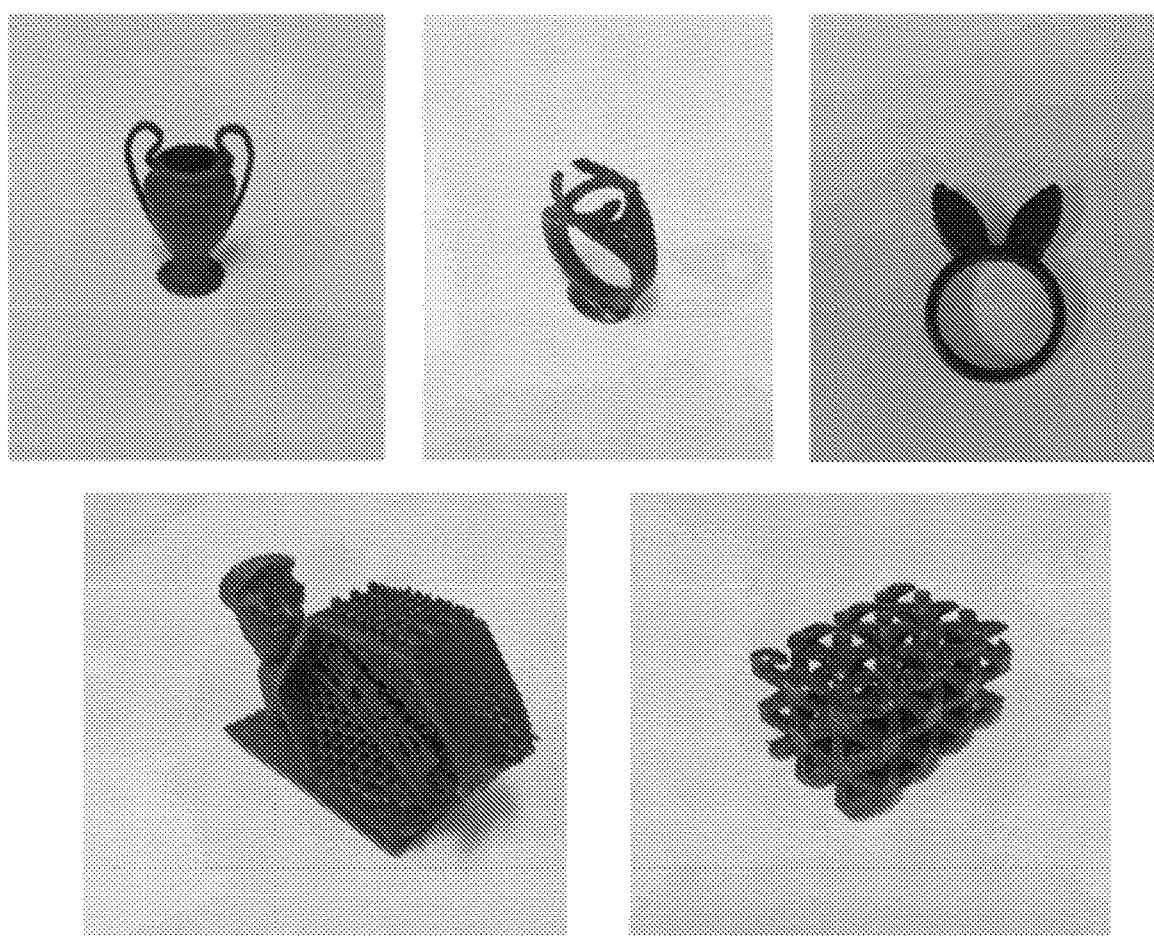
FIG. 17 illustrates 3D printed objects made with 1:0.9:0.1 (10 mol %) HDT-DAT-TAT: trophy (23.4 mm tall, 1.5 mm thick ears); solitaire ring setting (28.6 mm tall, 1.6 mm thickness ring support); bunny ring (20.4 mm ring size, 12.5 mm ear height); original Prusa SL1 test object (37 mm person height, 2 mm small hexagon size); lattice (27.3 mm width, 40.0 mm length, 25.0 mm height, 3.3 mm support thickness).
Figure 18:
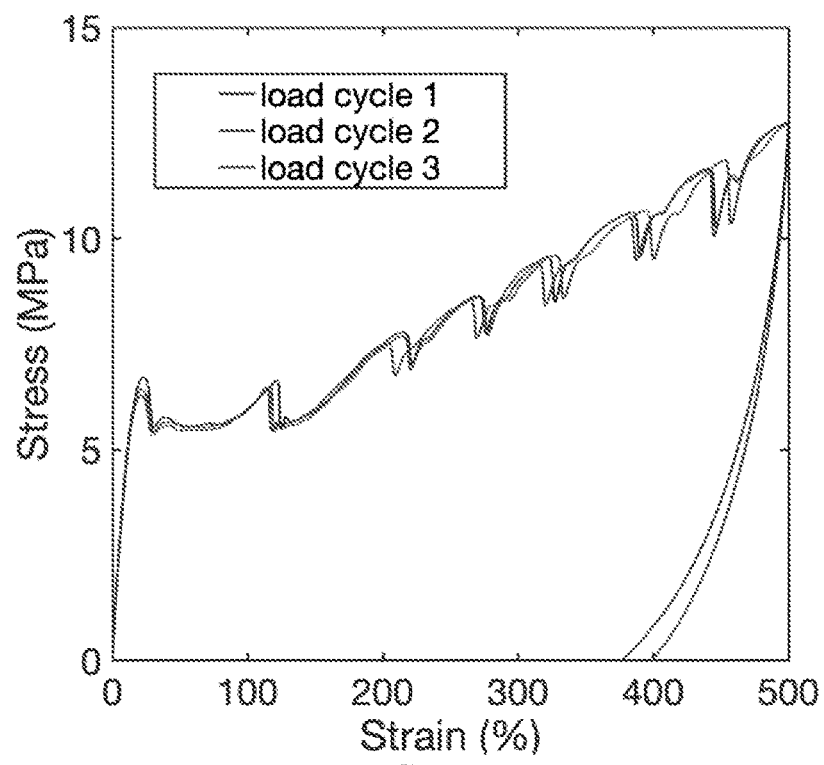
FIG. 18 shows 3D printed ASTM D638 Type V dogbones 1:0.9:0.1 HDT:DAT:TAT samples were annealed at 200° C. for 2 hours before elongation to 500%. The strain was then relaxed 0% and subsequently heated at 80° C. The original dogbone shape was recovered, and two additional loading-unloading cycles were performed. Full shape and mechanical recovery were observed.
Figure 19:
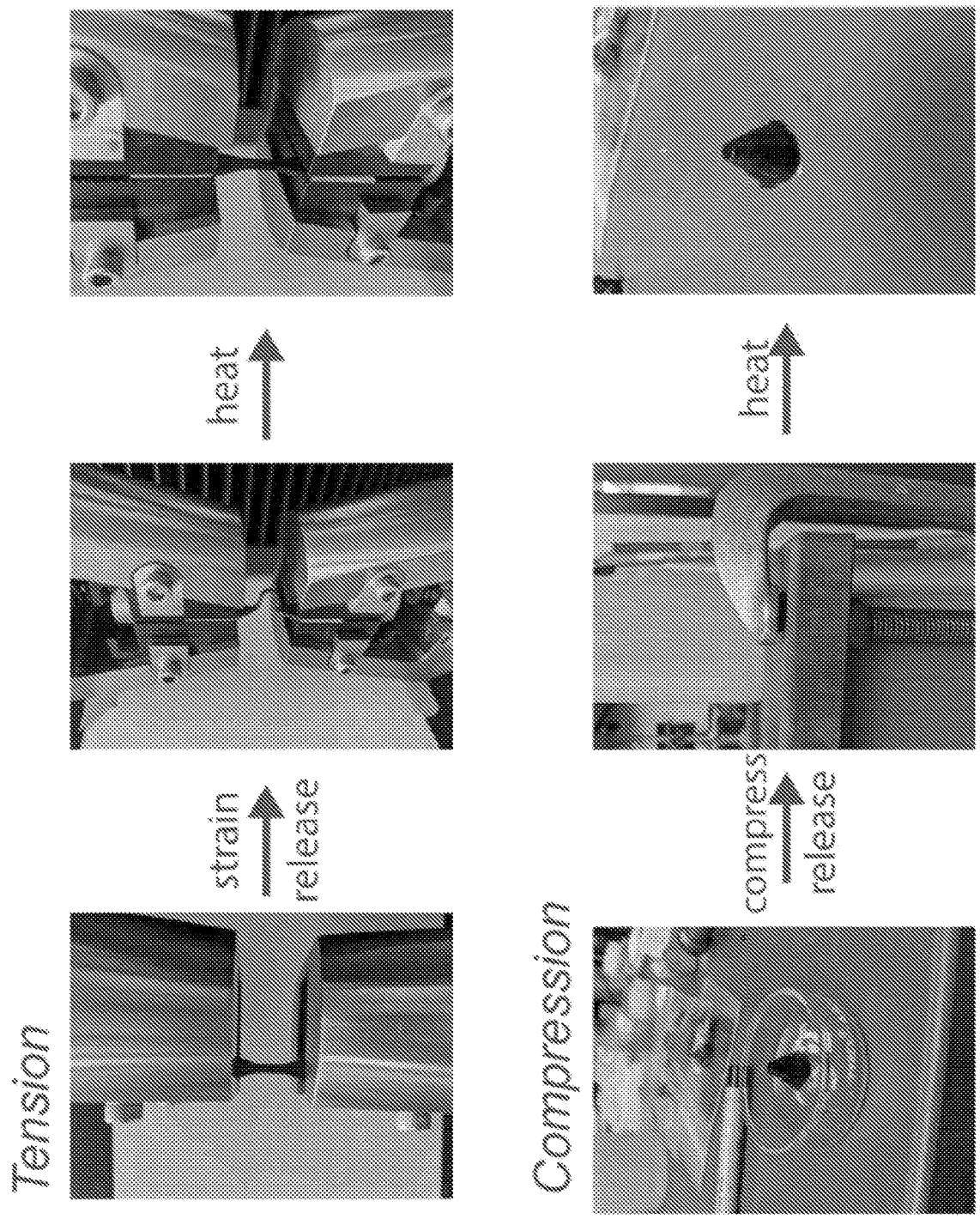
FIG. 19 shows complete shape recovery of the photopolymerizable thermoset HDT-DAT-TAT was rapidly after mild heating (75° C.) after significant deformation via tension and compression.

A commercial LCD-based DLP 3D printer was used to print multiple ASTM D638 Type V dogbones with 0.1 wt % CB flat onto the build head (FIG. 15), and high-resolution features were obtained using SLA printing (FIG. 17). While strain at break occurred at <5% for 1:1 HDT:DAT prints (FIG. 18), the addition of TAT moderately increased the strain at break to approximately 36 and 50% for 5 and 10 mol % TAT, respectively (Table 3).

TABLE 3

Mechanical properties obtained for the cross-linked and annealed prints, different cross-linkers concentrations. Printed ASTM D638 Type V dogbones were at different uniaxially strained at 5 mm min$^{-1}$. Failure stress is omitted for some samples as failure occurred shortly after yield. Annealing improved the mechanical properties of the cross-linked prints, while no improvement was observed for 1:1 HDT-DAT.

| Sample | Thermal Conditioning (2 hours) | E (MPa) | Yield Stress (MPa) | Ultimate Tensile Stress (MPa) | Elongation at break (%) | Toughness (MJ m$^{-3}$) |
|---|---|---|---|---|---|---|
| 1:1 HDT-DAT | None | 86 ± 11 | 3.7 ± 0.4 | 3.7 ± 0.4 | 4 ± 1 | 0.3 ± 0.2 |
| 1:1 HDT-DAT | 70° C. | 110 ± 3 | 3.4 ± 0.3 | 3.4 ± 0.3 | 3 ± 1 | 0.1 ± 0.05 |
| 1:1 HDT-DAT | 80° C. | 113 ± 4 | 2.7 ± 0.7 | 2.7 ± 0.7 | 2 ± 1 | 0.04 ± 0.02 |
| 1:0.95:0.05 HDT-DAT-TAT | None | 64 ± 4 | 7.4 ± 1.9 | 7.4 ± 1.9 | 36 ± 21 | 2 ± 1.2 |
| 1:0.95:0.05 HDT-DAT-TAT | 100° C. | 69 ± 2 | 9.3 ± 0.4 | 10.2 ± 1.1 | 276 ± 68 | 17 ± 1 |
| 1:0.95:0.05 HDT-DAT-TAT | 150° C. | 64 ± 3 | 9.0 ± 0.2 | 15.9 ± 0.8 | 532 ± 33 | 59 ± 5 |
| 1:0.9:0.1 HDT-DAT-TAT | None | 57 ± 1 | 8.2 ± 0.2 | 8.2 ± 0.2 | 50 ± 4 | 3.0 ± 0.4 |
| 1:0.9:0.1 HDT-DAT-TAT | 100° C. | 50 ± 1 | 7.3 ± 0.2 | 9.8 ± 1.2 | 226 ± 43 | 17 ± 5 |
| 1:0.9:0.1 HDT-DAT-TAT | 150° C. | 52 ± 1 | 7.5 ± 0.2 | 12.3 ± 0.6 | 362 ± 31 | 31 ± 3 |
| 1:0.9:0.1 HDT-DAT-TAT | 200° C. | 54 ± 2 | 7.3 ± 0.2 | 19.8 ± 0.3 | 787 ± 7 | 95 ± 1 |

The Young's modulus (F) however decreased with increasing crosslinking density, corresponding with that observed in bulk. Despite the marginal improvement in ductility and toughness, the mechanical properties of the printed components still remained significantly inferior to those obtained in bulk. To address this discrepancy, continuous thermal conditioning was performed on samples with and without TAT in an attempt to further recover the diminished mechanics. This approach has been explored as a post-manufacturing technique to increase mechanical properties of the printed component by i) increasing inter-filament/interlayer adhesion and ii) promoting recrystallization.

Unlike previous work where annealing was conducted between $T_g$ and $T_m$ for thermoplastics, conditioning in this work was performed not only above $T_g$ (–30° C. for all samples) but also above $T_m$ for 2 hours before cooling at room temperature overnight. Samples without cross-linking agent were conditioned at 70 and 80° C., and at these temperatures, no improvements were observed. As materials without cross-linking agent are thermoplastics and melt above their respective melting temperatures, heating was not conducted above these temperatures. Samples with 5 mol % TAT were conditioned at 100 and 150° C. for 2 hours, while samples with 10 mol % TAT were also heated at 200° C. The conditioning temperatures utilized here were well below that of the onset temperature (To 350° C. for all crosslinked prints), and minimal print deformation was observed. To test deformation, the dimensions of printed cubes (1 cm$^3$) with 10 mol % TAT were recorded before and after conditioning at a maximum temperature of 200° C. for 2 hours. Less than 5% deformation was observed for the cube height, while a deformation of approximately 2% was observed for both the width and thickness. It is worth noting that when the temperature was progressively heated at intervals of 50° C. (100, 150, and 200° C.) and held at each temperature for half an hour, vertical and horizontal cube deformation was less than 1% and 5%, respectively. Therefore, in some aspects, thermal ramping as opposed to vigorous high temperature may be beneficial for some printed structures.

For the tensile tests performed here, dogbones were not heated above the respective maximum conditioning temperature for each crosslinker due to the onset of severe print deformation. Elongation improved by an order of magnitude for the conditioned 5 mol % TAT samples, increasing to approximately 280±70 and 530±30% when conditioned at 100 and 150° C., respectively, with no substantial effect on E observed. Further mechanical improvements were attained for 10 mol % TAT samples, with $\in_{max}$ occurring at approximately 780±10% when conditioned at 200° C. for 2 hours. Untreated 10 mol % TAT samples achieved an $\in_{max}$ that was also an order of magnitude higher than printed material without crosslinker, while no appreciable changes in E and yield stress were observed with thermal treatment. Unexpectedly, significant improvements in print mechanics were obtained for conditioned crosslinked samples, with $\in_{max}$ and toughness increasing a couple of orders of magnitude from the original printed thermoplastic.

Not only did the ductility of 10 mol % TAT samples conditioned at 200° C. increase beyond that observed for the untreated print, but a marked increase over that of the equivalent bulk sample (~520±30%) was also obtained. Remarkably, $\in_{max}$ and toughness (95±1 MJ m$^{-3}$) determined for printed 10 mol % TAT samples conditioned at 200° C.

were statistically comparable with those obtained for bulk 1:1 HDT-DAT (~790±20%, 102±9 MPa). While the prints were not elastic, the substantial ductility achieved after heating was superior to many commercially-available elastomeric photopolymer resins, including Formlab Elastic, Formlab Flexible, Stratasys TangoPlus, and Carbon EPU 40. The highest $\epsilon_{max}$ reported for these commercial materials was ~270% with an ultimate tensile stress (UTS) of 8 MPa (TangoPlus), falling well below the uppermost $\epsilon_{max}$ and UTS (19.8±0.3 MPa) achieved for the aggressively conditioned crosslinked thiol-ene prints.

It is worth mentioning that the hardness of the thiol-ene prints (~40 shore D) was well above that of the commercial resins (TangoPlus, 68 shore A) with the exception of Formlab Flexible (85 shore A). Even amongst the reported set of photopolymerized manufactured elastomers and thermosets emphasizing mechanical performance, only one elastomer exhibited superior ductility, albeit at a much lower E and UTS. Interestingly, the distinctive, periodic striations that appeared for the bulk materials reemerged after thermal conditioning for both the 5 and 10 mol % TAT samples.

Enumerated Embodiments

The following exemplary aspects are provided, the numbering of which is not to be construed as designating levels of importance:

Embodiment 1 provides a polymer of formula (I):

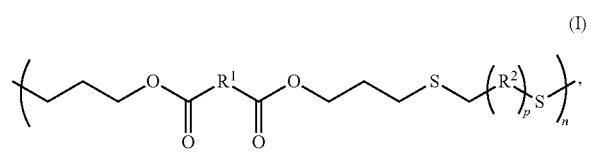
(I)

wherein:

each instance of $R^1$ is independently selected from the group consisting of:

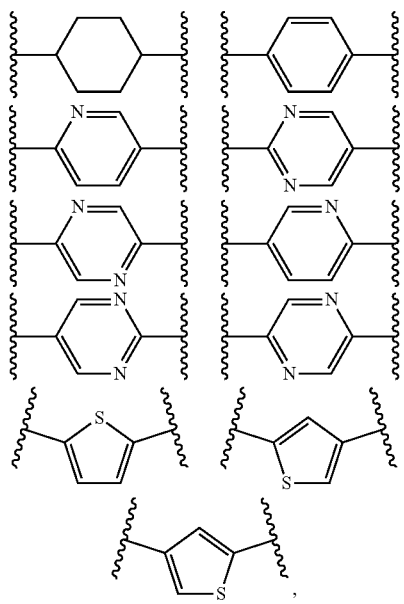

each of which is independently optionally substituted;

each instance of $R^2$ is selected from the group consisting of optionally substituted $C_1$-$C_{15}$ alkylene, optionally substituted $C_1$-$C_{15}$ heteroalkylene, optionally substituted $C_2$-$C_{15}$ alkenylene, optionally substituted $C_2$-$C_{15}$ heteroalkenylene, optionally $C_2$-$C_{15}$ alkynylene, and optionally $C_2$-$C_{15}$ heteroalkynylene;

each instance of p is independently an integer from 1 to 25; and each instance of n is independently an integer from 2 to 200,000.

Embodiment 2 provides the polymer of embodiment 1, which is prepared from a monomer of formula (II):

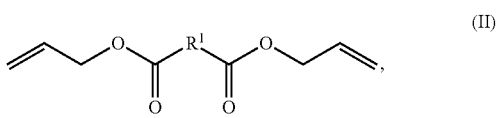
(II)

and a monomer of formula (III):

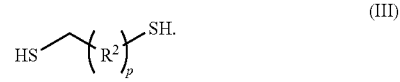
(III)

Embodiment 3 provides the polymer of any one of embodiments 1-2, wherein each instance of $R^1$ is independently selected from the group consisting of:

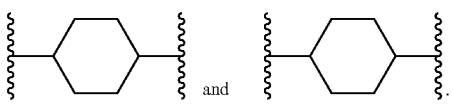

Embodiment 4 provides the polymer of any one of embodiments 1-3, wherein the monomer of formula (II) is selected from the group consisting of diallyl terephthalate and diallyl cyclohexane-1,4-dicarboxylate.

Embodiment 5 provides the polymer of any one of embodiments 1-4, wherein the monomer of formula (III) is selected from the group consisting of

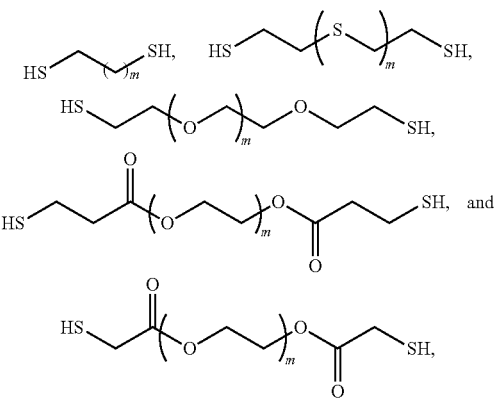

wherein each instance of m is independently an integer from 1 to 25.

Embodiment 6 provides the polymer of any one of embodiments 1-5, wherein the monomer of formula (III) is selected from the group consisting of

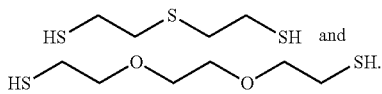

Embodiment 7 provides the polymer of any one of embodiments 1-6, wherein the molar ratio of the monomer of formula (II) and the monomer of formula (III) in the polymer is about 1:1.

Embodiment 8 provides the polymer of any one of embodiments 1-7, which is a linear polymer.

Embodiment 9 provides the polymer of any one of embodiments 1-8, which is semi-crystalline.

Embodiment 10 provides the polymer of any one of embodiments 1-9, which is a continuous-phase polymer.

Embodiment 11 provides the polymer of any one of embodiments 1-10, which is a thermoplastic polymer that melts at about 70° C. to about 120° C.

Embodiment 12 provides the polymer of any one of embodiments 1-11, which is suitable for 3D-printing.

Embodiment 13 provides the polymer of any one of embodiments 1-12, wherein the 3D-printing is stereolithography (SLA) printing.

Embodiment 14 provides the polymer of any one of embodiments 1-13, which has tensile strength of about 15 MPa to about 35 MPa.

Embodiment 15 provides the polymer of any one of embodiments 1-14, which has a toughness of about 80 MJ/m$^3$ to about 140 MJ/m$^3$.

Embodiment 16 provides the polymer of any one of embodiments 1-15, which is selected from the group consisting of

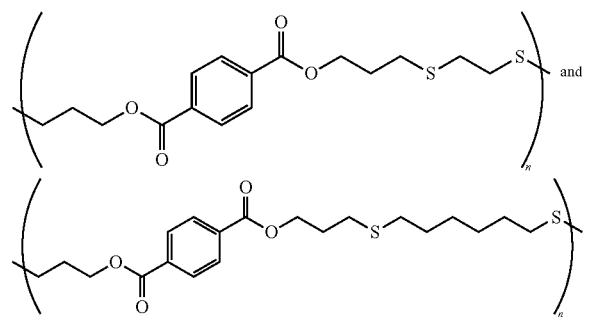

wherein is n is an integer between 2 and 200,000.

Embodiment 17 provides a composition comprising a monomer of formula (II):

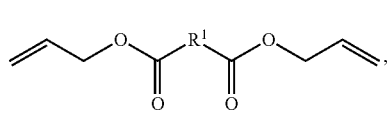
(II)

a monomer of formula (III):

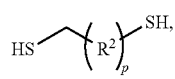
(III)

and optionally a photoinitiator; wherein, each instance of $R^1$ is independently selected from the group consisting of:

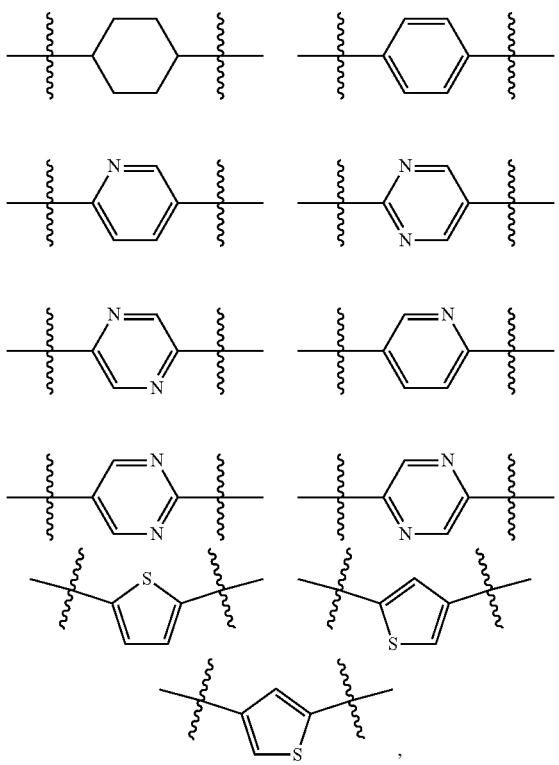

each of which is independently optionally substituted;

each instance of $R^2$ is independently selected from the group consisting of optionally substituted $C_1$-$C_{15}$ alkylene, optionally substituted $C_1$-$C_{15}$ heteroalkylene, optionally substituted $C_2$-$C_{15}$ alkenylene, optionally substituted $C_2$-$C_{15}$ hetero alkenylene, optionally $C_2$-$C_{15}$ alkynylene, and optionally $C_2$-$C_{15}$ heteroalkynylene;

each instance of p is independently an integer from 1 to 25; and each instance of n is independently an integer from 2 to 200,000;

wherein the composition is not part of an emulsion.

Embodiment 18 provides the composition of embodiment 17, which is a bulk composition.

Embodiment 19 provides the composition of any one of embodiments 17-18, wherein a photoinitiator is present in the composition.

Embodiment 20 provides the composition of any one of embodiments 17-19, wherein the photoinitiator is selected from the group consisting of acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

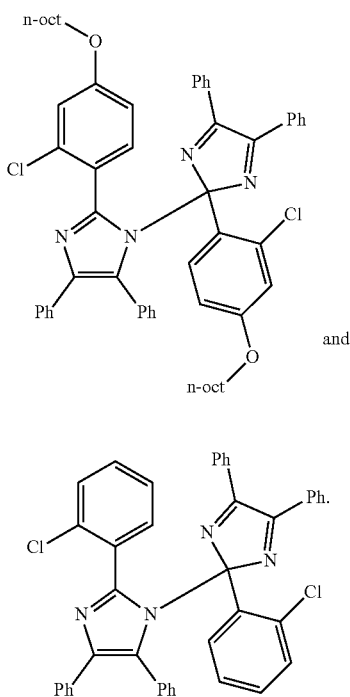

and

Embodiment 21 provides the composition of any one of embodiments 17-20, wherein polymerization of the monomer of formula (II) and the monomer of formula (III) is promoted by irradiating the composition with UV radiation of wavelength of about 380 nm to about 410 nm in presence of the photoinitiator.

Embodiment 22 provides the composition of any one of embodiments 17-21, wherein the UV radiation has intensity of about 1 mW/cm$^2$ to about 20 mW/cm$^2$.

Embodiment 23 provides the composition of any one of embodiments 17-22, wherein irradiation time is about 2 seconds to about 30 seconds.

Embodiment 24 provides a method of synthesizing a polymer of formula (I),

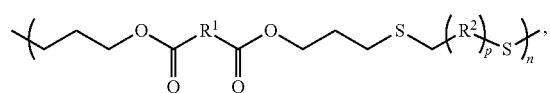

(I)

wherein the method comprises irradiating a mixture of a monomer of formula (II), a monomer of formula (III), and a photoinitiator to form a mixture comprising a continuous-phase polymer, wherein the mixture is in bulk and not part of an emulsion,

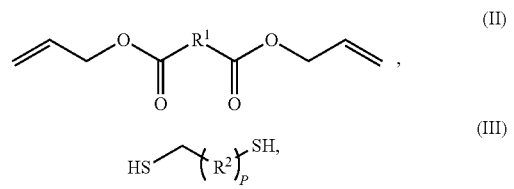

wherein:
each instance of R$^1$ is independently selected from the group consisting of

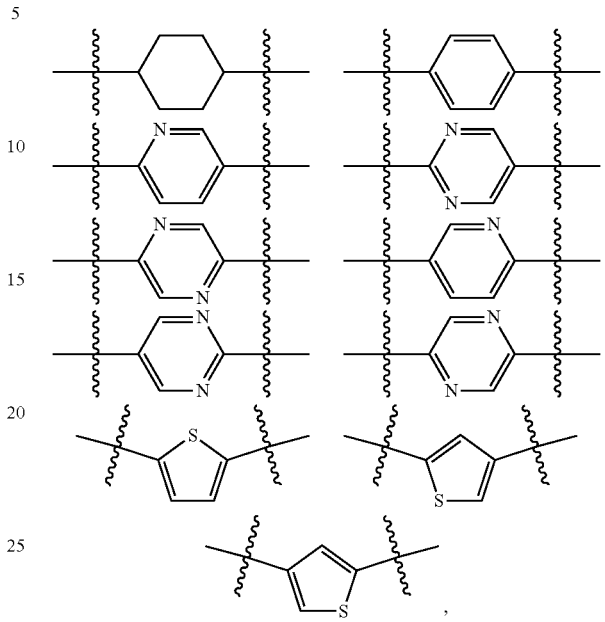

each of which is independently optionally substituted;
each instance of R$^2$ is independently selected from the group consisting of optionally substituted C$_1$-C$_{15}$ alkylene, optionally substituted C$_1$-C$_{15}$ heteroalkylene, optionally substituted C$_2$-C$_{15}$ alkenylene, optionally substituted C$_2$-C$_{15}$ hetero alkenylene, optionally C$_2$-C$_{15}$ alkynylene, and optionally C$_2$-C$_{15}$ heteroalkynylene;

each instance of p is independently an integer from 1 to 25; and each instance of n is independently an integer from 2 to 200,000.

Embodiment 25 provides the method of any one of embodiment 24, wherein the mixture is irradiated with UV radiation having wavelength of about 380 nm to about 410 nm.

Embodiment 26 provides the method of any one of embodiments 24-25, wherein the irradiation time is about 2 seconds to about 30 seconds.

Embodiment 27 provides the method of any one of embodiments 24-26, wherein the irradiation comprises light having intensity of about 1 mW/cm$^2$ to about 20 mW/cm$^2$.

Embodiment 28 provides the method of any one of embodiments 24-27, wherein the polymerization occurs predominantly via thiol-ene step-growth mechanism.

Embodiment 29 provides the method of any one of embodiments 24-28, wherein the polymerization takes place at a temperature ranging from about 15° C. to about 40° C.

Embodiment 30 provides the method of any one of embodiments 24-29, wherein the photoinitiator is selected from the group consisting of acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

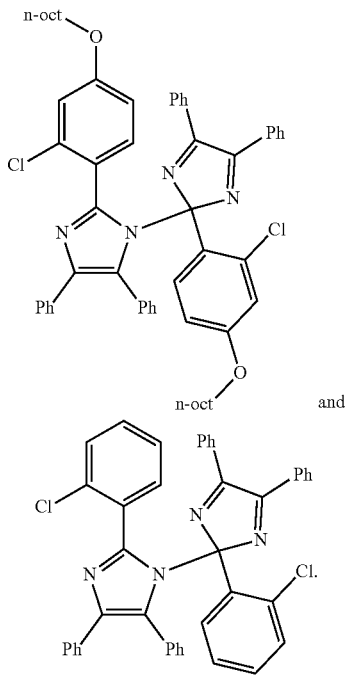

and

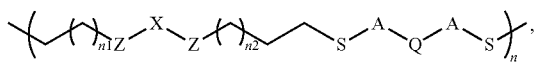

Embodiment 31 provides the method of any one of embodiments 24-30, wherein the polymer is a continuous phase polymer.

Embodiment 32 provides kit comprising the composition of any one of embodiments 17-24, a photoinitiator, and an instructional material comprising instructions for using the composition.

Embodiment 33 provides a polymer of formula (I-A):

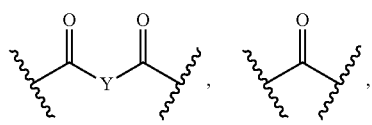

wherein:
 each occurrence of Z is independently CH$_2$ or O;
 each occurrence of A is independently absent or selected from the group consisting of (—CH$_2$—)$_{n5}$, (—CH$_2$—)$_{n5}$-O—C(=O)—, and (—CH$_2$CH$_2$O—)$_{n5}$;
 each occurrence of Q is independently absent, optionally substituted C$_6$-C$_{18}$ arylene, or optionally substituted C$_2$-C$_{15}$ alkylene;
 each occurrence of X is independently selected from the group consisting of

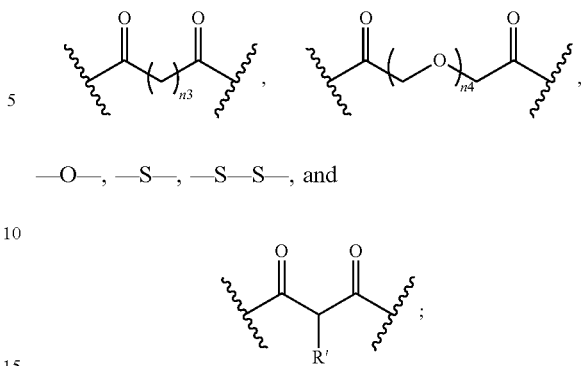

—O—, —S—, —S—S—, and

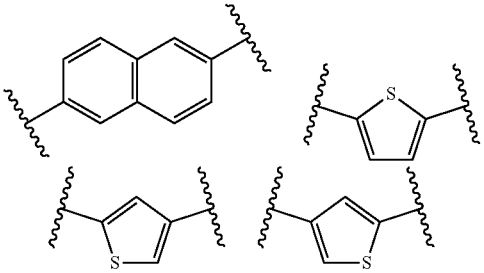

wherein each occurrence of Y is independently O, C$_6$-C$_{18}$ aryl, or C$_6$-C$_{18}$ heteroaryl; and wherein each occurrence of R' is independently selected from the group consisting of optionally substituted C$_1$-C$_{15}$ alkyl, optionally substituted C$_1$-C$_{15}$ heteroalkyl, optionally substituted C$_2$-C$_{15}$ alkenyl, optionally substituted C$_2$-C$_{15}$ hetero alkenyl, optionally C$_2$-C$_{15}$ alkynyl, optionally substituted C$_2$-C$_{15}$ hetero alkynyl, optionally substituted C$_5$-C$_7$ cycloalkyl, optionally substituted C$_5$-C$_7$ heterocycloalkyl, optionally substituted C$_6$-C$_{18}$ aryl, and optionally substituted C$_6$-C$_{18}$ heteroaryl;
 each occurrence of n is independently an integer from 2 to 200,000;
 each occurrence of n1 is independently an integer from 0 to 25;
 each occurrence of n2 is independently an integer from 0 to 25;
 each occurrence of n3 is independently an integer from 0 to 25;
 each occurrence of n4 is independently an integer from 1 to 12; and
 each occurrence of n5 is independently an integer from 1 to 10.

Embodiment 34 provides the polymer of embodiment 33, wherein X or Y is selected from the group consisting of

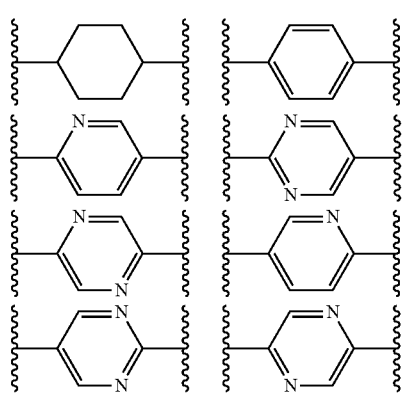

optionally substituted C$_6$-C$_{18}$ arylene, optionally substituted C$_2$-C$_{15}$ alkylene,

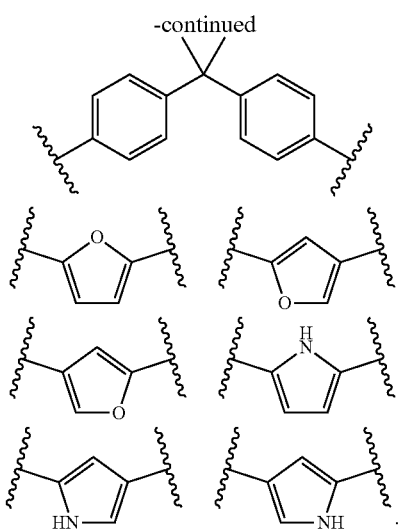

Embodiment 35 provides the polymer of any one of embodiments 33-34, wherein Y is O.

Embodiment 36 provides the polymer of any one of embodiments 33-35, wherein R' is selected from the group consisting of

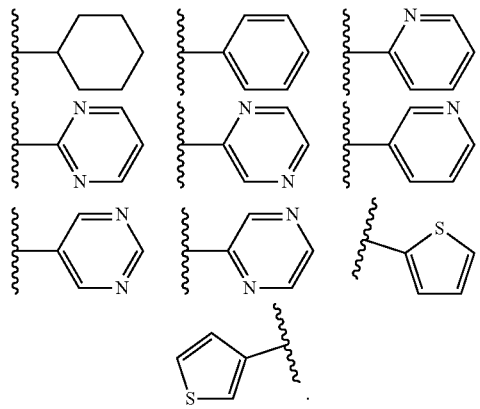

Embodiment 37 provides the polymer of any one of embodiments 33-36, wherein one of the following is true: n1 is 1 and n2 is 1; n1 is 0 and n2 is 0; each of n1 and n2 is independently 1, 2, 3, 4, or 5; n3 is 0, 1, 2, 3, 4, 5, 6, 7, 8, 9, or 10; n4 is 1; or n5 is 1 or 2.

Embodiment 38 provides the polymer of any one of embodiments 33-37, which is prepared from: a monomer of formula (II-A):

(II-A)

and a monomer of formula (III-A):

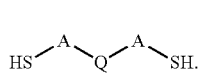
(III-A)

Embodiment 39 provides the polymer of any one of embodiments 33-38, wherein the monomer of formula (II-A) is selected from the group consisting of

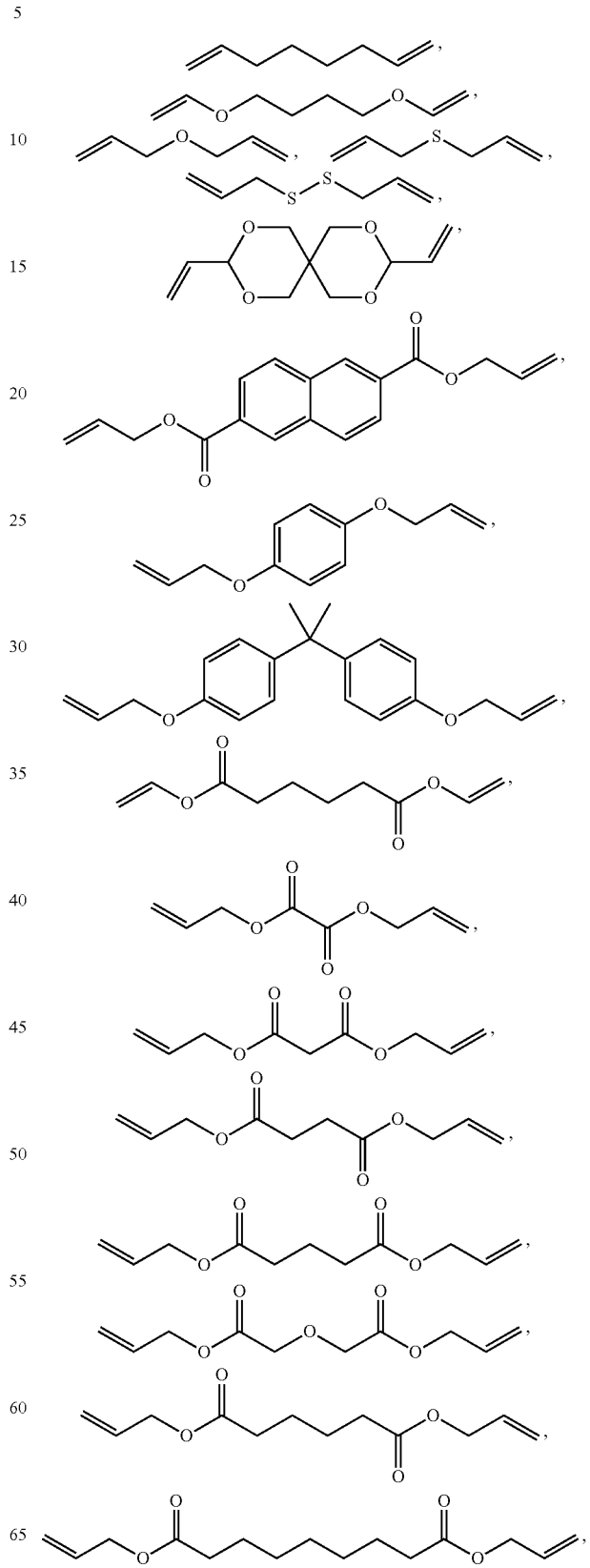

-continued

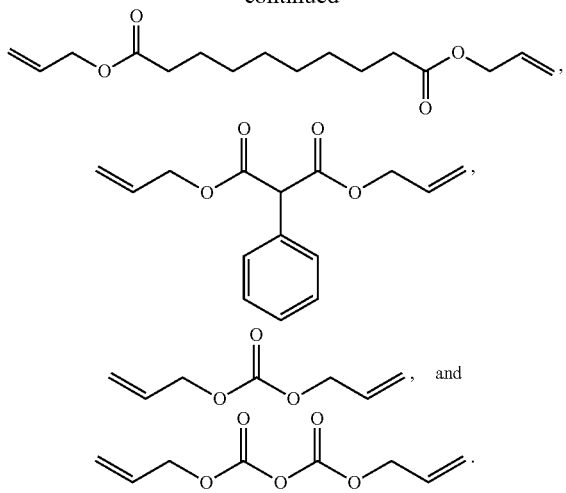

Embodiment 40 provides the polymer of any one of embodiments 33-39, wherein the monomer of formula (III-A) is selected from the group consisting of

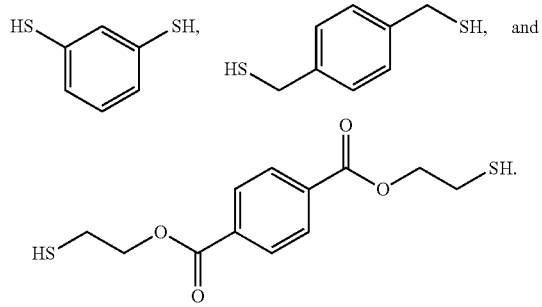

Embodiment 41 provides the polymer of any one of embodiments 33-40, wherein the polymer is crosslinked with a cross-linking agent.

Embodiment 42 provides the polymer of any one of embodiments 33-41, wherein the cross-linking agent is selected from the group consisting of trimethylolpropane tris(3-mercaptopropionate) (TMPTMP), pentaerythritol tetrakis(3-mercaptopropionate) (PETMP), 1,3,5-triallyl-1,3,5-triazine-2,4,6(1H,3H,5H)-trione (TATATO), 2,4,6-triallyloxy-1,3,5-triazine (TAT), triallyl trimellitate (TATM), and triallyl 1,3,5-benzenetricarboxylate (TABT).

Embodiment 43 provides the polymer of any one of embodiments 33-42, which is a thermoset polymer.

Embodiment 44 provides a method of synthesizing a polymer of formula (I-A),

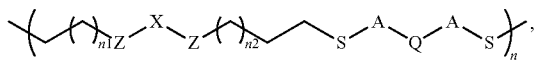

the method comprising: irradiating a monomer of formula (II-A), a monomer of formula (III-A), and a photoinitiator to form a mixture comprising a continuous-phase polymer, wherein the mixture is in bulk and not part of an emulsion,

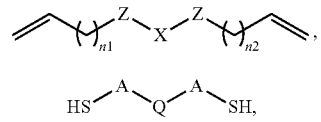

wherein:
each occurrence of Z is independently $CH_2$ or O;
each A is independently absent or selected from the group consisting of $(-CH_2-)_{n5}$, $(-CH_2-)_{n5}-O-C(=O)-$, and $(-CH_2CH_2O-)_{n5}$;
each occurrence of Q is independently absent, optionally substituted $C_6$-$C_{15}$ arylene, or optionally substituted $C_2$-$C_{15}$ alkylene;
each occurrence of X is independently selected from the group consisting of

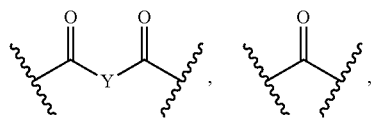

optionally substituted $C_6$-$C_{18}$ arylene, optionally substituted $C_2$-$C_{15}$ alkylene,

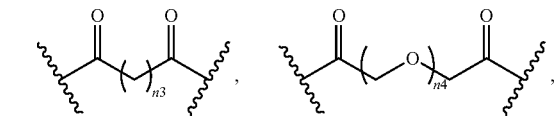

—O—, —S—, —S—S—, and

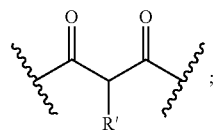

wherein each occurrence of Y is independently O, $C_6$-$C_{18}$ aryl, or $C_6$-$C_{18}$ heteroaryl, and wherein each occurrence of R' is independently selected from the group consisting of an optionally substituted $C_1$-$C_{15}$ alkyl, optionally substituted $C_1$-$C_{15}$ heteroalkyl, optionally substituted $C_2$-$C_{15}$ alkenyl, optionally substituted $C_2$-$C_{15}$ hetero alkenyl, optionally $C_2$-$C_{15}$ alkynyl, optionally substituted $C_2$-$C_{15}$ hetero alkynyl, optionally substituted $C_5$-$C_7$ cycloalkyl, optionally substituted $C_5$-$C_7$ heterocycloalkyl, optionally substituted $C_6$-$C_{18}$ aryl, and optionally substituted $C_6$-$C_{18}$ heteroaryl;
each occurrence of n is independently an integer from 2 to 200,000;
each occurrence of n1 is independently an integer from 0 to 25;
each occurrence of n2 is independently an integer from 0 to 25;
each occurrence of n3 is independently an integer from 0 to 25;
each occurrence of n4 is independently an integer from 1 to 12; and
each occurrence of n5 is independently an integer from 1 to 10.

Embodiment 45 provides the method of embodiment 44, further comprising irradiating the mixture in the presence of a cross-linking agent.

Embodiment 46 provides the method of any one of embodiments 44-45, wherein the mixture is irradiated with UV radiation having wavelength of about 380 nm to about 410 nm.

Embodiment 47 provides a composition comprising:
a monomer of formula (II-A)

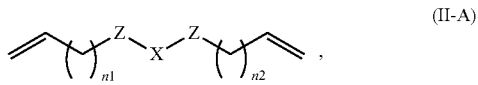

(II-A)

a monomer of formula (III-A)

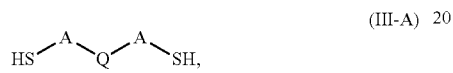

(III-A)

and
optionally at least one of a photoinitiator and a cross-linking agent,
wherein:
each occurrence of Z is independently $CH_2$ or O;
each A is independently absent or selected from the group consisting of $(-CH_2-)_{n5}$, $(-CH_2-)_{n5}-O-C(=O)-$, and $(-CH_2CH_2O-)_5$;
each occurrence of Q is independently absent, optionally substituted $C_6-C_{18}$ arylene, or optionally substituted $C_2-C_{15}$ alkylene;
each occurrence of X is independently selected from the group consisting of

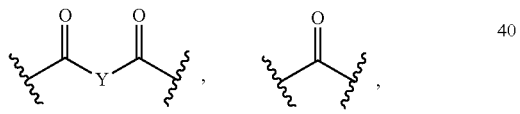

optionally substituted $C_6-C_{18}$ arylene, optionally substituted $C_2-C_{15}$ alkylene,

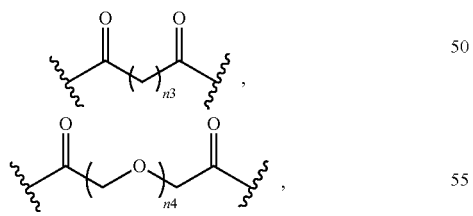

—O—, —S—, —S—S—, and

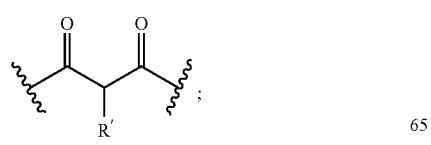

wherein each occurrence of Y is independently O, a $C_6-C_{18}$ aryl, or a $C_6-C_{18}$ heteroaryl; and wherein each occurrence of R' is independently selected from the group consisting of an optionally substituted $C_1-C_{15}$ alkyl, optionally substituted $C_1-C_{15}$ heteroalkyl, optionally substituted $C_2-C_{15}$ alkenyl, optionally substituted $C_2-C_{15}$ hetero alkenyl, optionally substituted $C_2-C_{15}$ alkynyl, optionally substituted $C_2-C_{15}$ hetero alkynyl, optionally substituted $C_5-C_7$ cycloalkyl, optionally substituted $C_5-C_7$ heterocycloalkyl, optionally substituted $C_6-C_{18}$ aryl, and optionally substituted $C_6-C_{18}$ heteroaryl;
each occurrence of n is independently an integer from 2 to 200,000;
each occurrence of n1 is independently an integer from 0 to 25;
each occurrence of n2 is independently an integer from 0 to 25;
each occurrence of n3 is independently an integer from 0 to 25;
each occurrence of n4 is independently an integer from 1 to 12; and
each occurrence of n5 is independently an integer from 1 to 10.

Embodiment 48 provides the composition of embodiment 47, wherein each occurrence of X or Y is independently selected from the group consisting of

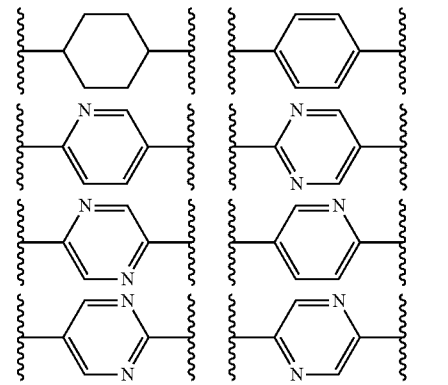

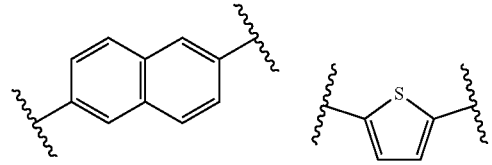

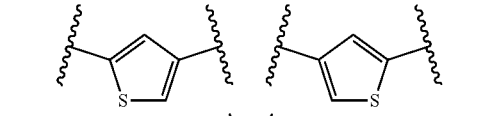

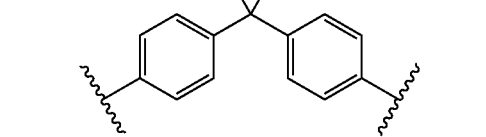

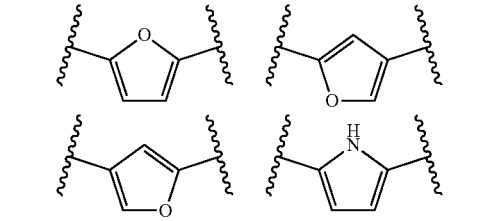

-continued

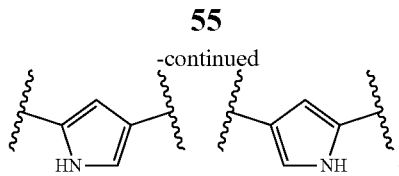

Embodiment 49 provides the composition of any one of embodiments 47-48, wherein the cross-linking agent is selected from the group consisting of trimethylolpropane tris(3-mercaptopropionate) (TMPTMP), pentaerythritol tetrakis(3-mercaptopropionate) (PETMP), 1,3,5-triallyl-1,3,5-triazine-2,4,6(1H,3H,5H)-trione (TATATO), 2,4,6-triallyloxy-1,3,5-triazine (TAT), triallyl trimellitate (TATM), and triallyl 1,3,5-benzenetricarboxylate (TABT).

Other Aspects

The recitation of a listing of elements in any definition of a variable herein includes definitions of that variable as any single element or combination (or sub-combination) of listed elements. The recitation of an embodiment herein includes that embodiment as any single embodiment or in combination with any other aspects or portions thereof.

The disclosures of each and every patent, patent application, and publication cited herein are hereby incorporated herein by reference in their entirety. While this disclosure has been described with reference to specific aspects, it is apparent that other aspects and variations of this disclosure may be devised by others skilled in the art without departing from the true spirit and scope of the disclosure. The appended claims are intended to be construed to include all such aspects and equivalent variations.

What is claimed is:

1. A thermoplastic polymer of formula (I):

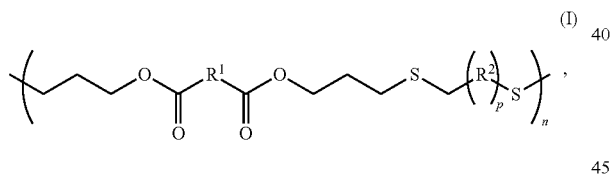

wherein:
  each occurrence of $R^1$ is independently selected from the group consisting of:

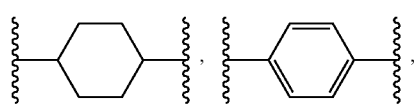

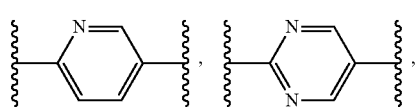

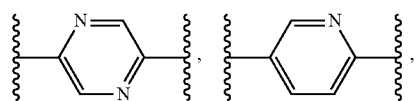

-continued

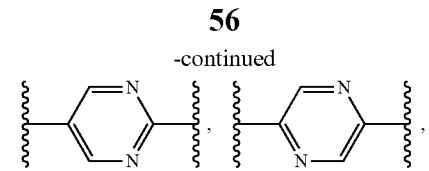

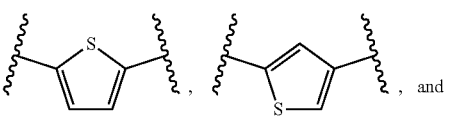

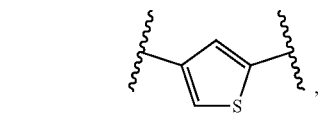

each of which is independently optionally substituted;
  each occurrence of $R^2$ is independently selected from the group consisting of optionally substituted $C_1$-$C_{15}$ alkylene, optionally substituted $C_1$-$C_{15}$ heteroalkylene, optionally substituted $C_2$-$C_{15}$ alkenylene, optionally substituted $C_2$-$C_{15}$ heteroalkenylene, optionally substituted $C_2$-$C_{15}$ alkynylene, and optionally substituted $C_2$-$C_{15}$ heteroalkynylene;
  each occurrence of p is independently an integer from 1 to 25;
  each occurrence of n is independently an integer from 2 to 200,000; and
  the polymer is semi-crystalline and has a melting point of about 70° C. to about 120° C.

2. The polymer of claim 1, which is prepared from:

a monomer of formula (II):

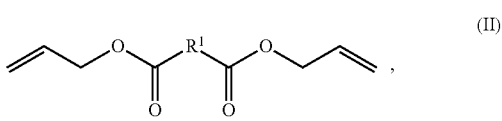

and
a monomer of formula (III):

3. The polymer of claim 1, wherein at least one of the following applies:
  (a) each occurrence of $R^1$ is independently selected from the group consisting of:

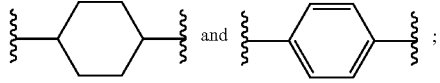

(b) the polymer is selected from the group consisting of

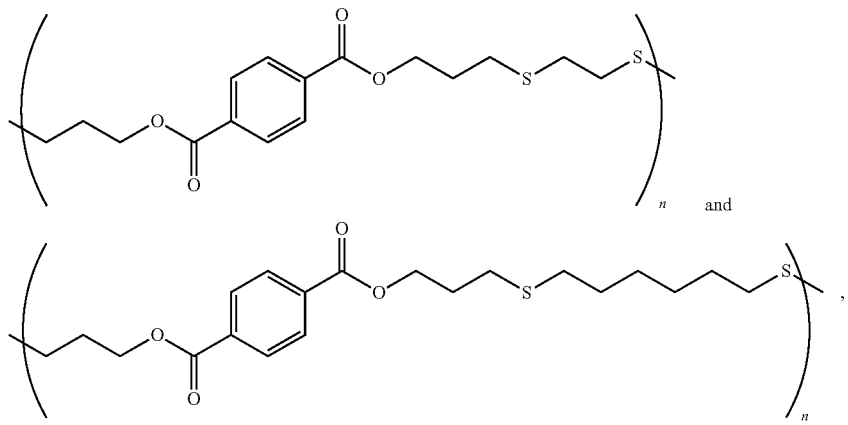

and wherein is n is an integer ranging between 2 and 200,000.

4. The polymer of claim 2, wherein at least one of the following applies:
 (a) the monomer of formula (II) is selected from the group consisting of diallyl terephthalate and diallyl cyclohexane-1,4-dicarboxylate;
 (b) the monomer of formula (III) is selected from the group consisting of

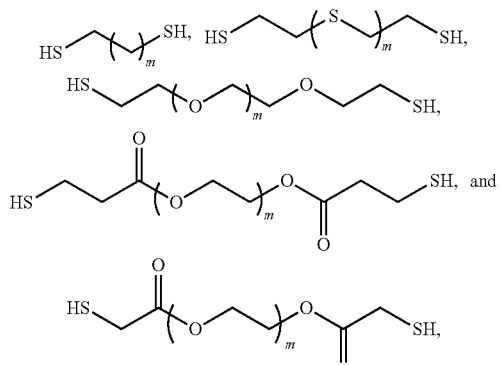

wherein each occurrence of m is independently an integer from 1 to 25;
 (c) the monomer of formula (III) is selected from the group consisting of

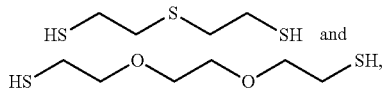

wherein the molar ratio of the monomer of formula (II) and the monomer of formula (III) in the polymer is about 1:1.

5. The polymer of claim 1, wherein at least one of the following applies:
 (a) the polymer is a linear polymer;
 (b) the polymer is a continuous-phase polymer;
 (c) the polymer is suitable for 3D-printing;
 (d) the polymer is suitable for stereolithography (SLA) printing;
 (e) the polymer has tensile strength ranging from about 15 MPa to about 35 MPa;
 (f) the polymer has a toughness ranging from about 80 MJ/m$^3$ to about 140 MJ/m$^3$.

6. A method of synthesizing a semi-crystalline continuous-phase thermoplastic polymer of formula (I), wherein the method comprises;
 irradiating a mixture of
  a monomer of formula (II),

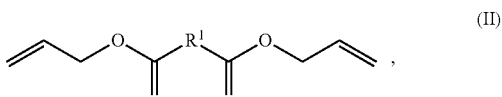 (II)

a monomer of formula (III),

 (III)

and a photoinitiator, and
 polymerizing the mixture to form the semi-crystalline continuous-phase thermoplastic polymer of formula (I),
 wherein the semi-crystalline continuous-phase thermoplastic polymer of formula (I) has a melting point of about 70° C. to about 120° C.,
 wherein the polymer of formula (I) has the formula

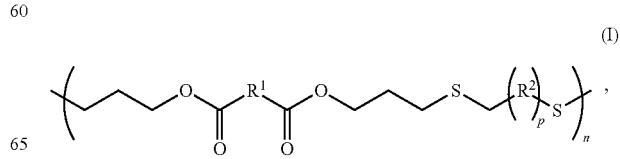 (I)

wherein:
each occurrence of R¹ is independently selected from the group consisting of:

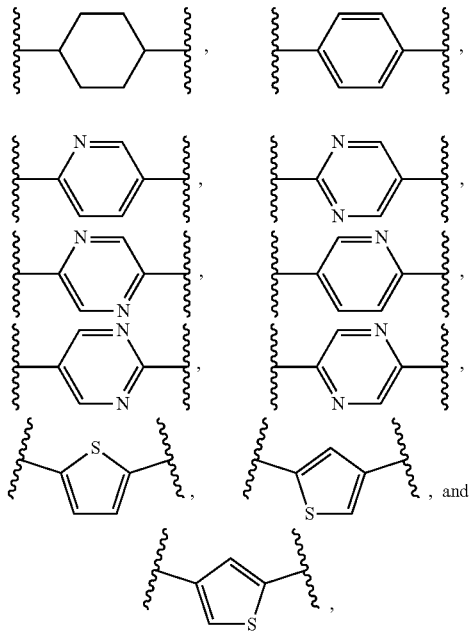

, and each of which is independently optionally substituted;

each occurrence of R² is independently selected from the group consisting of optionally substituted $C_1$-$C_{15}$ alkylene, optionally substituted $C_1$-$C_{15}$ heteroalkylene, optionally substituted $C_2$-$C_{15}$ alkenylene, optionally substituted $C_2$-$C_{15}$ hetero alkenylene, optionally substituted $C_2$-$C_{15}$ alkynylene, and optionally substituted $C_2$-$C_{15}$ heteroalkynylene;

each instance of p is independently an integer from 1 to 25; and each instance of n is independently an integer from 2 to 200,000.

7. The method of claim 6, wherein the mixture is irradiated with UV radiation having wavelength of about 380 nm to about 410 nm.

8. The method of claim 7, wherein at least one of the following applies:

(a) an irradiation time of the irradiation ranges from about 2 seconds to about 30 seconds;

(b) the irradiation comprises light having intensity of about 1 mW/cm² to about 20 mW/cm²;

(c) the polymerization occurs predominantly via thiol-ene step-growth mechanism;

(d) the polymerization takes place at a temperature ranging from about 15° C. to about 40°.

* * * * *